United States Patent [19]

Wesolowski

[11] Patent Number: 5,019,906
[45] Date of Patent: May 28, 1991

[54] TIME BASE CORRECTOR MEMORY ARRANGEMENT AND MEMORY CONTROL

[75] Inventor: Jan S. Wesolowski, Redwood City, Calif.

[73] Assignee: Ampex Corporation, Redwood City, Calif.

[21] Appl. No.: 472,444

[22] Filed: Jan. 29, 1990

Related U.S. Application Data

[60] Continuation of Ser. No. 330,998, Mar. 29, 1989, abandoned, which is a continuation of Ser. No. 116,591, Nov. 3, 1987, abandoned, which is a division of Ser. No. 788,606, Oct. 17, 1985, Pat. No. 4,733,294.

[51] Int. Cl.$^5$ .............................................. H04N 5/04
[52] U.S. Cl. ..................................... 358/148; 360/36.2
[58] Field of Search ................. 358/17, 18, 19, 148, 358/149, 311, 312, 313, 314, 320, 324, 326, 337, 339; 360/36.2, 38.1

[56] References Cited

U.S. PATENT DOCUMENTS

| | | | |
|---|---|---|---|
| 4,007,486 | 2/1977 | Inaba et al. | 358/324 |
| 4,109,276 | 8/1978 | Hopkins, Jr. et al. | 358/326 |
| 4,134,131 | 1/1979 | Hopkins, Jr. | 358/339 |
| 4,165,524 | 8/1979 | Ninomiya | 358/339 |
| 4,214,262 | 7/1980 | Mizukami | 358/339 |
| 4,249,198 | 2/1981 | Ito et al. | 358/19 |
| 4,251,830 | 2/1981 | Tatami | 358/320 |
| 4,280,147 | 7/1981 | Baldwin | 360/36.2 |
| 4,415,994 | 11/1983 | Ive et al. | 358/339 |
| 4,438,456 | 3/1984 | Yoshinaka | 358/320 |
| 4,445,135 | 4/1984 | Heitmann et al. | 358/19 |
| 4,477,842 | 10/1984 | Kaneko | 360/38.1 |
| 4,531,147 | 7/1985 | Kouyama | 358/13 |
| 4,583,129 | 4/1986 | Arai | 358/320 |
| 4,604,658 | 8/1986 | Hibino et al. | 358/339 |
| 4,635,134 | 1/1987 | Sasamura et al. | 358/312 |
| 4,646,136 | 2/1987 | Kouyama | 358/19 |
| 4,716,454 | 12/1987 | Oldershaw et al. | 358/320 |
| 4,717,950 | 1/1988 | Wesolowski | 358/323 |
| 4,763,203 | 8/1988 | Oldershaw et al. | 358/321 |

Primary Examiner—Donald McElheny, Jr.
Attorney, Agent, or Firm—James A. LaBarre; George B. Almeida

[57] ABSTRACT

A time base corrector including a frame memory and a memory control. The memory control is microprocessor based and calculates the starting addresses of memory areas at which video data will be written to or read from the frame memory and the starting times of those sequences. The memory control receives information concerning the configuration of the time base corrector, the input video field sequence, the desired output video field sequence, timing components of the input and reference clock signals, TV standard, and operator commands to make these calculations. The results of the control are time base corrections for horizontal and vertical phase errors, horizontal and vertical positioning control, color frame sequencing, color correction of chroma phase, configuration delay adjustment, and other advantageous operations.

3 Claims, 33 Drawing Sheets

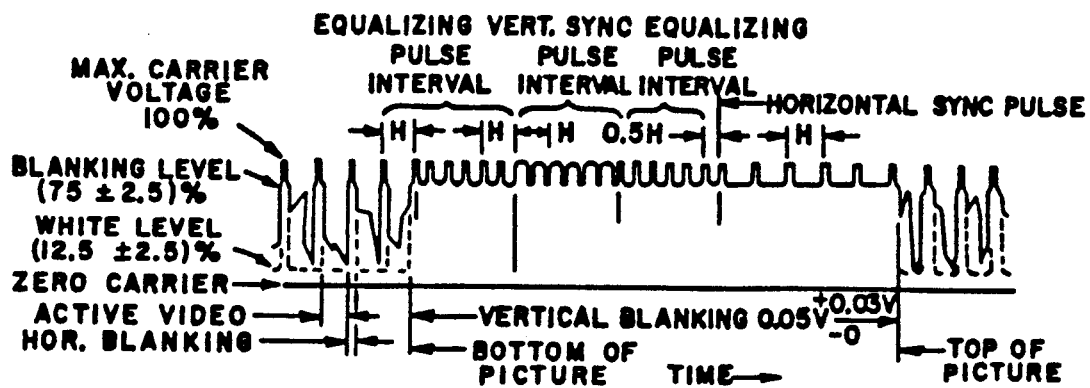
FIG. 4A
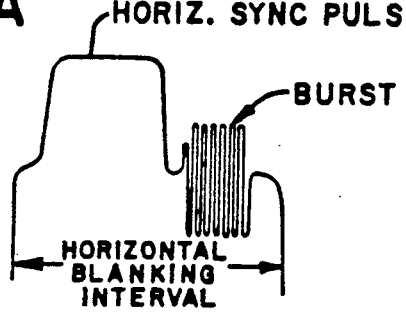
FIG. 4B
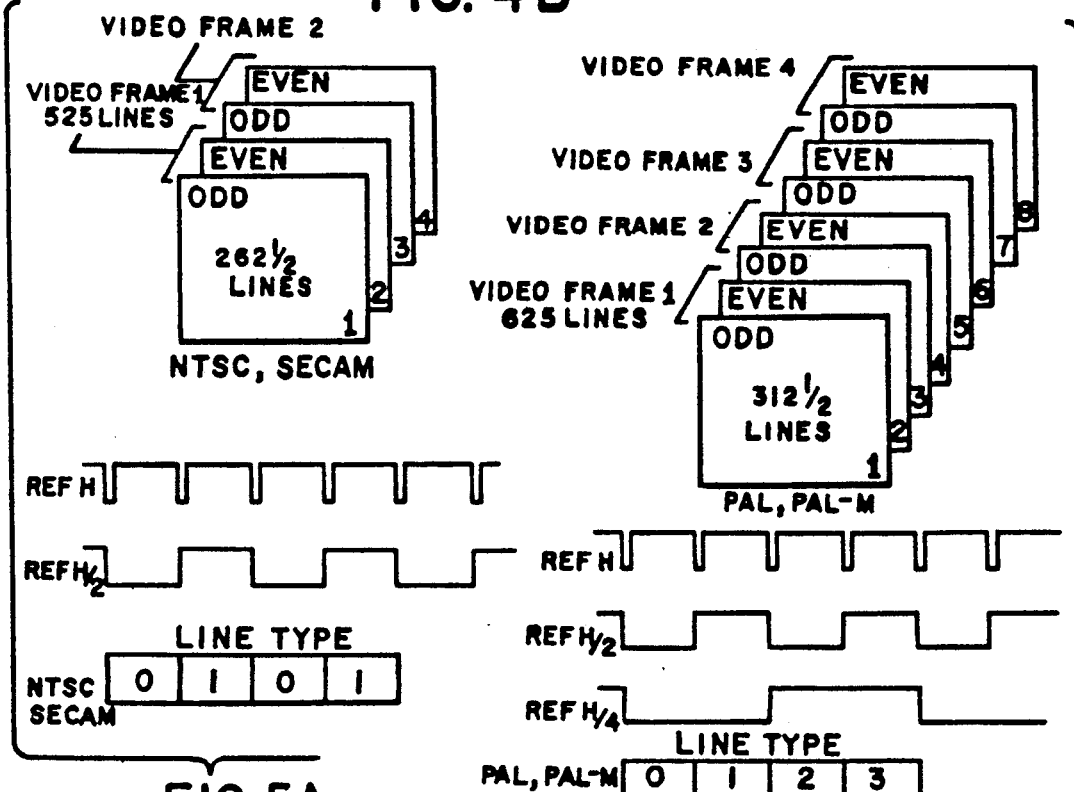
FIG. 5A
FIG. 5B

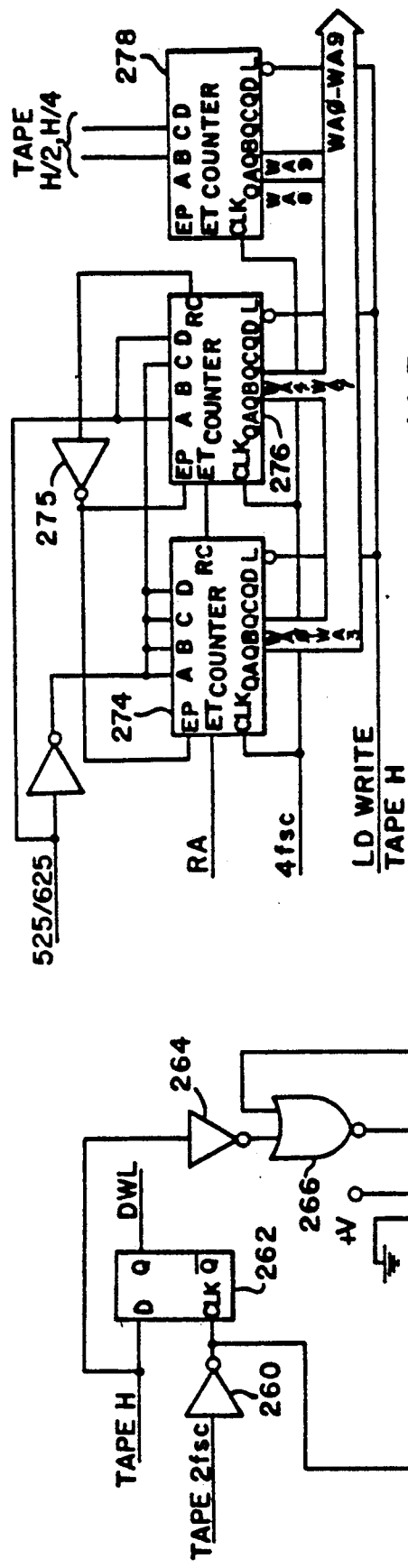
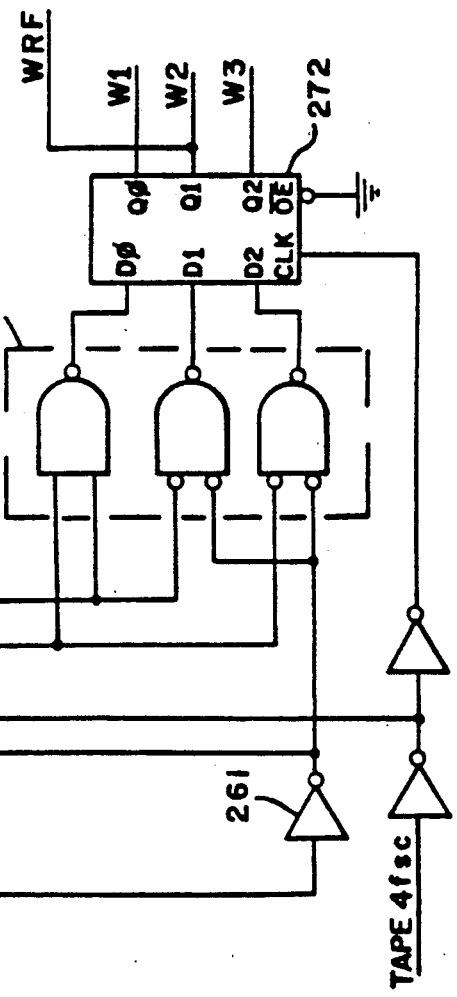
FIG. 11B
FIG. 11A

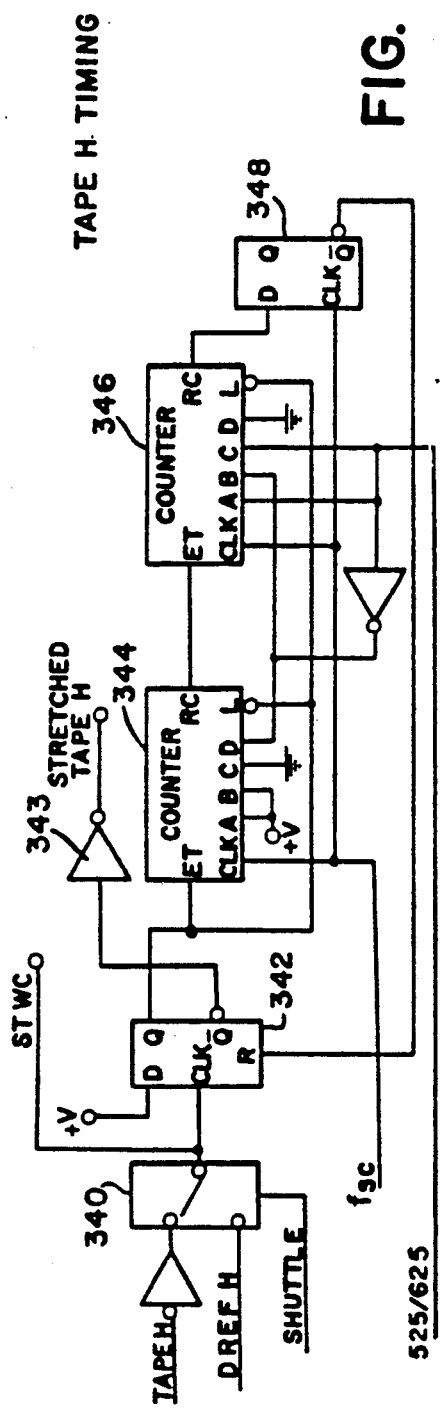
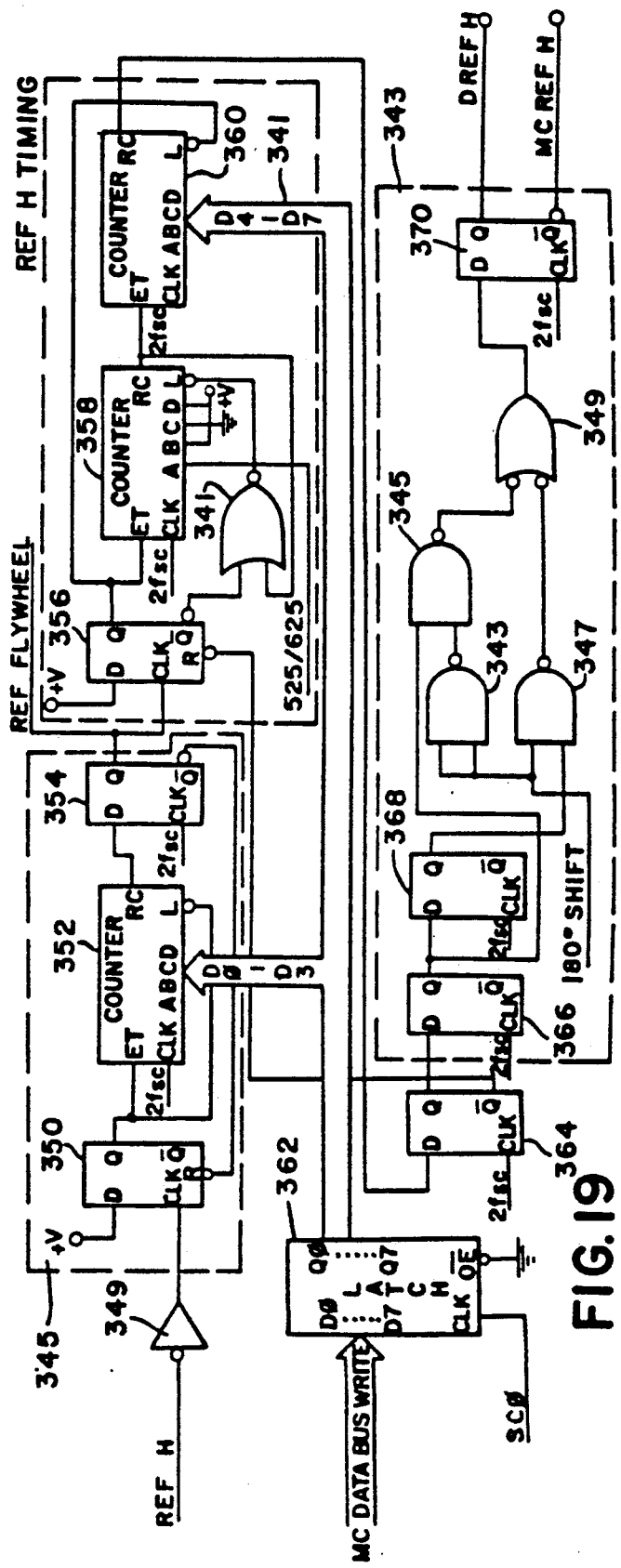
FIG. 18
FIG. 19

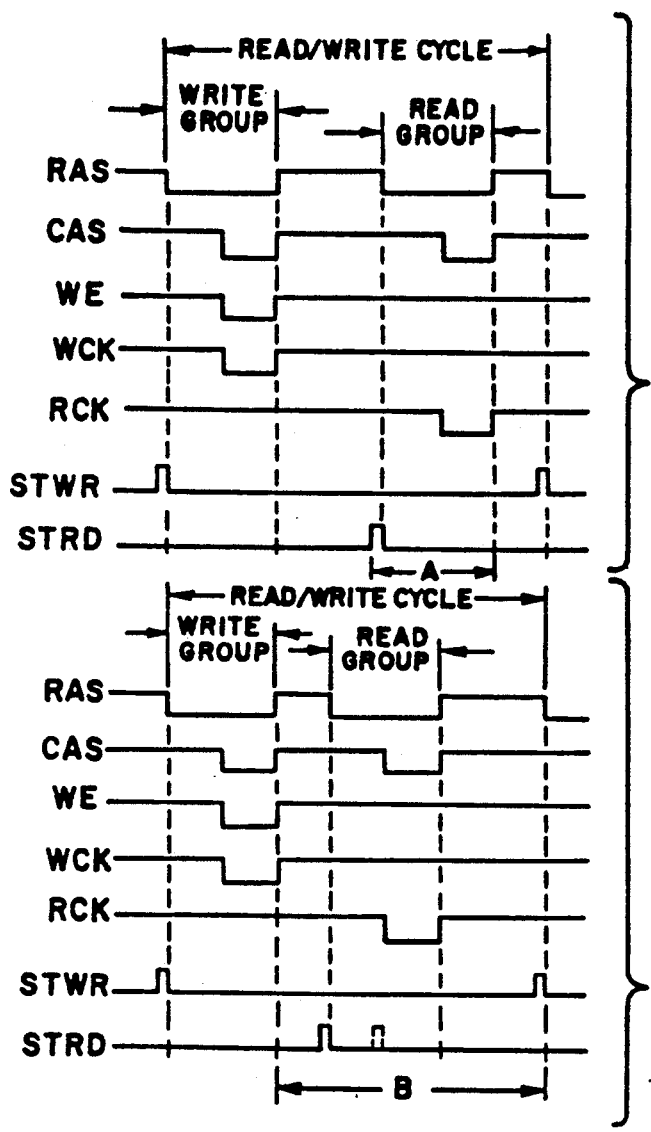
FIG. 26A
FIG. 26 B
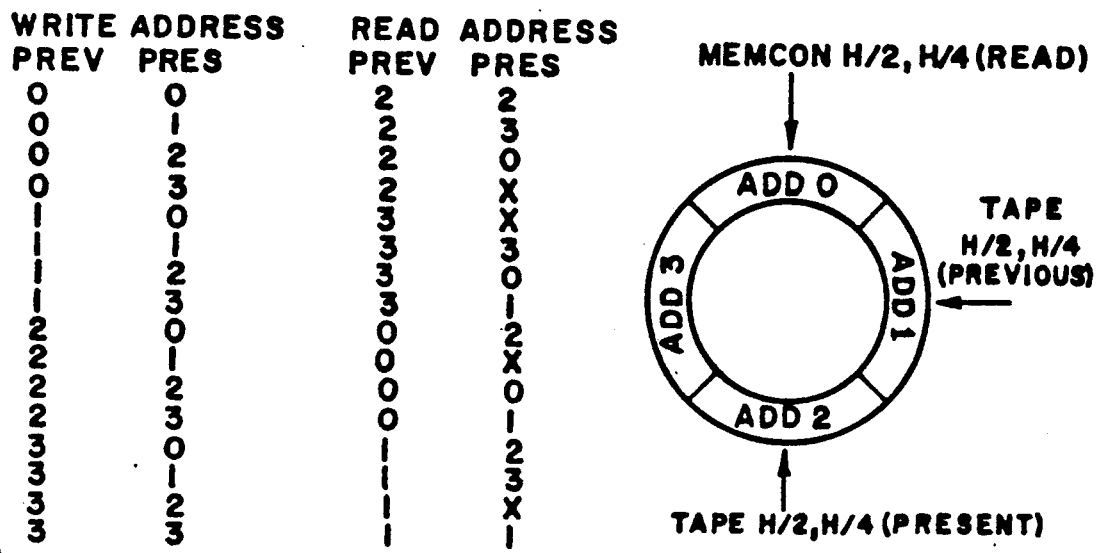
FIG. 27

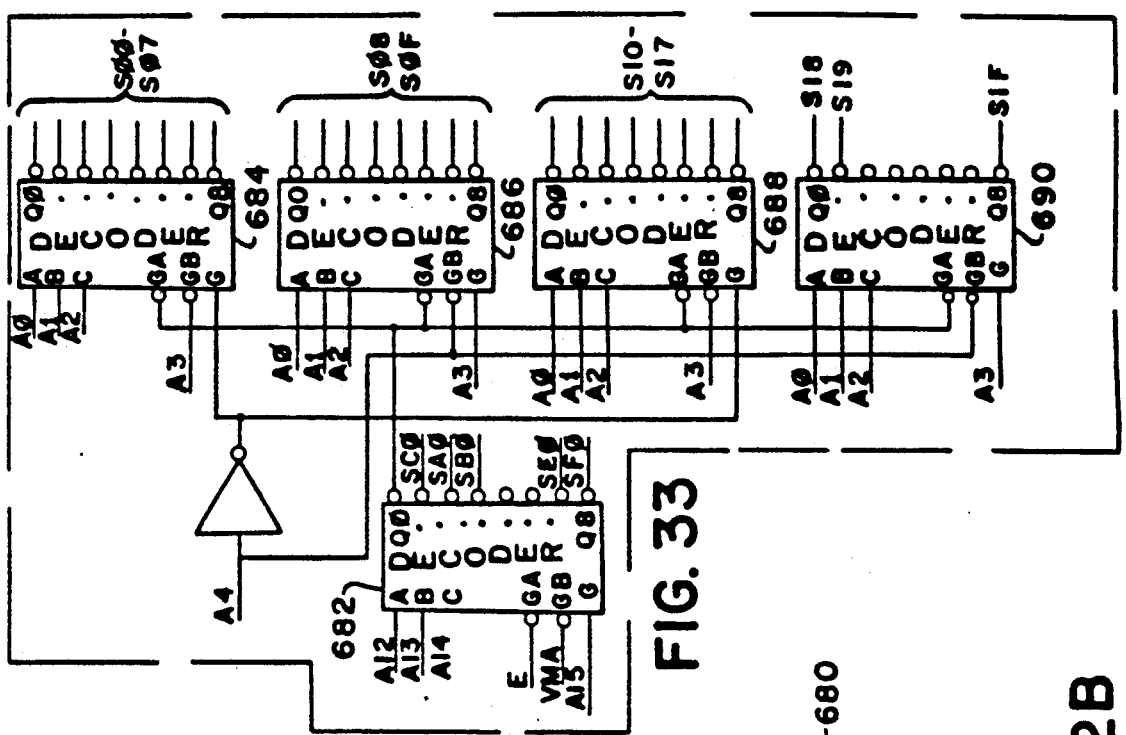
FIG. 33
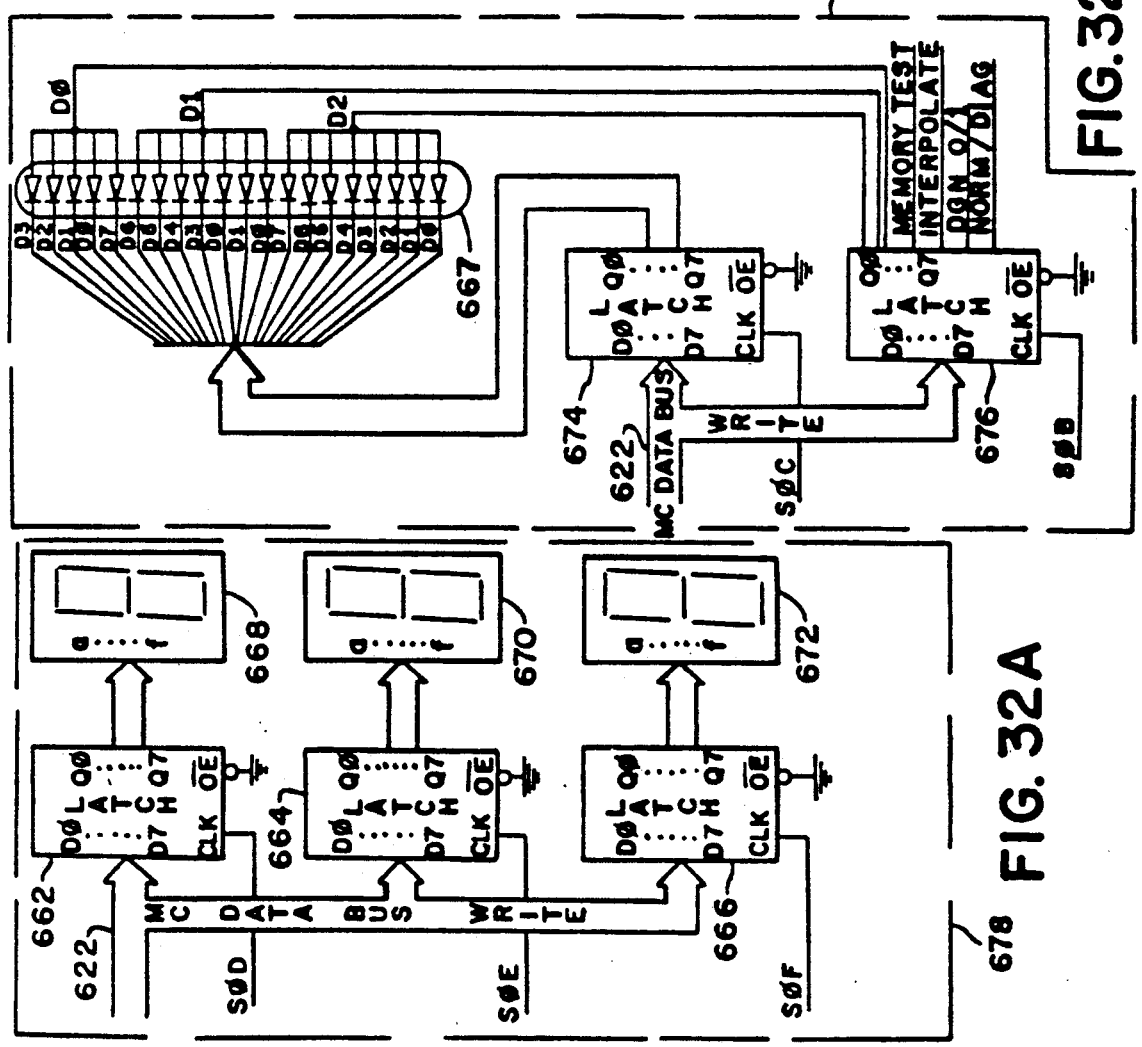
FIG. 32B
FIG. 32A

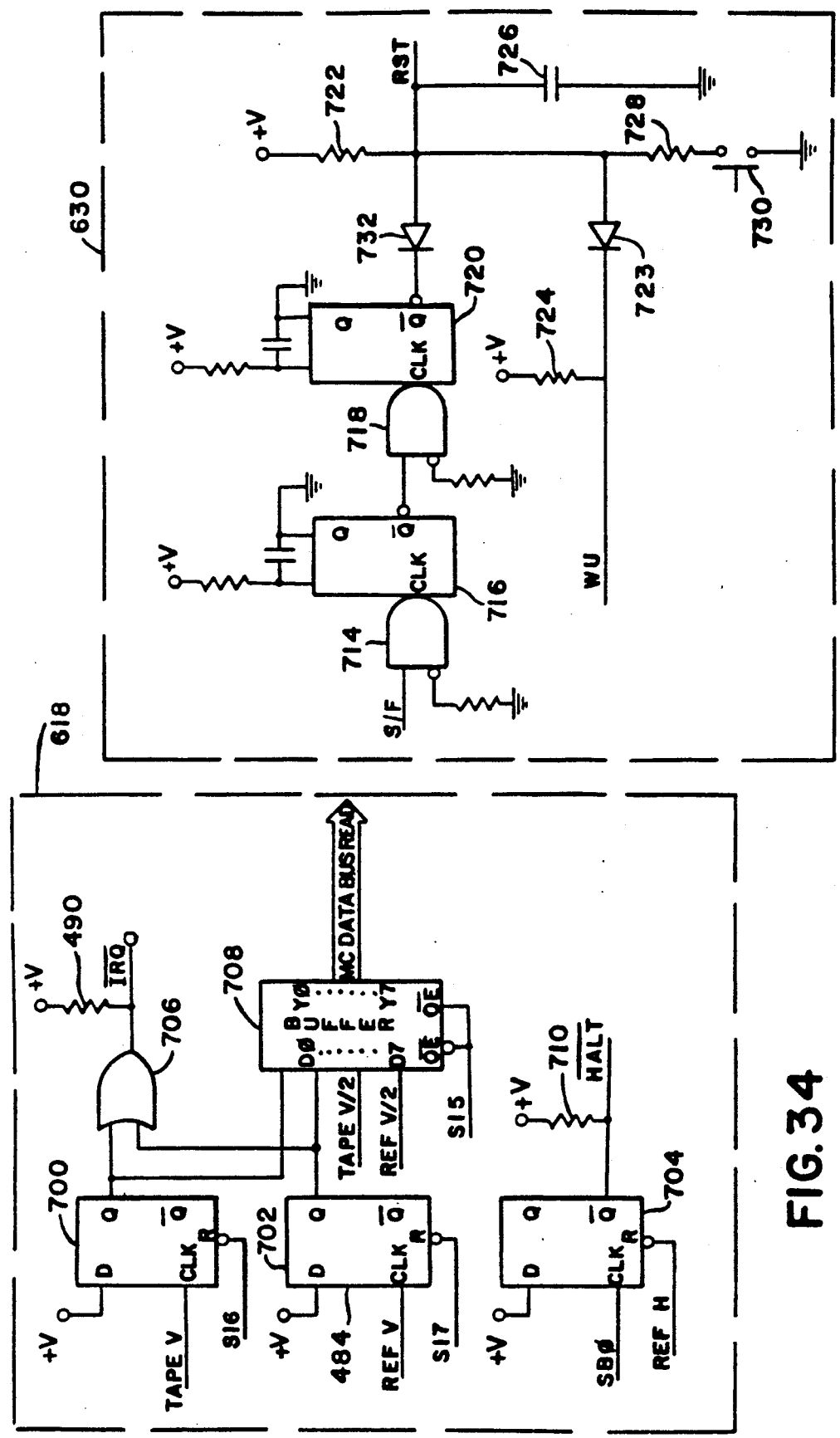

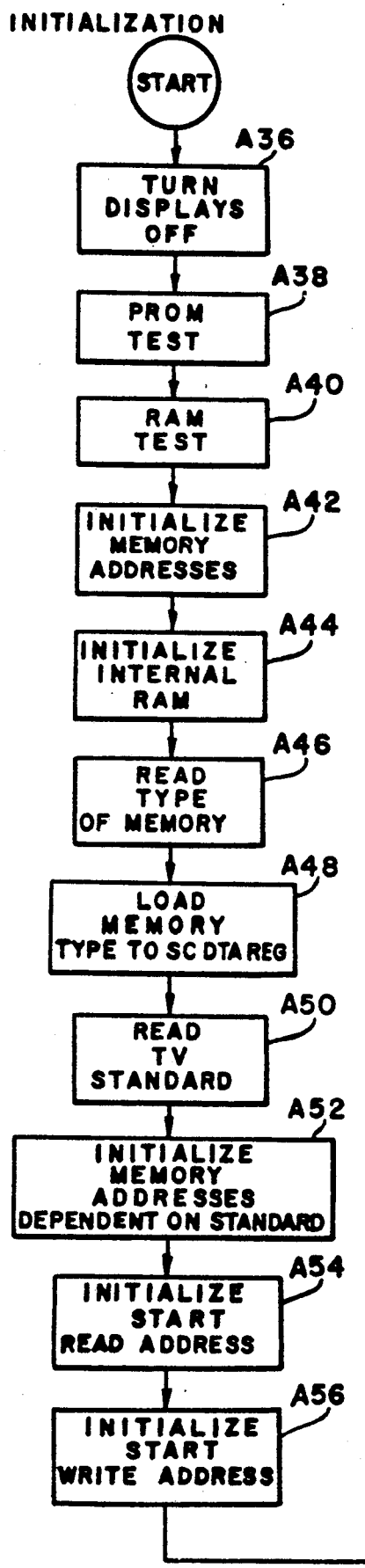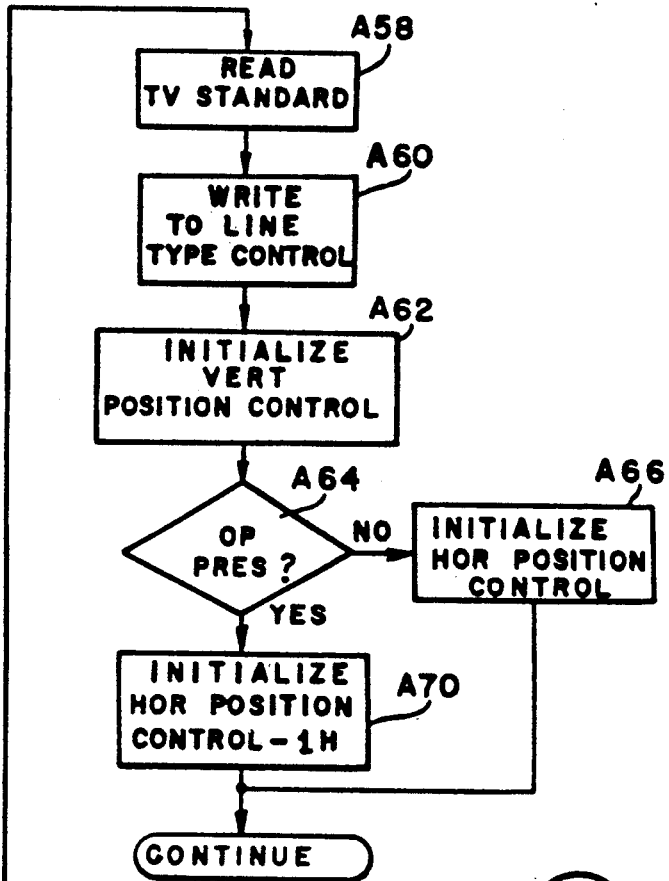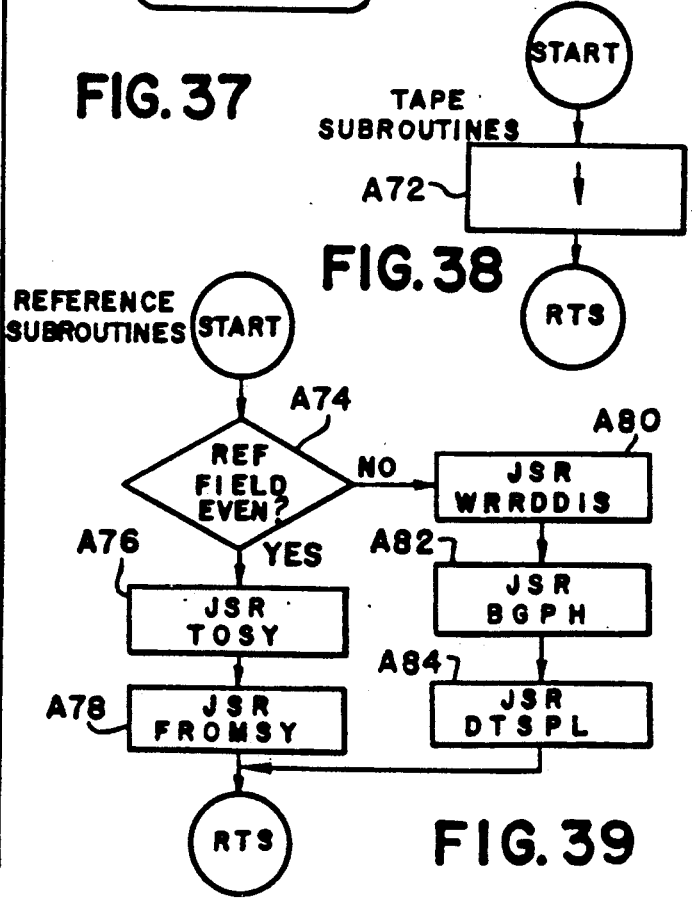

TIME BASE CORRECTOR MEMORY ARRANGEMENT AND MEMORY CONTROL

This application is a continuation of application Ser. No. 07/330,998 filed Mar. 29, 1989, now abandoned, which is a continuation of application Ser. No. 07/116,591 filed Nov. 3, 1987, abandoned, which is a division of application Ser. No. 06/788,606 filed on Oct. 17, 1985, now U.S. Pat. No. 4,733,294.

The invention pertains generally to a time base corrector (TBC) for video signals and is more particularly directed to a time base corrector memory arrangement including a frame memory and memory control which provides for horizontal and vertical positioning in time of a frame of video data and further provides for varying the read/write addressing of the frame memory.

In general, time base correctors are used to correct time base errors introduced into information signals by recording and reproducing the signals with a memory device such as a video tape recorder (VTR). For example, time base errors, which are frequency and/or phase errors, often are introduced in timed or synchronous information signals, such as composite color video signals, that are reproduced from a recording medium. One of the recording media for which time base correctors have previously been used is magnetic tape having video signals recorded thereon.

Video signals recorded by a VTR on magnetic tape commonly exhibit time base errors because of intentional operations which cause a change in tape speed during reproducing relative to recording such as still frame, fast forward, slow motion, forward shuttle, -reverse shuttle, etc. Further, time base errors occur because of the inability of the head and tape transport mechanisms to maintain the correct rate of relative travel between the tape and head during record and reproduce operations.

There are many and various causes of this inability to maintain a relative rate including expansion or contraction of the magnetic tape after the video signals have been recorded thereon, variations of the speed at which the magnetic tape is driven during the playback mode from that during recording, and variations of the speed at which the record/playback heads scan the magnetic tape during recording and playback modes.

If these intentional or unintentional time base errors are uncorrected, the errors will evidence themselves as unacceptable disturbances in the displayed video picture, such as picture jitter, luminance and chrominance distortion, and other undesired aberrations.

Many time base correctors today are of a digital form but can additionally process analog composite video signals. In such correctors, the analog composite video signal is first converted into digital data samples. The digital data are stored in a memory in synchronism with a write clock signal which is time base coherent with the analog video signal received and, hence, is unstable because it contains the same time base variations as contained in the received video signals. Once a predetermined amount of video signal samples have been stored, they are read out at a synchronous rate by a stabilized clock. The stabilized clock, termed the reference or read clock, substantially retimes the digital data samples and removes the time base errors while at the same time adding some slight delay. This delay is accounted for in other circuitry of the time base corrector before the digital video samples are reconverted to their original analog form. Thereafter, a utilization device may display, further transmit, record, or process the video signals free of the time base errors.

When an information signal is to be time base corrected is a video TV signal and the TBC contains a frame memory, it is advantageous to generate the output video signal as a standard sequence of video fields depending on the TV standard of the video signal input. Information about the video input field sequence is contained in the tape horizontal and vertical synchronizing components and information about the desired video output field sequence is contained in the reference horizontal and vertical synchronizing components.

It is, however, difficult to match the correct incoming field sequence with the desired output field sequence because the video tape recorder may be reproducing the information signal at non-standard tape speeds. Therefore, the available tape field may be odd when the reference requires an even field or vice versa. Thus, when the VTR is reproducing at a nonstandard tape speed, the incoming and output field sequences are not comparable. For example, when the VTR is a helical scan device in a slow motion mode, it will generally repeat the same field or track a number of times before advancing to another field on the next track. Thus, several odd or even fields may be input before the next change of field type. Additionally, in a freeze motion mode the VTR repeat one field or one frame by scanning on one or two tracks for as long as the operation is enabled. For a shuttle mode, the VTR will skip several tracks or fields depending on the shuttle speed before reading another and will completely randomize the incoming field sequence.

Even when nonstandard sequences are input to the time base corrector, it is necessary to generate the output signal sequence according to the standard or reference information. This operation requires a means to monitor and process the tape and reference field type information and further requires a means to control the reading and writing into particular addresses of the frame memory. This type of operation is particularly difficult for hardwired circuitry because of the speed at which the video data is being transferred on the video data path of a normal TBC, generally at some multiple of the subcarrier frequency (normally 4 times). The video rate requires exact timing to start reading or writing a field in memory which cannot be delayed for calculations.

This addressing control may be complicated by the fact that the TBC must also generate standard field sequences for more than one TV standard. Typically, a NTSC TV standard requires a 4 field sequence to generate a complete color frame of two video frames having two fields each. A PAL TV standard requires a 8 field sequence to generate a complete color frame of 4 video frames having 2 fields each. The other typical standards of PAL-M and SECAM may be generated by the same 4 field sequence or 8 field sequence as that used for the NTSC, and PAL standards, respectively.

In addition to controlling the read and write addresses for field sequencing, it is often advantageous to also control the starting times for reading and writing the video data with respect to either the tape horizontal and vertical synchronizing pulses or the reference horizontal and vertical synchronizing pulses. The most common use of this is synchronously with these signals for horizontal and vertical phase error correction.

This function can also be used in at least three advantageous operations. Initially, the positioning of the video data with respect to the reference synchronizing pulses allows a horizontal and vertical positioning of the final output video picture on a display. If the video with respect to the reference clocks can be moved, then the picture can be moved on the output display such that a true centering or any offset positioning desired can be easily accomplished.

Secondly, because a time base corrector may have different options and modules contained therein, a standard delay can be maintained through the device by delaying the vertical sync pulse before reading. This operation is necessary to control a video tape recorder with an advanced vertical reference signal to maintain an average or typical delay between writing and reading of the video signal when the configuration of the TBC changes. For example, for a fully configured TBC, if the delay through the device is 6 horizontal lines, then removing an optional module will eliminate a delay of possibly one or two horizontal lines. If a delay depending upon configuration can be inserted back into the vertical reference timing, then a constant delay, no matter what the configuration, through the TBC can be maintained. Thus, the vertical positioning control would provide a number of delay intervals equal to that for each optional module which was removed from the configuration.

The third advantage would be a horizontal positioning control which would allow horizontal positioning of the output data with respect to the input data. This additionally provides a means for color correcting input video data by simple 180° phase shift of a subcarrier cycle.

SUMMARY OF THE INVENTION

According to the invention, a time base corrector including a digital memory is provided with a memory control including a vertical and horizontal positioning control for the video data and an address control for starting the reading or the writing of a sequence of memory locations from a calculated address.

The time base corrector memory includes a timing corrector memory and a frame memory which receive unstable input video data including time base errors from a reproducing apparatus such as a video tape recorder, and which retime that video data into stable output video data locked to a reference signal such as a studio video signal. The input video data is in the form of digital data samples which have either been converted from an analog video signal at a particular sample rate or reproduced directly from the storage media by the reproducing apparatus.

The video data is retimed to the reference signal in the timing corrector memory by writing the input video data into the memory with a write clock including the time base errors and by reading the video data from the memory with a read clock synchronized to the reference signal. The transfer of data from the timing corrector memory to the frame memory occurs in increments of horizontal lines controlled by the timing components including the horizontal and vertical syncs, of the incoming video signal. The frame memory is read from in increments of horizontal lines by using the timing components including horizontal and vertical syncs, of the reference video signal.

The memory control supervises the reading of the retimed video data from the timing corrector memory and its writing into the frame memory, and further supervises the reading of the retimed video data from the frame memory to become the output video data. The memory control supervises the reading and writing of data into and out of the frame memory by using memory control function circuitry including a read address counter, a write address counter, a read address calculation circuit, and a write address calculation circuit.

The memory control receives information concerning the configuration of the time base corrector, the input video field sequence, the desired output video field sequence, timing components of the input- and reference signals, and operator commands. The memory control processes this information to control the horizontal and vertical positioning of the video data stored within the frame memory with the horizontal and vertical positioning controls. This information is additionally processed by the memory control to determine addresses at which the video data will be written to or addresses which video data will be read from frame memory by the address control.

In a preferred implementation, the horizontal positioning control receives the tape horizontal sync and reference horizontal sync and delays those signals a variable interval which is controlled by the memory control. The vertical positioning control receives the tape vertical sync and reference vertical sync and delays those signals a variable interval which is controlled by the memory control. The memory control regulates the memory control function circuitry to write the video data into the frame memory relative to the repositioned tape horizontal sync and repositioned tape vertical sync and to read the video data from the frame memory relative to the repositioned reference horizontal sync and repositioned reference vertical sync. Because the video data is retimed in the timing corrector to be synchronous with the reference, the video data can be repositioned with respect to the major timing components of the input video and/or the reference video while it is moving through the frame memory.

One aspect of being able to reposition the video data with respect to the timing components of the input video signal and the output video signal provides a method of color correction by memory control. To provide color correction to an opposite field in an NTSC composite color video signal, the chroma component is separated from the luminance component and, thereafter, the chroma component phase is inverted. However, the necessary processing circuitry degrades the video signal somewhat during this operation. This same operation can be accomplished if the entire field of video data is repositioned in time ½ of a subcarrier cycle later because this has the same effect as inverting chroma phase, i.e., a 180° phase shift.

While the repositioning of the field will cause some degradation of the video because of a ½ subcarrier cycle luminance shift, the picture quality will not be affected nearly as much as if when the components are separated, the chroma inverted, and the components reassembled. Color correction for a video signal is produced by the memory control during selected modes of the time base corrector by delaying the reference horizontal sync exactly ½ subcarrier cycle, thereby causing a timing shift of the video samples on that horizontal line. This results in an inversion of the chroma phase and the correct color being present in the output video.

Another aspect of the repositioning controls is that they provide flexability in TBC system configuration. The time base corrector to be described herein is modular in construction and has optional function function modules which can be inserted in the configuration or deleted. Each of these optional function modules cause a different but predetermined amounts of delay of the video signal as it is processed through the TBC. For different configurations, therefore, the overall delay through the TBC is different depending upon which modules are present and which have been deleted. It would be advantageous to have a particular fixed delay through the TBC because a predetermined advance of input video from output video should be maintained. Therefore, the memory control uses the vertical positioning control to delay the reference vertical sync a predetermined amount of time based on system configuration. The memory control will insert in the video timing the sum of the exact delays of any missing modules such that a base system with no optional modules has the same delay as a fully configured system.

The memory control uses the address control for another aspect of the invention which includes initiating reading and writing sequences of video data from controlled starting addresses. The address control includes a set of registers which can be loaded with a read address or write address which at a particular time can be preset into the read address counter and write address counter, respectively. This type of address control is advantageous for producing the correct color field sequencing for normal tape speed, freeze operations, and shuttle.

In the preferred embodiment the memory control receives information concerning the incoming tape field sequence and causes the writing of the frame memory to occur at predetermined locations. An odd incoming tape field is always written in one field block of frame memory and an even tape field is always written in a second field block of frame memory under regulation of the address control. In this manner the memory control can recognize where to obtain the specific even or odd field needed for reconstructing the color sequence in dependence on the desired reference signal. The memory control receives information concerning the outgoing reference field sequence which should be generated and causes reading of the frame memory to occur at predetermined locations to produce that sequence.

These and other features, and aspects of the invention will be readily apparent from, and more fully described by, the following detailed description, particularly when taken in conjunction with the appended drawings wherein:

BRIEF DESCRIPTION OF THE DRAWINGS

FIGS. 4A and 4B are pictorial diagrams of a standard composite color video signal of a NTSC TV standard;

FIGS. 5A and 5B are a pictorial representation of the standard 4 field color frame sequence and 8 field color frame sequence for a NTSC TV standard and a PAL TV standard, respectively;

FIG. 11A is a detailed electrical schematic of the input multiplexer of the timing corrector illustrated in FIG. 9;

FIG. 11B is a detailed electrical schematic of the write address counter of the timing corrector illustrated in FIG. 9.

FIGS. 14-1 and 14-2, respectively, are pictorial diagrams and timing waveforms for the read/write addresses of the word memory read/write control illustrated in FIG. 9;

FIG. 18 is a detailed electrical schematic of the tape horizontal timing circuitry of the timing control of the memory control function circuitry illustrated in FIG. 17;

FIG. 19 is a detailed electrical schematic of the reference horizontal timing circuitry of the timing control for the memory control function circuitry illustrated in FIG. 17;

FIGS. 26A and 26B are detailed waveform diagrams of the memory control signals of the DRAM read/write control illustrated in FIG. 25;

FIG. 27 is a pictorial representation of the address states for the line memory illustrated in FIG. 9, and a truth table for selecting read addresses based write addresses;

FIGS. 32A and 32B are detailed electrical schematics of the 7-segment displays and the bargraph display of the microprocessor control illustrated in FIG. 29;

FIG. 33 is a detailed electrical schematic of the memory map means of the microprocessor control illustrated in FIG. 29;

FIG. 34 is a detailed electrical schematic of the interrupt control of the microprocessor control illustrated in FIG. 29;

FIG. 35 is a detailed electrical schematic of the watchdog and wake up circuit of the microprocessor control illustrated in FIG. 29;

FIG. 37 is a detailed flow chart of the initialization routine called by the background routine illustrated in FIG. 36;

FIG. 38 is a detailed flow chart of the tape subroutines called by the background routine illustrated in FIG. 36;

FIG. 39 is a detailed flow chart of the reference subroutines called by the background routine illustrated in FIG. 36;

DETAILED DESCRIPTION OF A PREFERRED EMBODIMENT

Figure 1:
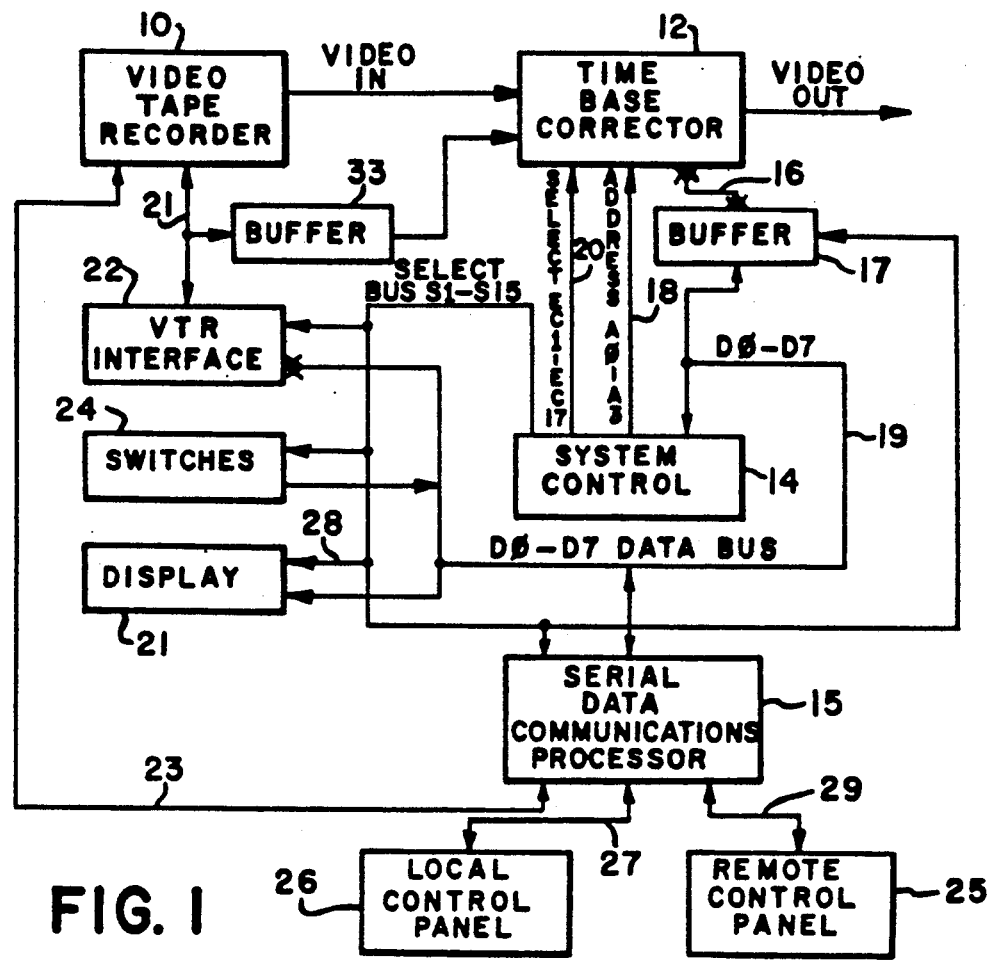
FIG. 1 is system block diagram of an information recording and reproducing system having a video tape recorder and a time base corrector with a memory arrangement and memory control constructed in accordance with the invention.

Referring now to the drawings, in particular FIG. 1, there is shown a time base corrector (TBC) 12 with a microprocessor based system control 14 which maps the system functions of the TBC into the memory space of the system control. The system control 14 communicates with the time base corrector 12 via a system bus comprising a bidirectional system data bus 16 having an 8-bit wide data path D0–D7, a system address bus 18 having four address selection lines A0–A3, and a system select bus 20 having a plurality of select lines EC1–EC17. The system control communicates with the system data bus 16 through a buffer 17 via a microprocessor data bus 19.

Video information, for example, in the form of a VIDEO IN signal from a video tape recorder (VTR) 10 or other reproducing device, is input to the time base corrector 12 and is output as a signal VIDEO OUT when the phase and frequency errors of reproducing the signal from the magnetic tape have been corrected. The system control 14 directs and controls this correction process by communicating commands and data information over the system data bus 16 to system control registers contained within system function modules of the time base corrector 12. Further, the system control 14 receives data and status information from system data registers within modules of the time base corrector 12 via the system data bus 16.

The direction of transfer and the selected system registers for reading or writing are chosen by information provided on the system address bus 18 and the system select bus 20. Real time control of the TBC 12 from the VTR 10 may be accomplished via a buffer 33 from a digital data path 21. Further information from the VTR 10 over the digital data path 21 may be input to the system control through a VTR parallel interface port 22. This VTR real time data may be processed before developing commands and information which are sent to the time base corrector 12. Additionally, a number of control switches 24 are provided to describe the system modes and other information needed by the time base corrector 12 for performing its operations. The switches 24, the VTR parallel interface port 22, and a display 21 are connected to a select bus 28 and communicate with the system control via the microprocessor data bus 19 in a manner similar to that described for the system function registers.

The system control 14 further communicates with a serial data communications processor 15 for inputting serial data to the device from either of the video tape recorder 10 via a serial data channel 23, from a local control panel 26 via a serial data channel 27, or from a remote control panel 25 via a serial data channel 29. The serial data channels 23, 27, and 29 connect to serial ports of the serial communication processor 15. A control panel (not shown) for the VTR 10 or the remote control panel 25 can be used via the serial data ports to control the TBC 12 with the system control 14 at locations remote from the actual apparatus. All three control panels are substantially similar in function and can be used interchangeably to control the TBC 12.

Figure 2:
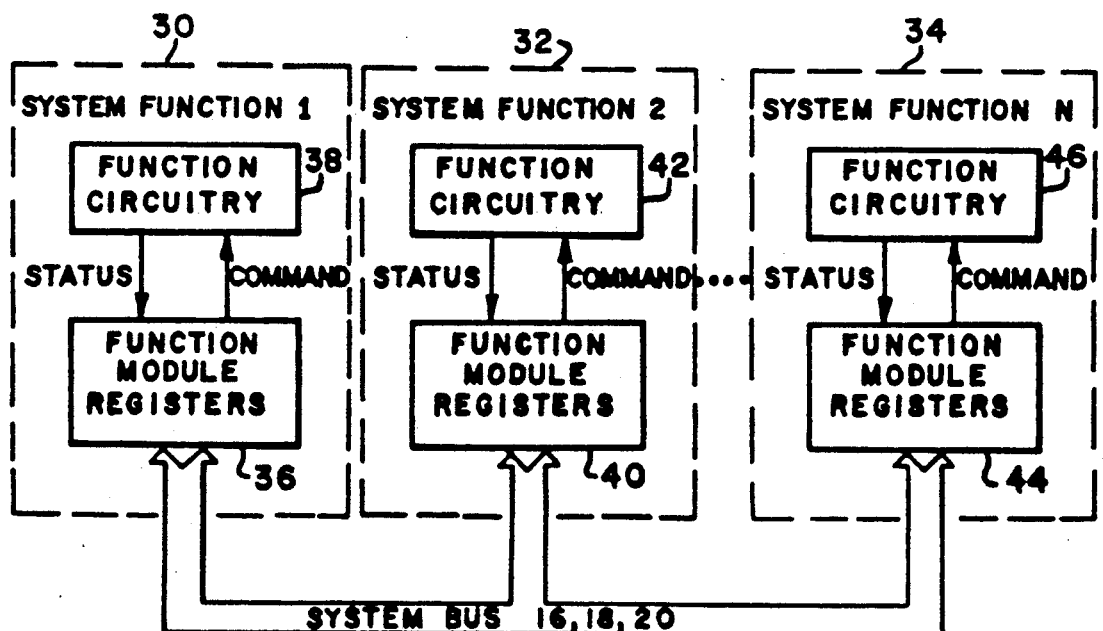
FIG. 2 is a functional block diagram of the modular construction of the time base corrector of the system illustrated in FIG. 1.

The functional circuitry of the time base corrector 12 is divided into modules 30, 32,...34, as shown in FIG. 2. The system function 1 is provided by the module 30 which contains function circuitry 38 and is controlled by data in control registers of the system function registers 36. The function circuitry 38 communicates status and data through data registers of the system function registers 36. This information is transferred to and from the system control 14 by the system bus 16, 18 and 20. Similarly, for system function 2, the module 32 contains function circuitry 42 and a set of system function registers 40 which provides for communication to the system control 14 via the system bus. In a similar manner, all of the system modules including module 34 for implementing system function N, containing function circuitry 46 and system function registers 44, are of similar construction. Each of the control messages or information is transferred to and from the modules 30, 32,...34 by the system control 14 through the memory mapping scheme communicated over the system bus. Each of the sets of system function registers for the respective modules allows data to be either read from or written to specific memory locations by the system control 14 to produce advantageous communications between modules, the system control and individual modules, and external peripheral devices and the modules.

The system function modules 30, 32,...34 providing actual TBC functions are hard wired to produce certain video data flows, control functions, and processing to form a TBC but are simpler than prior circuitry performing the same function as the processing of data between modules and/or control data can be passed through and processed by the system control 14.

Figure 3:
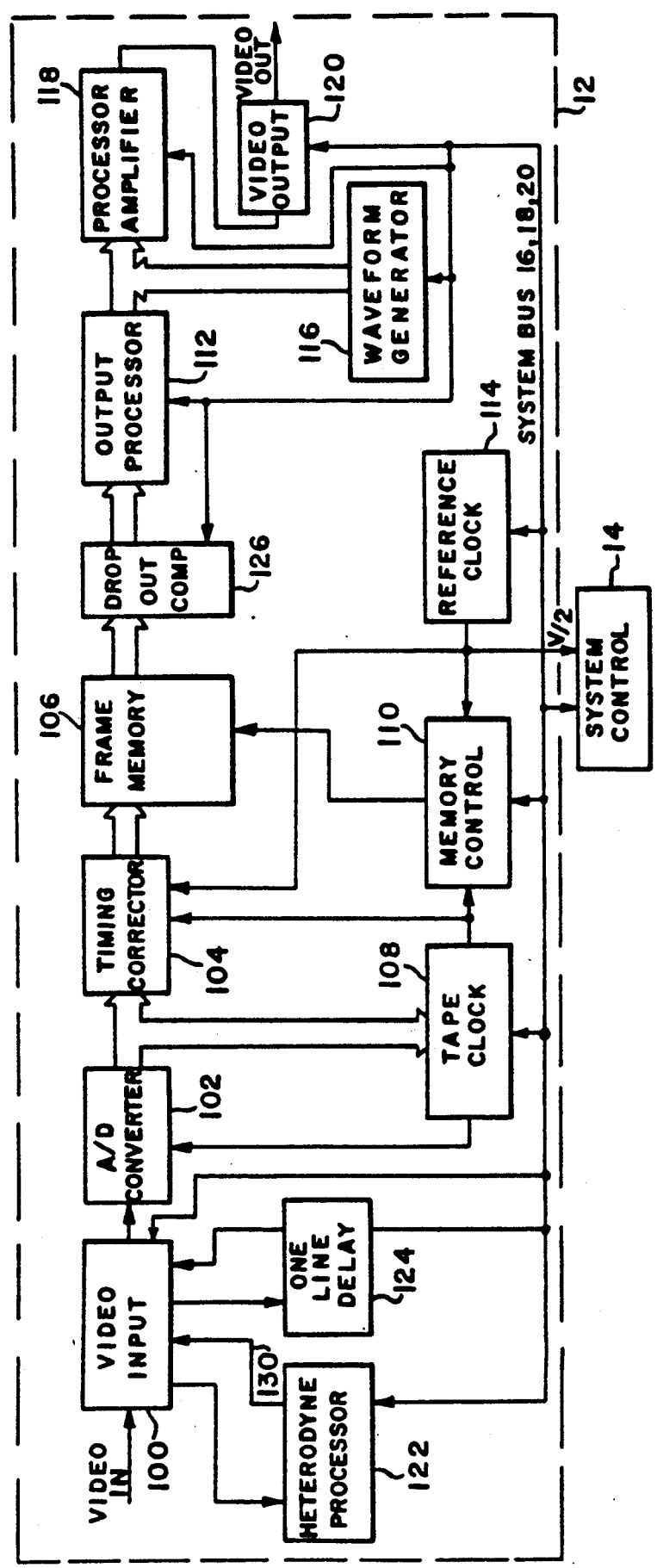
FIG. 3 is a detailed functional block diagram of the time base corrector of the system illustrated in FIG. 1 showing a particular configuration of function modules.

A time base corrector 12 formed of a plurality of system function modules is more fully illustrated in FIG. 3. The video input signal which is normally an analog composite color signal of a particular TV standard (NTSC, PAL, PAL M, SECAM), enters a video input module 100. The video input module 100 performs the function of signal conditioning such as filtering and clamping, and extracting synchronizing components from a composite color video signal from a source such as the VTR 10. By active video signal, what is meant is those data which contain picture (luminance and chrominance) information rather than control and timing information. The analog to digital converter module 102 converts the analog video signal into digital samples at some specified multiple of the subcarrier frequency fsc in this example, 4 fsc.

These digital samples are transmitted to a timing-corrector module 104. The timing for the A/D conversions and input to the timing corrector 104 are produced by a tape clock module 108 which receives the converted samples to generate a tape clock signal including any time base errors, representing exactly timing positions of the incoming analog signal. The timing corrector 104 uses the tape clock 108 and a reference clock 114 to correct relatively fine timing errors in the digital samples and passes the samples on to a larger video data memory 106 which can be large enough to store a video frame (525/625 horizontal lines depending on the TV standard). The writing and reading from the video frame memory 106 is under the direction of a memory control module 110 which writes the digital data samples from the timing corrector 104 into the memory 106 and reads them from that memory with a frequency stabilized and phase error free clock signals generated by the reference clock module 114. The reference clock signals of the module 114 are input to the memory control 110 along with the clock signals from the tape clock 108 to provide the synchronized writing and reading necessary for the frame memory 106 to correct gross time base errors.

The digital samples are then input to a processor amplifier 118 where they are multiplied by a video gain value supplied by the system control 14. The system control 14 also supplies a black level value which is added to the video data. The video data is combined with data representing the synchronizing horizontal and vertical pulses, the burst frequency and those other control patterns (depending on the TV standard) of a composite color signal which were stripped in the process of time base error correction. The digital composite color video signal is then output to the video output module 120. The video output module 120 performs digital to analog conversion and conditioning to provide a video output for utilization devices connected to the signal VIDEO OUT. The system control 14 communicates with all these modules over the common system bus to provide information acquisition, control, and processing between the modules.

Because of the modularity of the system function modules, new operations and capabilities can be included in the TBC without completely redesigning the basic modules. Modifications may be made to the system concept without interrupting the functions already included therein and can be safely integrated with a minimum of design change. For example, in FIG. 3 optional modules include a heterodyne processor 122 that receives the input video signal having a color subcarrier which is incoherent with respect to its horizontal sync pulses and processes such a video signal so that it may be returned to the video input module 100 via connecting path 130 in a coherent manner. Similarly, for other functions a one line delay 124 normally takes the input video signal and delays such information for one horizontal line of the video before returning the video signal to the video input module 100. A third function which can be added is a dropout compensation module 126 disposed between the memory module 106 and an output processor module 112. The dropout compensation module 126 corrects dropout errors caused by physical defects in the tape or loss of head to tape contact during scanning. These dropouts or missing portions in the incoming video signal are identified and corrected in this module before passing the data samples on to the output processor module 112. The optional output processor module 112 performs color correction, and vertical interpolation for color processing of video signals from the VTR 10 which are of nonstandard speed. Nonstandard speed means such operations as forward and reverse shuttle, fast forward and slow motion, or still frame modes of operations for the VTR 10.

As was the case for the previously described modules, the additional modules are connected to and communicate with the system control 14 via the system bus. They additionally contain system function registers which enable them to receive commands and data from the system control 14 and deliver data and status information to the system control. The flexability of configuring a TBC with a memory mapped system control is readily evident. Optional modules for other functions can be added or deleted as the system user determines a need. In general, each module communicates with the processing module upstream and downstream from it in the video data path flow, with the particular clocks for the timing signals, and with the system control 14 over the system bus. Control or transfer information between widely separated modules in the video data flow path is handled either by the system control or within the respective module itself.

Particular system function modules of the TBC 12 which comprise the present invention include the timing corrector module 104 containing a small capacity memory, the frame memory module 106 containing a large capacity memory, and the memory control module 110. These modules are used to retime the video data samples from the unstable time base to the reference time base in a highly accurate manner and further are used to position the video signal horizontally and vertically for color correcting, output picture positioning, and system configuration delay adjustment. The memory control module 110 is used to accurately control the addresses at which the frame memory 106 is written into or read from for correcting phase errors in horizontal or vertical positions. In addition, these functions can be accomplished for the common TV standards of NTSC, PAL, PAL M, and SECAM.

Generally, the timing corrector module 104 is used to retime the video signal with a random access memory (RAM) from a fast tape clock to a fast reference clock for subcarrier phase errors. The time base errors of horizontal frequency and phase are then corrected in a longer delay RAM of the timing corrector module 104 for all VTR speed modes except shuttle before the video data is output to the frame memory 106. The frame memory 106 is used to correct for gross errors of vertical phase and further to correct for horizontal phase error when the VTR is not in shuttle. The frame memory 106 is also controlled by the memory control module 110 to accomplish address manipulation and timing for horizontal and vertical positioning control.

Because the TBC 12 will correct time base errors of the four most common TV standards, some of the characteristics of these standards will be more fully detailed to help with an understanding of invention. An analog composite color video signal of an NTSC TV Standard is illustrated in FIGS. 4A-4B. The main timing components of the signal are the horizontal and vertical sync pulses defining the start of a horizontal line and a field, respectively. In an NTSC system, a television frame comprises 525 horizontal lines divided into two fields and horizontal synchronizing pulses occur at a rate of about 15,734 Hz. which means that the period between successive pulses is approximately 63.5 microseconds. The vertical synchronizing and blanking pulses in the NTSC system occur at a 60 Hz. frequency. The chrominance information is amplitude and phase modulated on a subcarrier signal having a frequency fsc of about 3.58 megahertz (MHz.). Luminance is amplitude modulated on the signal during the active video portion of the signal. In other TV standards, for example, PAL and SECAM the vertical synchronizing and blanking rate is 50 Hz. and 625 horizontal lines comprise a frame of two fields. In these TV standards color subcarrier frequency is approximately 4.43 MHz.

The subcarrier frequency of 3.58 (4.43) MHz. will often be referred to herein simply as fsc which means 1 times the subcarrier frequency and, similarly, other commonly used clocking frequencies in the described apparatus include 2 fsc, ⅔ fsc, 2/5 fsc, and 8 fsc. A 4 times subcarrier frequency (4 fsc) often occurs because during sampling of the analog composite video signal for digitizing the signal, a sampling rate of 4 times the subcarrier frequency, i.e., 14.32 MHz. for NTSC is used.

Because of the relationship of the color subcarrier phase with respect to horizontal sync, NTSC composite color signals have a four field color sequence, which is commonly referred to as a color frame. In other TV standards, such as PAL, an eight field color sequence forms a color frame.

As shown in FIG. 5A, the NTSC color frame is formed of two video frames each having an odd and an even field. Each field comprises 262 ½ line horizontal video lines. Because each horizontal line is an odd number of subcarrier cycles, fsc=455/2 fh, the same field having the same line type at the same line position will repeat periodically every four fields. Because there are 2 line type signals for NTSC, the reference H and reference H/2 signals as shown in the waveforms of FIG. 5A will completely describe the different types of horizontal lines for an NTSC system. With respect to a PAL TV standard, an eight field color sequence forming a color frame is illustrated. Four video frames of 625 horizontal lines each, each frame having two fields, comprise the sequence. In this color sequence, there are four different types of horizontal lines because of the phase relationship of the subcarrier frequency to the horizontal frequency, i.e., fsc=1135/4 fh. These four line types can be defined by the reference H signal in combination with the reference H/2 and reference H/4 signals as shown in the waveforms of the FIG. 5B.

Figure 6:
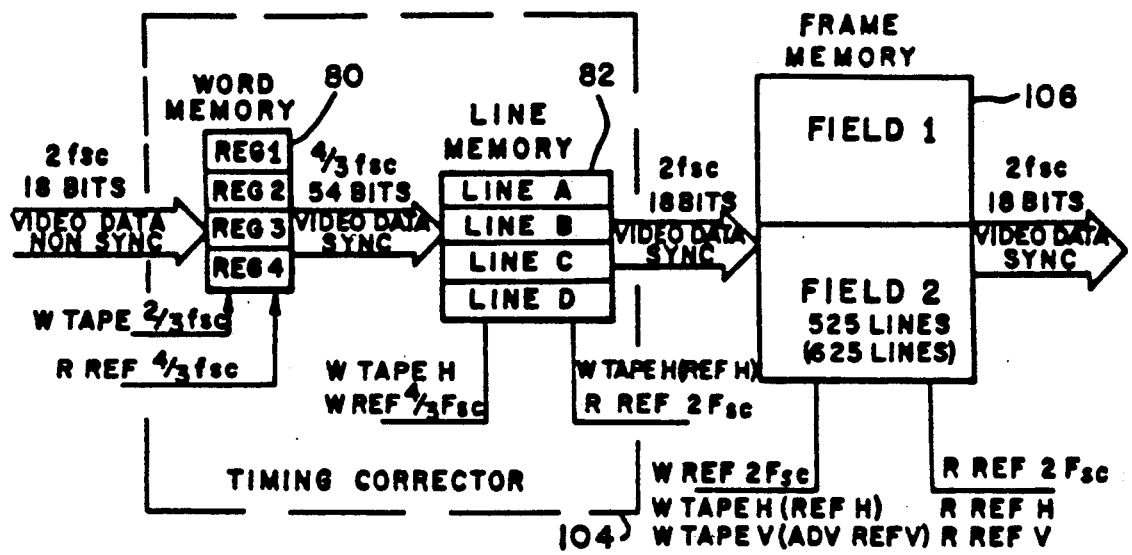
FIG. 6 is a functional block diagram of video data sample storage areas of the timing corrector and frame memory of the time base corrector illustrated in FIG. 3.

FIG. 6 is a functional block diagram of the video data path and data storage of the timing corrector 104 and the frame memory 106. The small capacity memory of the timing corrector 104 is divided into a word memory 80 and a line memory 82. The word memory 80 consists of three 4-word register files (with only one being shown in FIG. 6) of random access memory which can be read from and written into at an extremely fast data rate. A word comprising 18-bits of video data in a non-synchronous condition including the time base errors of the VIDEO IN signal enters one of the registers REG-1-REG4 depending upon a write address at the tape ⅔ fsc clock rate. A data word is then read from one of the registers REG1-REG4 at a rate which can approach the reference 4/3 fsc clock rate by a read address. The reference 4/3 fsc clock rate is reduced or varied in average frequency so that the data rate read from the word memory 80 can follow that of the incoming data but also so that each sample can be retimed to a cycle of a reference clock. The ⅔ fsc and 4/3 fsc rates for reading and writing are caused by the X3 multiplexing and are nominally 2 fsc, 4 fsc respectively.

From the word memory 80, the video data samples which are now in synchronism with the reference fsc clock are input to line memory 82 where four horizontal lines A-D of data are stored. The line memory 82 stores data words from the register files in blocks of three at a rate which can approach the reference 4/3 fsc frequency rate. However, the same clock used to read the word memory 80 is used to write the line memory 82. The line memory 82 thus receives all the data input from the word memory 80 in increments of horizontal lines at the input data rate. Each horizontal line begins with the start of active video data indicated by signal TAPE H and ends a predetermined number of write clock cycles (data samples) later. The data samples are retimed in the line memory 82 by reading them out with a REF ⅔ fsc signal at either the TAPE H or the REF H rate depending upon the incoming data rate as determined by the mode of the VTR 10. From the line memory 82, the video data are multiplexed into a serial data stream of words at the 2 fsc rate.

This data stream at the 2 fsc rate is then demultiplexed into blocks of 5(6) words and loaded into the large capacity memory 106, preferably a frame memory, at a block rate of 2/5 fsc. The horizontal lines stored in the line memory 82 are transferred line by line to the frame memory 106 to fill up field 1 of the memory, and then are transferred line by line to fill up field 2 of the memory. The rate of transfer is either at the TAPE H or REF H rate depending upon the VTR mode.

Each field is transferred synchronously with the TAPE V signal indicating the beginning of a field of incoming data or alternatively at a rate equivalent to the ADV REF V signal rate which is substantially equal to the TAPE V rate depending upon VTR mode. The data samples are read from the frame memory 106 in 5(6) word blocks at the 2/5 fsc frame block rate and then multiplexed into the video bus rate of 2 fsc. The frame memory is read line by line synchronously with the horizontal reference signal REF H. Each field is also read synchronously from frame memory 106 with the reference vertical signal REF V rate.

Figure 7:
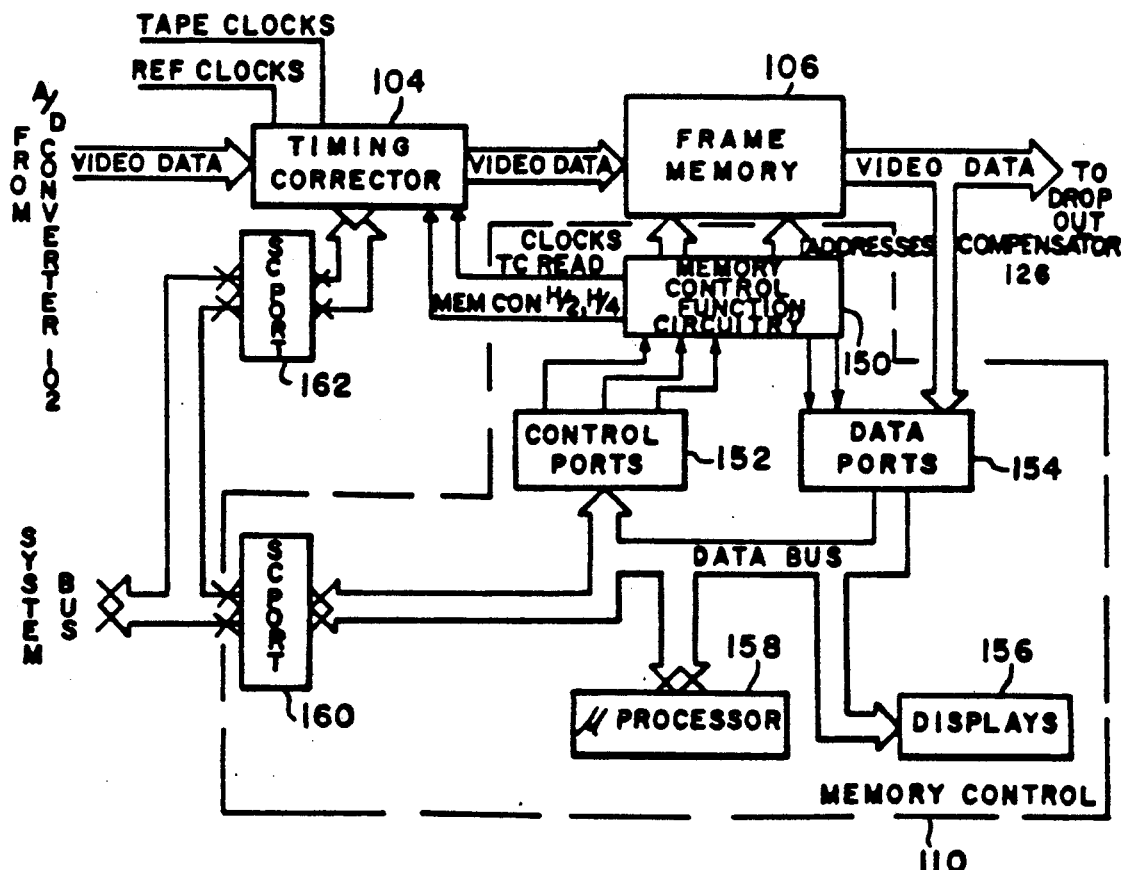
FIG. 7 is a system block diagram of the memory control function circuitry and microprocessor controller for the memory control illustrated in FIG. 3.

With attention directed to FIG. 7, the timing corrector 104 is basically under control of the tape and reference clocks to produce the retiming of the video signal to the reference signal. The timing corrector 104 corrects the data samples for subcarrier phase errors and for horizontal frequency and phase errors. The timing corrector 104 communicates with the system control 14 via the system bus and a system control port 162 to provide status information and to receive control data. The control data received by the timing corrector 104 indicates whether the one line delay module 124 is present and which TV standard is being used. The system control port 162 comprises the system function registers for the corrector module 104. Further, the timing corrector 104 receives a signal TCRD pulse from the memory control 110 indicating the beginning of a horizontal line and signals MEM CON H/2, H/4 are generated from the memory control to indicate the type of horizontal line which is to be transferred to the frame memory 106.

The memory control 110 basically supplies these timing and line type signals to the timing corrector 104 and further controls the frame memory 106 with a plurality of clock signals and read/write addresses. The memory control 110 is a microprocessor based control which includes memory control function circuitry 150 regulated by a microprocessor 158. The microprocessor 158 controls the function circuitry 150 via control ports 152 and receives information about the frame memory 106 and the video data exiting the memory through data ports 154. The microprocessor 158 can use a number of displays 156 which will be more fully described hereinafter, to alert an operator of particular operating conditions of the frame memory 106. The microprocessor 158 is also connected by a data bus to a system control port 160 which communicates with the system control 14 via the system bus. The system control port 160 comprises the system function registers for the memory control module 110.

Figure 8:
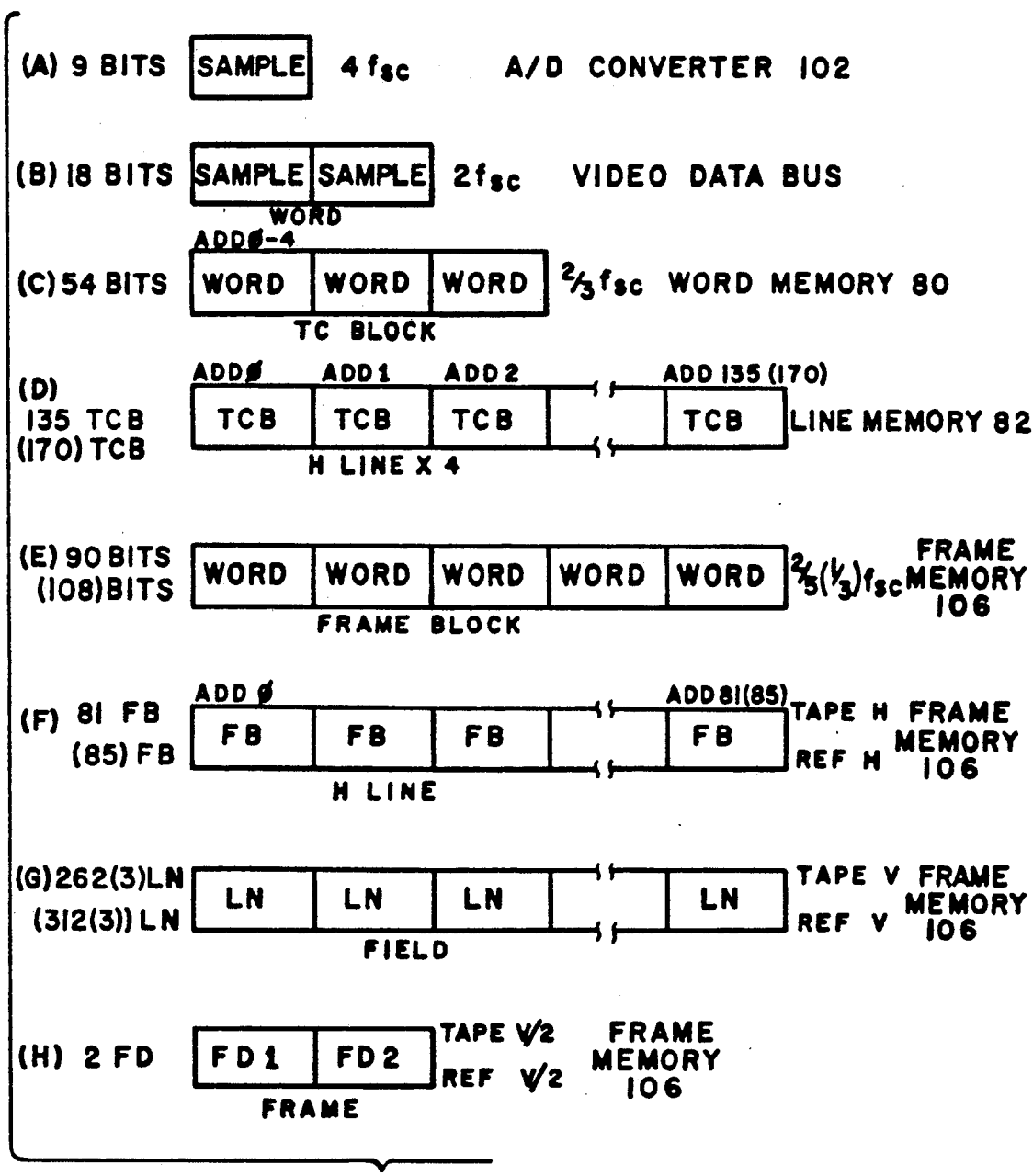
FIG. 8 is a pictorial representation of the format of data sample storage and data rates in the timing corrector and frame memory of the time base corrector illustrated in FIG. 3.

To more fully understand the memory arrangement and control, it will be instructive to determine how the digital data samples are stored and transferred to and from each of the three memories 80, 82, 106. Because each memory, including word memory 80, line memory 82, and frame memory 106, are random access memories, their interfaces and addressing schemes will dictate many of the operations of the memory control 110. In FIG. 8, there are shown pictorial representations (A-H) of the format in which the information is stored in each of the memories and the data rates at which it is transferred between memories. In general, analog video signal entering the A/D converter 102 is transformed into 9-bit samples (A) of digital data at a tape 4 fsc rate by the tape clock. These digital samples represent the analog value of the composite color video signal at the particular sampling time resolved 9-bits. The samples could, of course, represent the direct output of a digital reproducing apparatus without the A/D conversion.

Since a data rate of 4 fsc is extremely high for processing, the data are assembled into a data word (B) of two samples having 18-bits for a video bus path. The video bus rate is ½ of the sample rate or 2 fsc and is basic data rate for passage of the video information through the TBC 12.

However, even the 2 fsc rate is higher than many fast integrated circuit memories can process, and the basic 18-bit words are, therefore, assembled into a 3-word TC block (C) after being input to the timing corrector 104. This is a data rate of ⅔ fsc which is presented to the word memory 80. The word memory outputs the data samples in TC blocks (C) at the ⅔ fsc frequency to the line memory 82. The line memory 82 is divided into four line areas each allocated to store the number of TC blocks corresponding to one horizontal line. Each horizontal line in the line memory 82 comprises 135 (170) TC blocks depending upon the frame length 525 (625) lines of the TV standard. In general for a NTSC TV standard a horizontal line is 455/2 subcarrier cycles in length or 910 samples at a 4 fsc samples rate. However, the active video portion is only a part of the total signal and only 810 (135×6) samples are used with the horizontal blanking containing no information. The horizontal blanking interval is used for retiming in the line memory 82 as will be more fully described hereinafter. Because the line memory 82 contains 4 horizontal lines, the memory is 4 ×135 (170) addresses in length and substantially 1 TC block or 54 bits wide. The data are read back out of the line memory 82 at the ⅔ fsc or 54-bit block rate and are multiplexed or serialized into the 2 fsc 18-bit word rate.

The data which are read out in words from the line memory 82 are reassembled into frame memory blocks (E) before being input to the frame memory 106. The basic frame block of the frame memory 106 is 5(6) words of 90 (108) bits depending upon whether the input video is a 525 (625) line standard. This allows the data rate to be slowed down for the DRAM semiconductor integrated circuit chips used to implement the frame memory 106 to a rate of ⅔(1/3) fsc. Thus, every frame memory block of 90 (108) bits corresponds to an address of a single location of the frame memory 106. The frame memory 106 stores these frame blocks (FB) in increments of horizontal lines of the video signal. Each horizontal line (F) of the video signal comprises 81(85) FB depending on the TV standard. One complete TV picture or frame consists of two fields which contain either 262½ or 312½ lines LN depending upon the TV standard used. However, the memory 106 o cannot end a field on a half line because of the block transfer, so field 1 is arbitrarily set as 262(312) LN and field 2 is set as 263(313) LN(G). Further, the frame memory 106 stores two of these fields in a frame (H) which comprises a first field, FD1, and a second field, FD2, corresponding to the odd and even fields of a video signal.

The horizontal lines stored in the frame memory 106 are written into the memory beginning with the tape horizontal or reference signals and are read out of the frame memory beginning with the reference horizontal signals. The fields of the frame memory 106 are written synchronously with the tape vertical signal and are-read out of the memory synchronously with the reference vertical signal.

Figure 9:
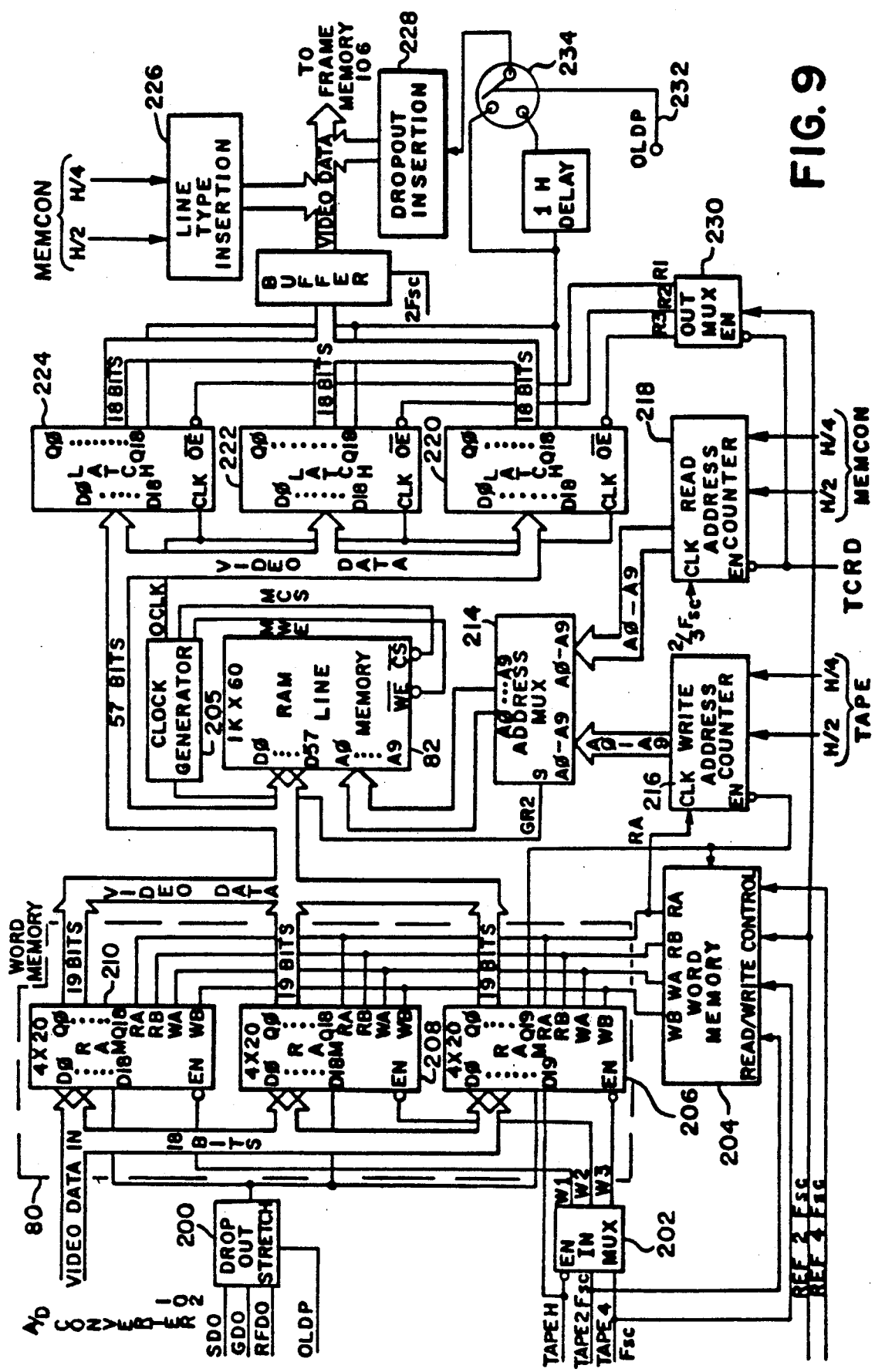
FIG. 9 is a detailed electrical schematic, partly in block form, of the timing corrector of the time base corrector illustrated in FIG. 3.

FIG. 9 is an electrical block diagram of the timing corrector 104 which comprises the word memory 80, the line memory 82, and their associated control circuitry. Video data enter from the A/D converter module 102 into the word memory 80 and are loaded thereafter into the line memory 82 wherefrom they are output to three output latches 220, 222, and 224. From the output latches 220, 222, and 224, the data are clocked synchronously into the frame memory 106.

Incoming data at the tape 2 fsc data rate are input to the D0–D17 data inputs of three 4-word register files 206, 208 and 210 of random access memory. A dropout interval, extended by a dropout stretching circuit 200 from dropout signals SDO, GDO and RFDO, is input to data inputs D18 of the RAMS 206, 208, 210. The tape horizontal write pulse TAPE H is input to D19 of RAM 206 to delay the start of writing of a horizontal line into the line memory 82 for the same amount of time that the data is delayed in the register files 80. The TAPE H signal is generated by the tape clock module and defines the start of active video of a horizontal line.

The word memory 80 is comprises the register files and is clocked at a submultiple of the subcarrier frequency rate including tape ⅔ fsc and reference 4/3 fsc. The input data are demultiplexed into the separate RAMS 206, 208, and 210 by an input multiplexer 202 which generates demultiplexer signals W1–W3 to the respective enable inputs EN of each RAM. The multiplexer 202 generates these enabling signals from the tape horizontal sync pulse TAPE H which resets the timing and the tape clock frequency signal, tape 2 fsc which is the incoming data rate. In this manner, the incoming video data which is at the video data bus frequency of tape 2 fsc is demultiplexed down to a frequency of tape ⅔ fsc.

One third of the data is stored in each of the RAMS 206, 200, and 210, each having four memory locations of a word length (18 bits), each of which can be read from and written into by generating read addresses RA, RB and write addresses WA and WB. The read and write addresses are generated by a word memory read/write control 204 which is clocked for writing by the TAPE ⅔ fsc frequency and is clocked for reading by a clock at the same average frequency at times synchronous with the clock of REF 4/3 fsc frequency.

In general, the word memory read/write control 204 can generate the read addresses at an average rate up to reference 4/3 fsc and and generates write addresses at a frequency of tape ⅔ fsc. The tape ⅔ fsc frequency and hence data rate is not a fixed frequency, but varies for the various speed modes of the VTR 10 from approximately 0.5× reference ⅔ fsc in reverse shuttle, to approximately 1.5× reference ⅔ fsc in forward shuttle. The read clock has the capability of adequately keeping up with this data rate change for the fastest tape ⅔ fsc rate.

If the read address counter were clocked directly at the 4/3 fsc rate the read address would often overlap the write address for the normal play speed of a VTR. However, special inhibiting circuitry for the read address generation is provided to skip read clock cycles if the address to be read from is presently being written into. In this manner, the read address can be generated according to a slow or rapid data write rate without address conflict. A small memory, having fast access and addressed by the above described write and read addresses, can be used to retime data from an unstable and varying incoming rate to a read clock having the same average data rate as the write (tape) clock but at an exact phase of the read clock which is stabilized to the reference.

The retimed data in 57-bit (3 data words, 3 dropout interval bits) combined words are written into the 4-line RAM 82 under control of an address multiplexer 214 and control clock signals enabling the chip select input *CS and write enable input *WE of the RAM 82. The address multiplexer 214 multiplexes the write address of the memory 82 from a write address counter 216 with the read address of the memory from a read address counter 218. The write address counter 216 is clocked from the word memory read/write control 204 by signal RA to synchronize the writing of the line memory 82 with the TC block of data output from the word memory 80. Once the clock has been written into the line memory 82, the word memory read/write control 204 clocks the write address counter 216 to address the next memory locations.

The write address counter consists of two parts, one being addressed in increments of TC blocks corresponding to 1 horizontal line, and the second one being addressed in increments of 1 horizontal line within the available four line memory space. After addressing all 135 block locations of one line, the counter proceeds to the next line and then continues to address blocks and lines until al four lines have been stored. At that point, the write address counter 216 begins another cycle to load the next four video lines in the memory 82. Each horizontal line begins loading the line memory with the TAPE H pulse which was delayed through RAM 206 and ends 135 TC blocks of data later. The line type, as indicated by the TAPE H/2, H/4 signals generated by the tape clock module 108, is used to select the line address or the starting address of each sequence. Because there are four line types for PAL, PAL-M and two line types for NTSC, SECAM four line locations permit every line type to be stored at the same line location address every cycle.

Conversely, the read address counter 218 having the same structure as the write address counter, is clocked at the reference ⅔ fsc rate presents a read address at the address inputs A0–A9 of the address multiplexer 214. The read addresses are synchronized to the horizontal rate by the TC RD pulse from the memory control. The TC RD pulse indicates that the line memory 82 should begin reading out a horizontal line. The TC RD pulse is either substantially coincident with either the TAPE h pulse or the REF H pulse depending upon the mode of the VTR. The particular horizontal signal used is synchronized to the nearest start of a memory cycle of the frame memory 106 to become the TC RD signal. The read address counter 218 receives the signals MEM CON H/2, H/4 from memory control to select which line type is to be read out of the line memory 82 synchronously with the TC RD signal. Because the line memory 82 is written in specific locations for line type, the memory control knows which line type is in a specific location. The signals MEM CON H/2, H/4 therefore select an address and memory control generates these signals to prevent address conflict.

The address multiplexer 214 applies the read addresses signals to the address inputs A0–A9 of the RAM memory 82 causing a 57-bit TC block of data to be output to data latches 220, 222, and 224. The data output from the RAM memory 82 are latched in parallel to the three latches 220, 222, and 224 by the output clock OCLK provided by the clock generator 205. Once the data samples are latched in the output latches 220, 222, and 224, they can be multiplexed according to an output multiplexer 230 which generates multiplexer address signals R1-R3 to the output enable inputs *OE of the latches 220, 222, and 224. The signals R1-R3 multiplex the data of each TC block into the video data having an 18-bit word at the 2 fsc rate.

A line type insertion circuit 226 receives the line type signals MEM CON H/2 and H/4 which are indicative of the line types which will be read from memory 82 and passed along the video data bus and inserts these two bits in the data stream at a location in the horizontal blanking pulse starting that line. Further, any drop out interval is detected from the Q18 output of each of the output latches 220, 222, and 224 to enable a dropout insertion circuit 228 to load a data word of zero into the data stream if a dropout interval is present. The dropout compensator module which follows the fame memory 106 on the video data bus recognizes this all zero data word at a particular sample position and performs correction. Depending upon whether the one line delay module is present, as determined by the logic level of a signal OLDP on line 232, the dropout interval can be delayed one horizontal line such that the dropout insertions can be positioned correctly.

Figure 10:
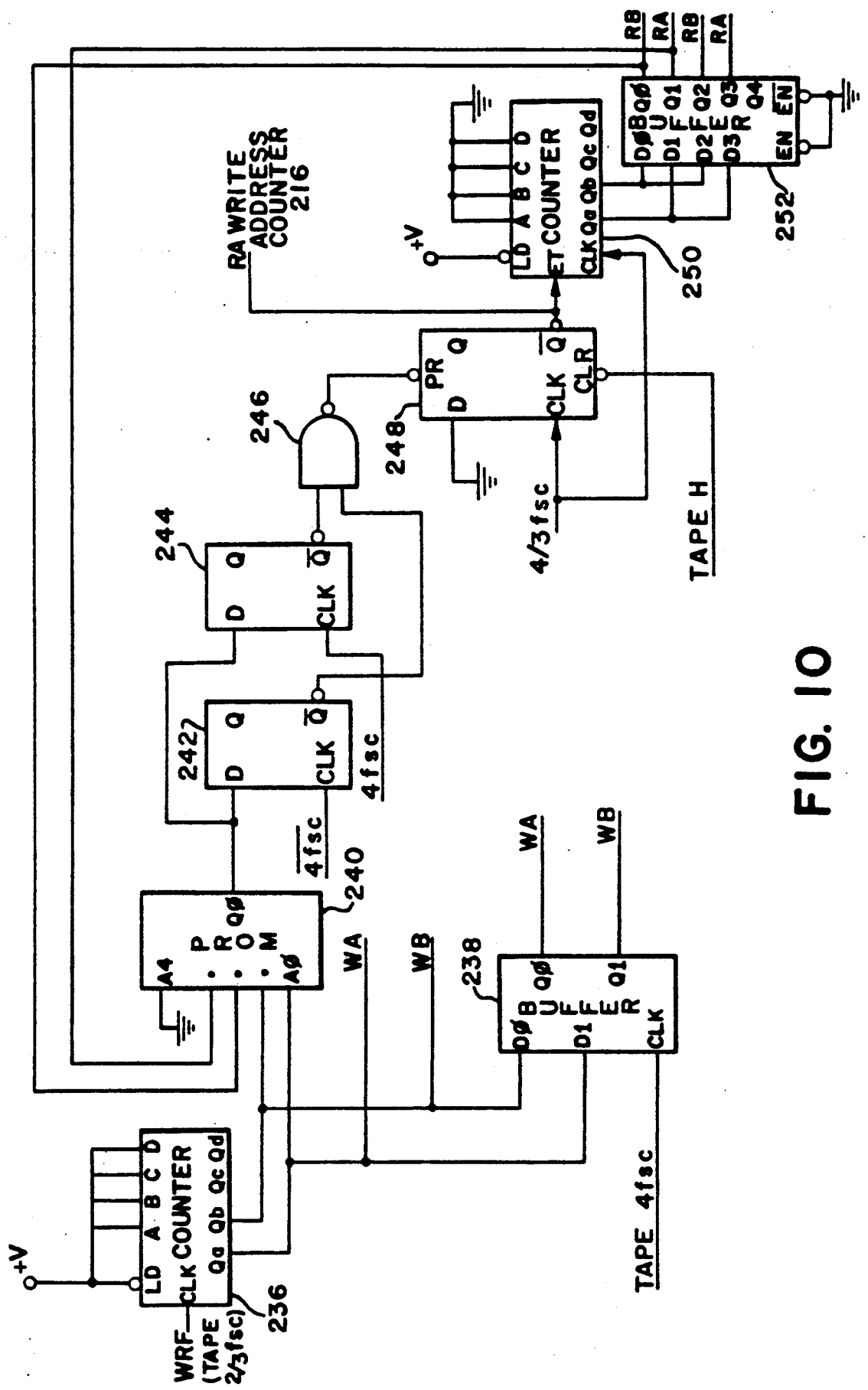
FIG. 10 is a detailed electrical schematic of the word memory read/write control of the timing corrector illustrated in FIG. 9.

FIG. 10 is a detailed electrical schematic of the word memory read/write control 204. The write addresses WA and WB for word memory 80 are generated by a counter 236 from its QA and QB outputs and the read addresses RA and RB are generated from a counter 250 from its QA and QB outputs. The write counter 236 is clocked by a signal WRF which is at the tape ⅔ fsc rate and coincident with the input multiplexer signal W2 (FIG. 11A). This clock signal allows the RAM memory 208 of the word memory 80 to be written into at the same time it is enabled. In this manner, the counter 236 will change the write address WA, WB for the register files 206, 208, and 210 every 3 input data samples at the tape ⅔ fsc clock rate. Thus, the first word of the video data is written into register 1 of the first file, the second word is written into register 1 of the second file, and the third word is written into register 1 of the third file. The next three words are written into register 2 of the first, second, and third files, respectively. The loading continues sequentially until the 13th, 14th, and 15th input words cause a wrap around and data to be written in the register 1 of the first, second, and third register files, respectively. Similarly, the read address counter 250 will generate read addresses RA and RB to read registers 1 of all three files simultaneously, to then an address to read registers 2 of all three files, registers 3, etc. This reading operation occurs synchronously with the reference 4/3 fsc clock when the counter 250 is enabled by a high logic level from the *Q output of a D-type bistable 248. Generally, at the start of each horizontal line, the tape horizontal write signal TAPE H clears the bistable 248 to allow the read address counter 250 to sequentially address the RAMS 206, 208, and 210. This enable signal from the *Q output also clocks the write address counter 216 for the line memory 82.

However, because the data samples can be read from the memory 80 at a higher clock speed than they are being written into the memory, the read clock will attempt to catch and overtake the write clock which is nominally at ½ of the read clock speed. An inhibit means including a PROM 240, D-type bistables 242 and 244, and a NAND gate 246 prevent this overtaking and address conflict of accessing the same memory location of the register files for reading and writing. The PROM 240 has address inputs A0-A4, of which A0, A1 are connected to the write address outputs of the counter 236 and A2, A3 are connected to the read address outputs of the counter 250. The PROM 240 determines the present addresses of the write counter 236 and the read counter 250 and provides an inhibit signal from its Q0 output if the read counter is about to overtake the write counter. This inhibit level is debounced to remove the edge transitions of the PROM 240 by the bistables 242 and 244 by clocking the leading edge of the inhibit through the bistables with both edges of of the reference clock 4 fsc. These levels are decoded by the NAND gate 246 to apply an inhibit level to the PR input of the bistable 248. This level will cause the bistable 248 to set, thereby inhibiting the read counter 250 for one cycle. However, since the D output of bistable 248 is connected to ground the counter 250, the next reference 4/3 fsc clock pulse will again cause the counter 250 to increment the read address if the preset level is removed. This occurs at the next write address transition which does not cause a conflict with the present read address.

FIG. 11A is a detailed schematic of the input multiplexer 202 for the timing corrector 104. A 4-bit counter 268 is configured to divide by three by having its preset inputs A through D connected to a starting value of 13 which is reloaded every time the counter reaches a count value of 15. The load signal is generated by the output of a NOR gate 266 either from an overflow signal from the RC output of the counter 268 or from the tape horizontal write pulse TAPE H via an inverter 264. The counter 268 is enabled by the tape 2 fsc clock via an inverter 260 and a second inverter 261 connected to the enable input ET. The clock input of the counter 268 is connected to the tape 4 fsc clock and, therefore, it increments the count at tape the 2 fsc rate when both signals are coincident. This binary count is output from the QA and QB outputs of the counter, decoded by gates 270, and buffered by a buffer 272 to become the input multiplexer signals W1-W3. The input multiplexer signal W2 (WRF) which occurs once every three sample periods of tape 2 fsc is used to clock the write address counter 236.

The write address counter 216 for the line memory 82 is more fully detailed in FIG. 11B. The counter comprises an 8-bit address counter including counters 274 and 276 which are connected to form one device. The counter is configured to count from a predetermined set number at the rate of signal RA and then halt. This is accomplished by the overflow output RC being conducted to an inverter 275 which disables the inputs EP of counter 274 and counter 276. The write address counter will then begin a count from a preloaded value as determined by the logic levels applied to inputs A through D of both counters. This preloaded number can be changed depending upon the number of TC blocks per line in the selected TV standard as indicated by the signal 525/625 which is input from the system control. The write address counter 216 will, therefore, address all block locations of one horizontal line being written into the line memory 82 before it halts.

This writing will be synchronous with the 4 fsc clock and at times determined by the enable signal RA applied to the ET input of counter 274. This produces a synchronous writing in the RAM 82 which is coupled with the reading from the register files 206, 208, and 210. At the beginning of a horizontal line, after being delayed through the register file, the load write counter signal LDWRITE (TAPE H) is generated to begin the write address cycle for writing the next line. The particular line (or address sequence) in the memory which is written into is determined by the signals TAPE H/2, H/4 which are input to the preset inputs A,B of a counter 278. The TAPE H/2,H/4 signals are loaded synchronously with the signal LD WRITE to form a complete line address. The outputs of the counter 278 are the write address lines WA8 and WA9. These signals cause the data being written into the memory 82 to be stored at particular horizontal line addresses for the line type represented by tape H/2, H/4.

Figure 12:
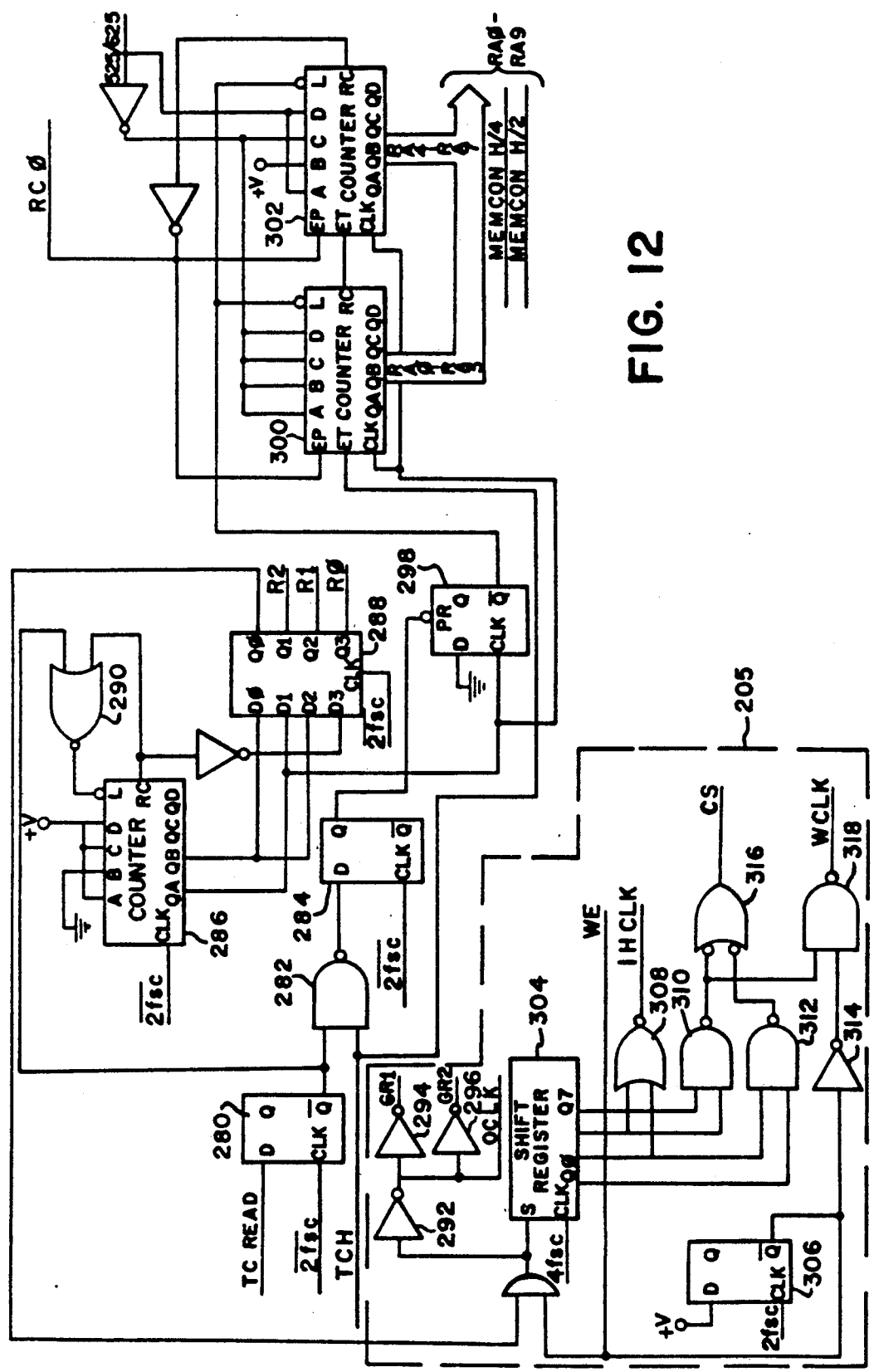
FIG. 12 is a detailed electrical schematic of the read address counter, output multiplexer, and clock generator of the timing corrector illustrated in FIG. 9.

FIG. 12 is a detailed schematic of the clock generation circuit 205, the output multiplexer circuit 230, and the read address counter 218 for the timing corrector block diagram shown in FIG. 9. The output multiplexer 230 is similar to the input multiplexer in that a counter 286 divides the clock signal reference 2 fsc by three to generate the read multiplexer signals R0, R1, and R2. These signals are clocked through a latch 288 to provide a synchronous output with respect to the 2 fsc clock. The counter 286 is reset to count to three by having its load input connected to an NOR gate 290 which causes recycling every time the three multiplexer signals are generated. The counter 286 is started at the beginning multiplexer signal R0 when a TC RD signal sets a D-type bistable 280. The TC RD signal is generated by the frame memory function circuitry 150 to indicate that a line of video data should be read out of the line memory 82 and into the frame memory 106. Thus, the multiplexer signals cause the video data which were output from the line memory 82 to be clocked from the latches 220, 222 and 224 in a synchronous manner.

The read address counter 218 is clocked by the R2 multiplexer signal which is at the ⅔ fsc clock rate. The read address counter 218 in conjunction with the clock generator circuitry 205 cause a 57-bit data word to be output from the RAM memory 82 and to be clocked into the latches 220, 222, and 224 by the output clock signal OCLK. The read address counter 218 counts from a preset number to the end of a horizontal line, causing that data to be read out onto the video data bus. The preset number is input to the A through D inputs of counters 300 and 302 depending upon the logic level of the signal 525/625 indicating the particular TV standard. This number is set into the read address counter by a load signal applied to the L inputs of counters 300 and 302 by the *Q output of a bistable 298. The bistable 298 is clocked by the ⅔ fsc signal from the counter 286 and is generally reset in normal operation. The bistable loads the counter 300 and 302 with the predetermined number by being set with a low signal to its preset input PR. This signal is developed by a D type bistable 284 which is clocked by the reference 2 fsc signal and coincident with the output of a NAND gate 282. The NAND gate 282 detects the coincidence of the TC RD signal and REF H pulse. This indicates the beginning of a line and the time for the frame memory 106 to read a line from the timing corrector.

The counters 300 and 302 provide the addresses RA0-RA9 to the address multiplexer 214 including the memory H/4, H/2 signals indicating line type. Depending upon this address the timing corrector reads the correct line out of memory 82 in synchronism with the request by the frame memory 106.

The actual signals which cause reading and writing in the line memory 82 are generated by the clock generator 205. In general the R1 multiplexing signal is used in a latch state to enable a gate which allows shift register 304 to clock at the reference 4 fsc rate. A read cycle is generated by the clocking of zeros by shift register 304 and a write cycle generated by the clocking of ones through the shift register 304. Gates 308, 310, 312, and 316 decode the zeros and ones to produce the write enable signal WE, the one horizontal clock rate signal IHCLK, the chip select signal CS, and the write clock signal WCLK. The bistable 306 which is clocked at the 2 fsc rate changes the read/write cycle at the ⅔ fsc clock rate.

Figure 13:
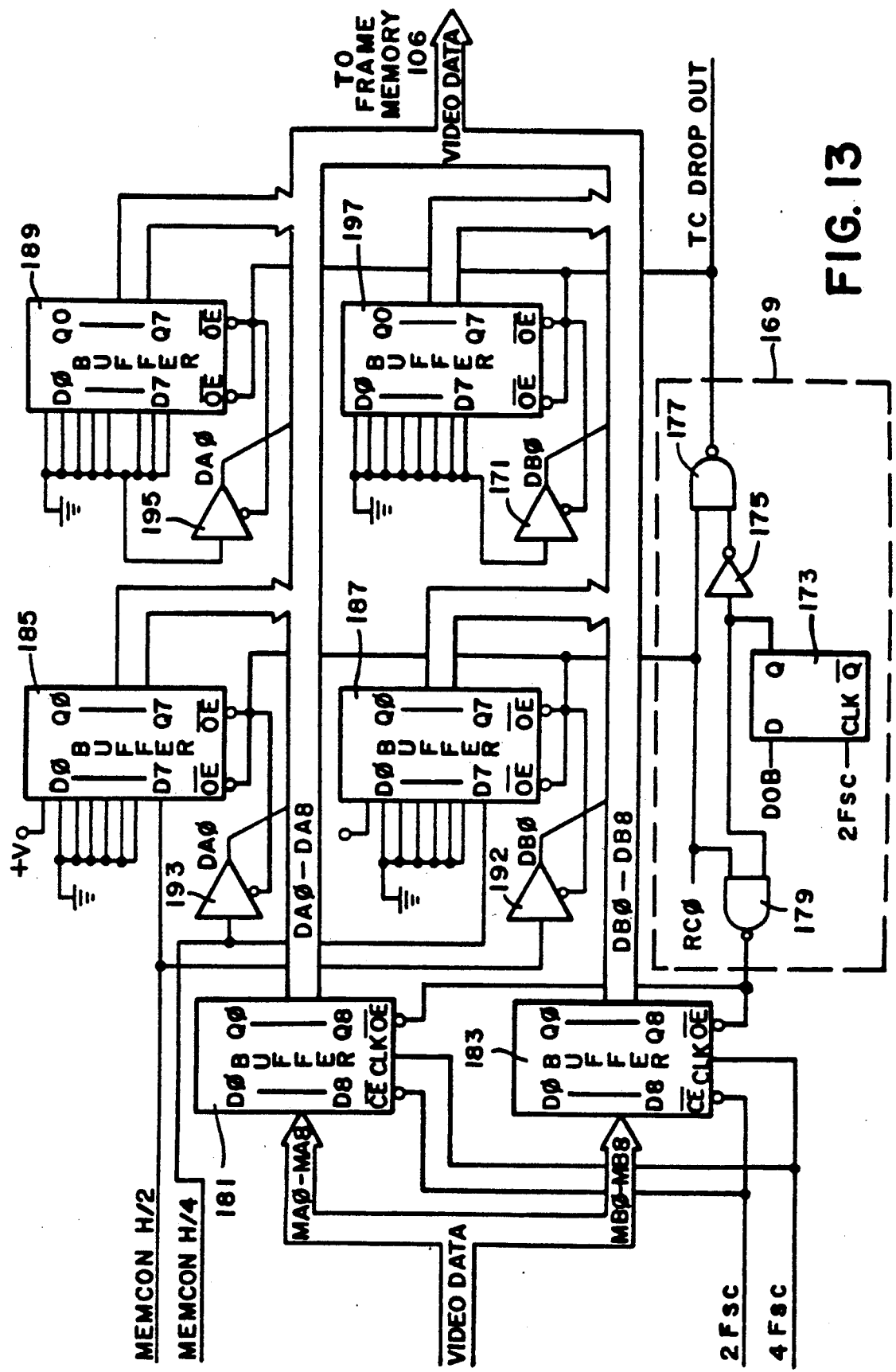
FIG. 13 is a detailed electrical schematic of the video data buffer, line type insertion means, and drop out insertion means of the timing corrector illustrated in FIG. 9.

FIG. 13 illustrates a detailed electrical schematic of the circuits 226, 228 which are used for line type insertion and dropout insertion. After the video data samples exit from the output latches 220, 222, 224 of the line memory 82, they are rephased by clocking them through buffers 181, 183 with clock signals *2fsc, *4fsc. The data samples are then transmitted to the frame memory 106 for input at the 2fsc video bus rate. Connected to the video bus in parallel with the outputs of the buffers 181, 183 are buffers 185, 187 and associated line drivers 193, 197 comprising the line type insertion circuit 226. Additionally, connected in parallel with the outputs of the first two circuits are buffers 189, 197 and associated-line drivers 171, 195 comprising the dropout insertion circuit 228.

These three circuits are connected in parallel to the video data bus at this point so that a choice may be made whether to insert for a particular sample period of the 2fsc clock either the sample value output from the line memory, a sample value for the line type, or a sample value for a dropout. The selection of which value is inserted in a particular sample location is made by logic 169 from input signals RCO and DOB. The selection is accomplished by enabling one of the circuits to allow passage of the sample onto the video bus while the other two circuit outputs are tristated.

The signal RC0 is output from the read address counter of the line memory and indicates that the end of a horizontal line has occurred. This signal thus indicates the beginning of the horizontal blanking interval. A low logic level of the RC0 signal selects or enables the outputs of the buffers 185, 187 and the line drivers 193, 197 to insert on the video bus in that sample period the value of the logic levels o their inputs. The values which are inserted are the type of the horizontal line which will next be read out of line memory. This information is generated by the memory control in the form of signals MEM CON H/2, H/4 input to the line type insertion circuit 226 and transferred to the video bus at the correct time.

The buffers 189, 197 and line drives 171, 195 of the dropout insertion circuit 228 are enabled by the low logic level output of a NAND gate 177. When the buffers 189, 197 and line drivers 171, 195 are enabled they insert a word of all zeros (low logic level) on the video bus to indicate the sample is a dropout. The output of NAND gate 177 enables this function when the dropout pulse signal DOB is clocked through a bistable 173. The dropout interval DOB was detected as video samples having a dropout condition as detected by different sources including the VTR 10, and was transferred through the word and line memories coincident with that particular period. Thus, the dropout insertion circuit exchanges a dropout value for the sample value which was previously stored during the dropout interval. The gate 177 is enabled for the insertion at the time of the dropout interval DOB unless the RC0 signal is present.

The buffers 181, 183 allow the data samples to be clocked through them when the output of NAND gate 179 is a low logic level, thereby enabling the *OE inputs of the devices. The buffers 181, 182 are enabled if neither the RCO signal nor the DOB signal is present. Otherwise, the NAND gate 179 disables the buffers 181, 183.

Therefore, a priority method for the insertion of the sample values on the video data bus is implemented in this manner. An RCO signal indicating the end of the active video has first priority and causes line type identification to be inserted in the data stream. The dropout pulses DOB have second priority and, in the absence of an RCO signal, cause a dropout identification samples to be inserted in the data stream. Otherwise, which is usually the case, the absence of the RC0 and DOB signals allow the data samples to be inserted in the data stream.

Figures 1, 14:
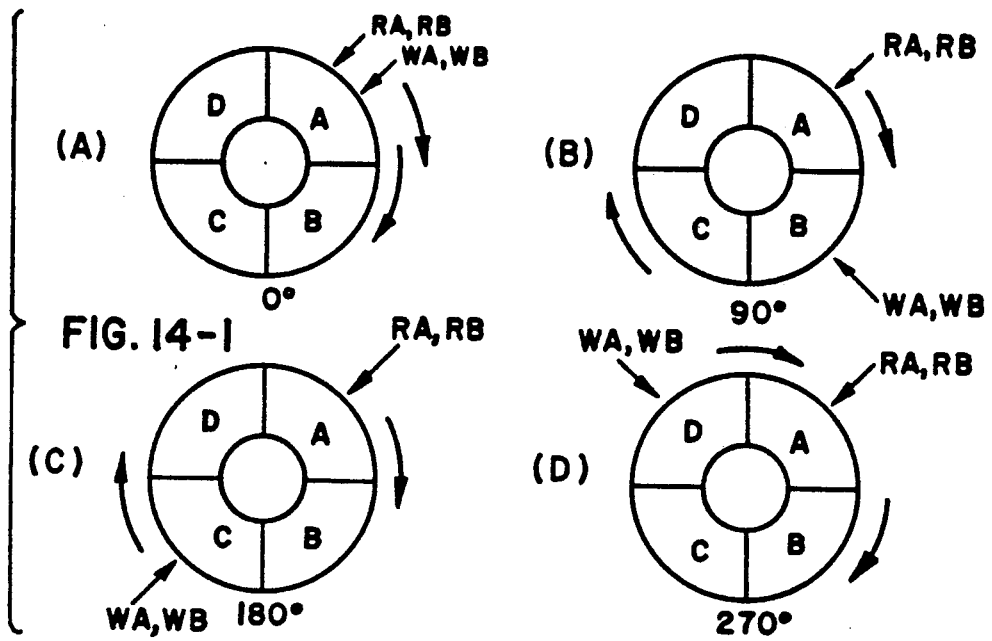
Figures 2, 14:
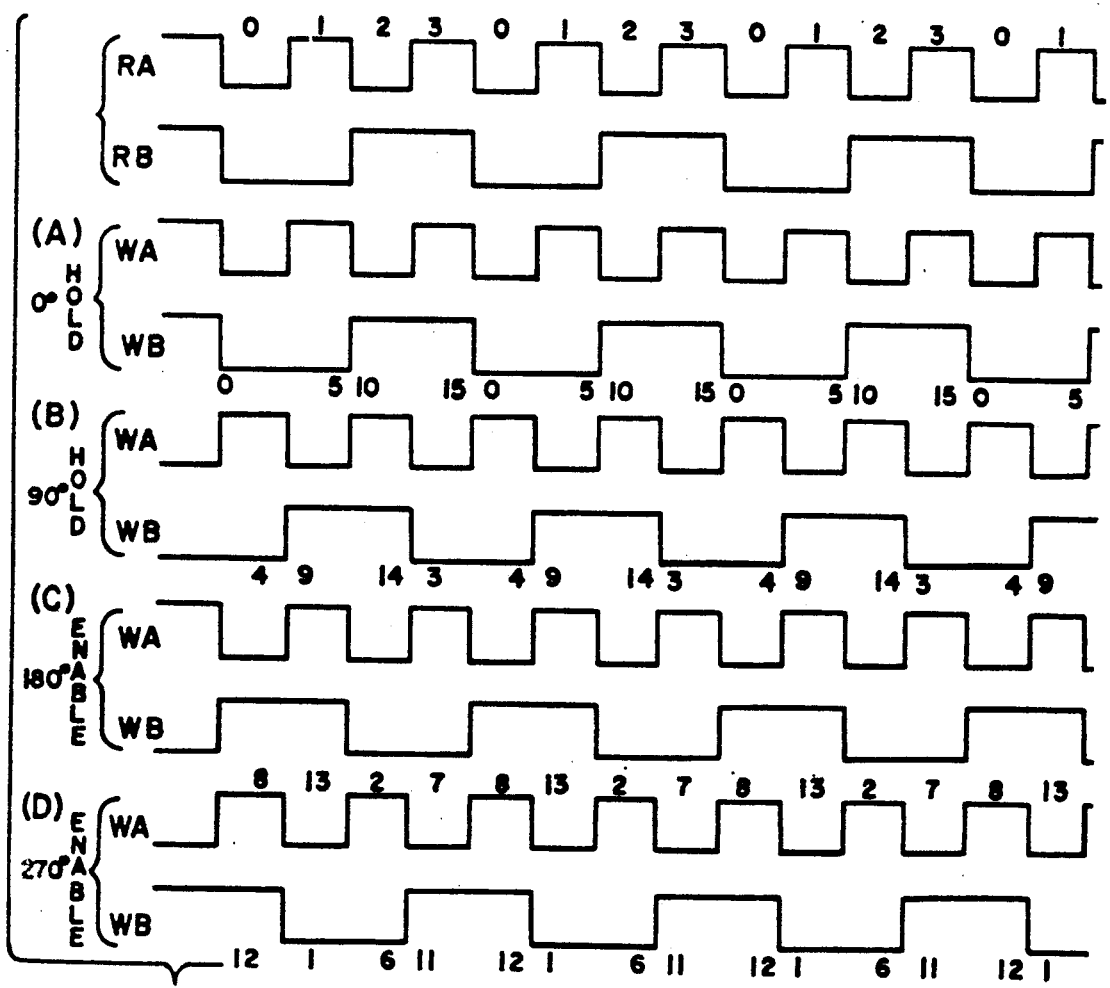

The read/write address selection for the word memory 80 will now be more fully explained by reference to FIGS. 14-1 and 14-2. FIG. 14-1 pictorially illustrates the word memory 80 where the read address RA, RB and the write address WA, WB are in all of their possible relative phases. FIG. 14-2 contains corresponding timing diagrams of each of the possible phases of write address signals WA, WB relative to the read address signals RA, RB. FIG. 14-1 at A illustrates when the read address and write address are at 0° or in phase where they address the same memory cell of the four word register file. The next part of the figure at B illustrates where the write address accesses the next cell of a register file and is leading the read address by 90°. The following portion of the figure at C illustrates the condition where the read address and the write address are 180° out of phase such that the write address is leading the read address by two cells. Finally, the figure at D illustrates the situation where the write address is leading the read address by 270° or by three memory cells. Because the memory must be designed never to allow the read address to overlap or pass the write address, the 0° and 90° states are disallowed states for the memory. In the first state, 0°, they address the same cells, and in the second state, 90°, the read address may catch the write address the next cycle, assuming it is incrementing faster. However, if the write address leads the read address by two or three memory cells, then the read address can be allowed to increment, as is the condition for the 180° and 270° states.

Thus, if states 0°, 90° are inhibited for the read address counter and states 180°, 270° are enabled for the counter, an advantageous memory cycle will be produced. The read address will always be racing to catch the write address but is never allowed to catch or pass it so that an access of the same memory cell cannot occur simultaneously. It is further evident that the write address will be the forcing timing clock with the read clock slaved to it. Therefore, with the read clock operating at twice the nominal tape speed no data will be lost if the data rate is slower than the twice normal tape speed for the write timing circuitry. As discussed previously the maximum data rate for a VTR occurs in forward shuttle and is 1.5× nominal. Moreover, because a small word memory 80 has been used which is fast in accessing data, timing errors of the magnitude of phase errors in the tape subcarrier frequency can be corrected in this manner.

The manner in which the read/write timing control maintains a control on this cycle is by decoding the RA, RB, WA, and WB addresses or states to determine the nonallowed states where the read address counter should be inhibited and allowed states where the read address counter advancement should be enabled. The waveforms of FIG. 14 illustrate the read address signals RA, RB selecting in sequence each one of the memory locations A-D. The other waveforms illustrate clock signals in sequence for the WA and WB signals for the four phases of 0°, 90°, 180°, and 270°.

Figures 15, 16A, 16B, 16C:
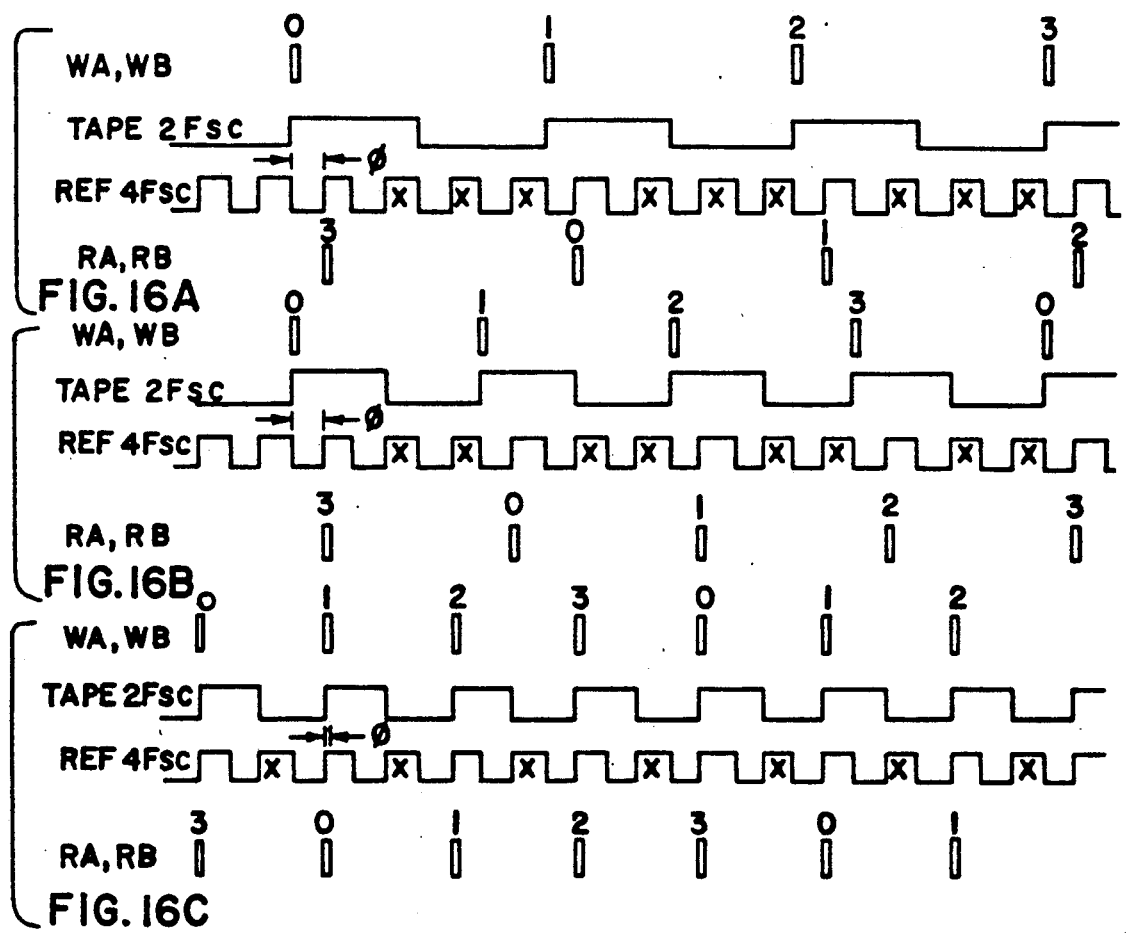
FIG. 15 is a truth table of selected address states for the inhibit means of the word memory read/write control illustrated in FIG. 10.
FIGS. 16A-16C are waveform diagrams of the writing of data into the line memory of the TBC illustrated in FIG. 3.

FIG. 15 is a truth table illustrating values for the four phases or selected states of the read and write address signals illustrated in FIG. 14. By decoding the values or states of each address signal, the nonallowed states for 0° phase and 90° phase can be decoded as a logical 1. The decoding of allowed states for 180° and 270° provide a logical 0. The logical 1 state from the signal generated by the decoding can be used to inhibit the advance of the read address counter while the logical 0 signal from the decoding can be used to enable the read address counter advance. In the preferred embodiment of the invention the decoding table, illustrated in FIG. 15, is stored in the PROM 240 (FIG. 10).

FIG. 16 better illustrates the result of omitting the clock cycles of the read clock to allow all the input data samples to be read no matter what the data rate is but also to retime them for subcarrier phase errors. To accomplish this data must be written and read from the memory at the same average data rate but written with a clock edge timed to the tape clocks and read with a clock edge timed to the reference clocks. At A in FIG. 16 there is shown a tape 2fsc clock writing data into a memory much slower than a reference 4fsc clock could be used to read the data out. The write addresses WA, WB change upon positive going transitions of the tape clock 2fsc in sequential order 0, 1, 2, 3, etc. Similarly, the read addresses RA, RB change upon positive going transitions of the reference clock 4fsc, unless such clocking states are inhibited. It is seen that for a read address change from address 3 to address 0, the read address counter must wait because the transition is a prohibited state for three read clock cycles. Once the write counter has made a transition from address 0 to address 1, then on the next positive going transition of the reference 4fsc clock the read counter is allowed to increment. Similar inhibit and enable decisions are made for address transitions from 1 to 2, 2 to 3, etc.

It is seen that three read clock cycles are omitted for ever data sample which is read in the first set of waveforms. However, the data samples are retimed to a clock edge of the reference clock thereby correcting phase errors. Waveforms B, C represent tape or incoming data rates that are increasingly faster than the data rate shown in waveforms A. The increase in data rate causes less read clock cycles to be omitted such that two read clock cycles are omitted per cycle for waveforms B and only one for waveforms C. Further, it is seen that the phase error is different between the tape clock and the reference clock in waveforms B and C but this difference has also been corrected similarly in both cases.

While the example in FIG. 16 uses clocks of tape 2 fsc and reference 4 fsc because these are the nominal video bus data rate, it is evident that the preferred embodiment uses clocks at tape ⅔ fsc and reference 4/3 fsc because of the multiplexing of the data samples. Only subcarrier phase errors larger than the smallest clock period can be corrected and there are no subcarrier phase errors smaller than the sampling rate by definition. Therefore, for the most complete correction of subcarrier phase errors by this method, the data samples should be written at a rate of tape 4fsc (the sampling rate) and read from the word memory at a nominal reference clock rate of 8 fsc (2× sampling rate).

Figure 17:
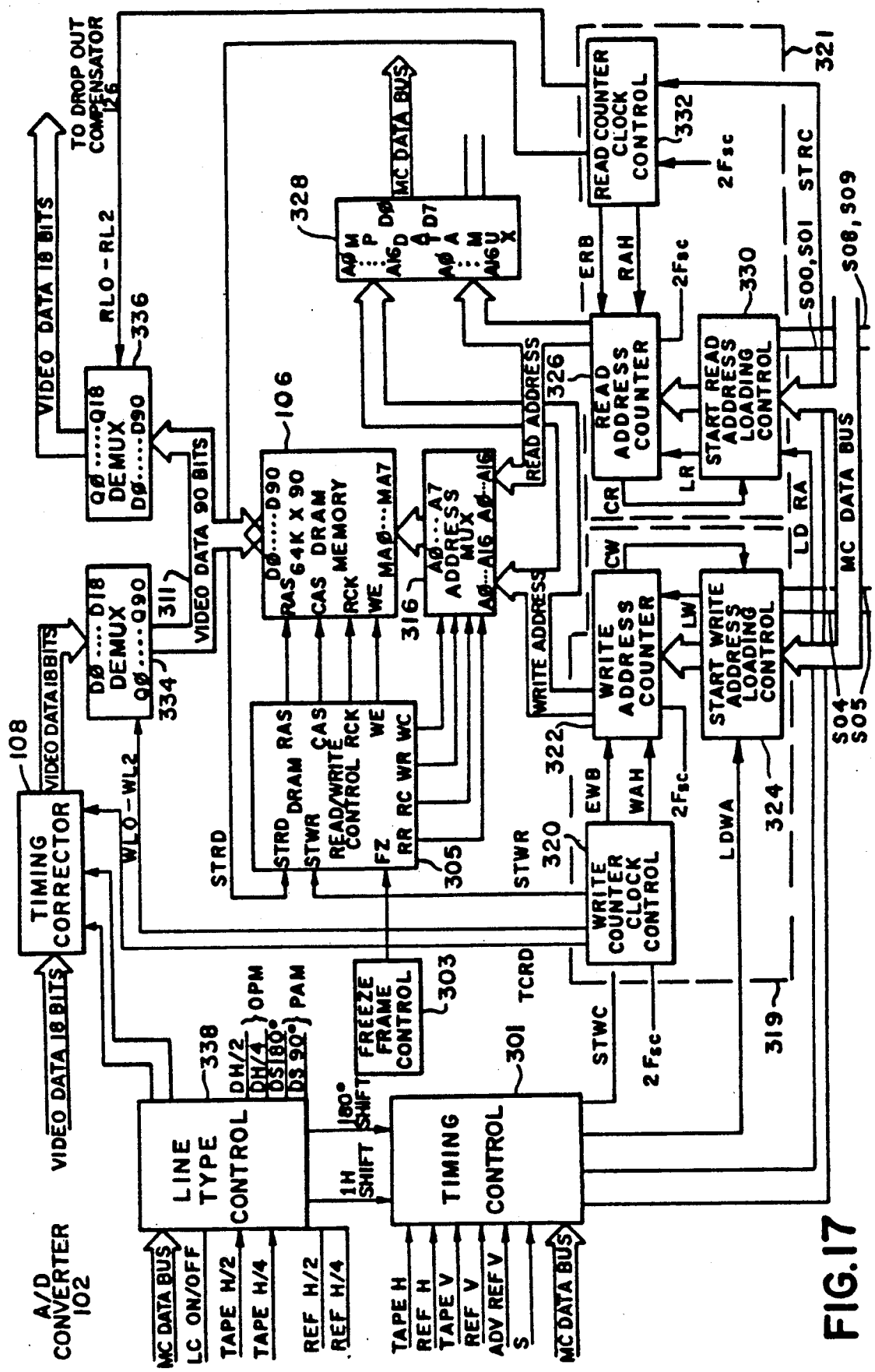
FIG. 17 is a detailed block diagram of the memory control function circuitry of the memory control and frame memory illustrated in FIG. 7.

FIG. 17 is a detailed block diagram of the timing corrector 104, the frame memory 106, and the memory control function circuitry 150. In the figure, the frame memory 106 is illustrated as a dynamic random access memory (DRAM). Generally such memories are assembled by connecting integrated circuit chips of a particular address length which are one bit wide. The length of these integrated circuit chips are available in multiples of powers of two for binary addressing schemes such as 32k, 64k, and 128k. In the memory shown in the figure, to ensure enough memory space to store 625 H lines of 85 frame memory blocks per line, 64k integrated circuits are used. For a 5(6) word length frame memory block, 90(108) bits are needed and thus, the DRAM memory 114 links 90(108) of the 64k integrated circuit chips together to form the memory. The refreshing of the DRAM memory 106 is accomplished by choosing the least significant 8 bits of the multiplexed write/read address to be the new address and in this manner assuring that all 256 rows of the memory are selected at least once every 4 ms.

To read and to write information to and from the DRAM memory 106 requires four clock signals and a memory address. The reading of information from the memory 106 is accomplished by generating a row address strobe, or clock signal, RAS, while addressing the memory 106 with a row address MA0-MA7, generating a column address strobe, or clock signal, CAS, while addressing the memory 106 with a column address MA0-MA7, and thereafter, clocking the data output by the memory from the particular location chosen into the output multiplexer with a read clock signal RCK. During the read clock signal RCK, the data from that location can be read from the data ports D0-D90 by another connected device. Conversely, for writing data into the DRAM memory 106, an RAS signal is generated in coincidence with a memory row address MA0-MA7 and a CAS signal is generated coincidence with a memory column address signal MA0-MA7, thereby selecting the particular location in the DRAM memory to be written into. Data are then applied to the data ports D0-D108 and a write enable signal WE is generated to clock the presented data into the respective location.

The memory control function circuitry 150 under regulation of the memory control microprocessor 158 performs these operations in a particular predetermined timed sequence to be able to write video data into the DRAM 106 synchronously with signals from the tape clock module 108, and read it from the DRAM synchronously with signals from the reference clock module 114.

The read and write clock signals RAS, CAS, RCK, WE for the DRAM memory 106 are generated by a DRAM read/write control 305. The DRAM read/write control 305 begins the generation of the read sequence clocks synchronously with a pulse STRD applied to its start read input and begins the generation of the write sequence clocks in synchronism with a pulse STWR applied to its start write input. Generally, the DRAM read/write control 305 causes a frame memory block (5 or 6 words) of data to be written into the DRAM memory 106 during the first part of a memory cycle and causes a frame block to be read from the memory during the other part of a memory cycle.

As will be more fully explained hereinafter with respect to memory control color correction, the read clocks group and the write clocks group do not occupy the entire memory read/write cycle. Since the clocks are synchronous with the STRD and STWR signals, the read and write cycles can be uncoupled by moving these two pulses with respect to the beginning of the memory read/write cycle.

The particular address at which the data are read from or written into the DRAM memory 106 is determined by an address computation circuit 39 for the write address and a read address computation circuit 321 for the read address. The write address generated by the computation circuit 319 is applied to one port A0-A16 of an address multiplexer 316 that times the address into two 8-bit addresses output from ports A0-A7 to the DRAM memory address inputs MA0-MA7. The address multiplexer 316, thus, multiplexes the 16-bit write address as well as the 16-bit read address, needed to select 64 K memory locations into two 8-bit addresses which define a location by row and column in the 64k memory matrix. The address multiplexer 316 performs this operation in response to clock signals RR, RC, WR, WC generated by the DRAM read/write control 305 which are synchronous with the clock signals RAS, CAS, RCK, WE it generates for the DRAM memory 106.

In the case of a write address, the write address computation circuitry 319 applies the write address to the inputs A0-A16 of the multiplexer 316 and the DRAM read/write control 305 applies a write row signal WR to the multiplexer to select the 8 least significant bits A0-A7 of the write address and send them to the DRAM memory 106. The row address strobe RAS is synchronous with the write row select signal WR and enables the row addressing in the memory matrix. Thereafter, synchronously with the column address strobe signal CAS, the DRAM read/write control 305 generates a write column select signal WC to the address multiplexer 316. In response to this signal, the address multiplexer then selects the 8 most significant bits A8-A16 of the write address and applies them to the memory address inputs MA0-MA7.

In a similar manner, the read address is generated by the read address computation circuitry 121 and multiplexed by the address multiplexer 316 into the address inputs MA0-MA7 of the DRAM memory 106. The signals causing the multiplexing are the read row signal RR and the read column signal RC from the DRAM read/write control 305. The signal RR is operated synchronously with the RAS signal and the signal RC is generated synchronously with the signal CAS strobing the new address and the column address into the DRAM address decoding circuitry.

Input video data are delivered to the data ports D0-D90 of the DRAM memory 106 through a demultiplexer 334, and data output from the memory data ports are received by a multiplexer 336. The demultiplexer 334 receives the video data at the video data bus rate of 2 fsc as sequential words, 18-bits in length. The demultiplexer 334, under control of address selection signals WL0-WL2, assembles the incoming words into 5(6) word frame memory blocks of 90(108) bits which are output from the demultiplexer outputs Q0-Q90. A frame memory block of 5 words, 90-bits, is used for a 525 line TV standard and a frame memory block of 6 words, 108-bits, is used for a 625 line TV standard. The demultiplexer outputs Q0-Q90 are enabled during the write cycle of the DRAM memory 106 in synchronism with the write enable signal WE to transfer the frame memory block into the memory.

During the read cycle, the multiplexer 336 is enabled synchronously with the read clock signal RCK to receive a frame block of data output of the DRAM memory 106 and clock it into its data input ports D0-D90. The multiplexer 336, thereafter, under control of address selection signals RL0-RL2 serializes the frame block into 5(6) words of 18-bits at the 2 fsc data rate. The output of these words from outputs Q0-Q18 of the multiplexer 336 become the output from the frame memory and allow for further processing of the video data stream.

The write address calculation circuit 319 comprises a write counter clock control 320, a write address counter 322, and a write address loading control 324. The write address counter 322 sequentially generates the write addresses at a timed rate while the write counter clock control 320 regulates when the write address counter is allowed to increment or advance. The write address loading control determines the beginning address in a sequence when the write address counter 322 will begin the sequence. The write address counter 322 produces write addresses at the frame memory rate of 2/5($\frac{1}{3}$) fsc for 81(85) frame memory blocks ×525(625) horizontal lines which comprise a video frame. The write address counter then repeats this address operation for the next frame. The write address counter 322 signals that it has reached the highest address of the frame memory by generating a carry write signal CW to the write address loading control 324. Upon receiving the carry write signal CW, the write address loading control 324 will start the next sequence for the write address counter 322 at a particular address of the DRAM memory 106. Generally, in response to the write address counter 322 filling one entire frame, it will be reloaded with the starting address of the same frame. The write address control loading signal can also be generated by a timing control 301 which generates a signal to load the write address LDWA upon synchronization with the tape vertical sync signal.

The particular address with which the write address counter 322 begins a particular sequence can be set under program control by the memory control microprocessor 158 by sending a data word over the memory control (MC) data bus to the write address loading control 324. Any particular write address can be chosen but essentially the choice is made so that the video frame started at the loaded address ends at the highest address of the memory.

The write counter clock control 320 generates two signals which control the clock of the write address counter 322 and, therefore, how quickly the write address changes. These two signals synchronize the write addresses with the incoming data and comprise an end of write block signal EWB and a write address hold signal WAH. These signals are generated from a start write counter signal STWC applied to the write counter clock control 320 from the timing control 301. The STWC signal is synchronous with the tape horizontal sync signal TAPE H input to the timing control 301 which marks the beginning of a horizontal line for incoming data. Essentially the write counter clock control 320 is a counter (divider) with decoding circuitry which retimes intervals of the data into memory intervals. The major timing rate of the data intervals is the 2 fsc or video data bus rate. The major memory interval rate for changing write addresses is the frame memory block rate of 2/5 ($\frac{1}{3}$) fsc.

At the start write counter signal, actually the start of a horizontal line, the write counter clock control 320 counts in increments of 2 fsc until an entire frame memory block of data has been collected. Synchronously with the collection of the last data word in the frame memory block by the multiplexer 334, the write counter clock control 320 generates the end write block signal EWB for the write address counter 322 enabling the incrementing of the memory write address to the next location. The address incrementation of the write address counter 322 continues in this fashion until the write counter clock control 320 determines that it has counted an entire horizontal line of 81(85) frame blocks in increments of the clock 2 fsc. At that point, the write counter clock control 320 generates the write address hold signal WAH to stop the write address counter 322. The write address counter 322 is held until the next tape horizontal sync pulse (next horizontal video line) begins the cycle again.

In a similar manner, the read address calculation circuit 321 generates the read addresses for the DRAM memory 106. The read address calculation circuit 321 comprises a read address counter 326, a read address loading control 330, and a read counter clock control 332. The read address counter 326 sequentially generates the addresses from which data are read from the DRAM memory 106 while the read counter clock 332 regulates the times the addresses are generated. The loading control 330 determines the starting address of a sequence for the read address counter 326. The read address counter 326 delivers a 16-bit read address to a second port A0-A16 of the address multiplexer 316. This address is decoded into the location of a frame memory block of data to be read from the DRAM memory 106. The 16-bit read address is multiplexed into 8-bit row and column addresses during a read cycle by the same means as described for the write address. The read address counter counts each horizontal line stored in memory 106 in increments of frame memory blocks and for an entire frame before generating a read carry signal CR. The address at which a read sequence from memory 106 begins is determined by the read address loading control 330 which loads the starting address of a particular field upon the receipt of the carry read signal CR, a load read address signal LDRA from the timing control 301, or a load read address signal MC LDRA from the memory control. The starting address of the read address loading control is loaded by the memory control via the MC data bus to be able to start the loading sequence at any address of the frame.

The rate at which the read address counter 326 changes the read addresses to the DRAM memory 106 is controlled by the read counter clock control 332 which, as was indicated for the write clock counter control 320, is a counter (divider) and decoding circuit which times the major intervals of the DRAM memory 106 in terms of intervals of the outgoing video data. The read counter clock control 332 generates two clocking signals to the read address counter 326 including an end read block signal ERB and a read address hold signal RAH.

In general, the read counter clock control 332 receives a start read counter signal STRC from the timing control 301 and counts in 2 fsc clock increments until a full frame memory block of data has been output from the multiplexer 336. At that point, the read counter clock control 332 generates the end read block signal ERB to increment the next memory address, allowing the multiplexer 336 to be loaded with another frame block of data. The read counter clock control 332 continues to increment the addresses of the read address counter 326 until an entire horizontal line has been output from the DRAM memory 106. At that point, the read counter clock control will generate the read address hold signal RAH and stop the read address counter 326 from continuing to increment. The cycle will continue at the start of the next horizontal reference sync (next horizontal line) which causes the generation of the start read counter signal STRC. In this manner, lines of horizontal video data are read out of the DRAM memory 106 in synchronism with the reference horizontal and reference 2 fsc clock.

Because the DRAM memory 106 is written into and read from at a rate determined by the reference clock and because for every line written into the memory a line is read from it, exact positioning of the data written into and read out of the memory 106 can be accomplished. Vertical positioning can be controlled by exactly timing the load write address signal LDWA and the load read address signal LDRA. Horizontal positioning can be controlled by exactly timing the start write counter signal STWC and the start read counter signal STRC. The timing control 301 controls the generation of the signals STWC, STRC, LDWA, and LDRA in synchronism with the tape horizontal sync signal TAPE H, the tape vertical sync signal TAPE V, the reference horizontal sync signal REFH, the reference vertical sync signal REFV, and an advanced referenced vertical sync signal ADV REFV. The microprocessor 158 of the memory control 110 can also communicate with the timing control 301 over the MC data bus to send data words for timing purposes.

In general, the timing control 301 generates the start write counter signal STWC synchronously with the signal TAPE H unless the VTR 10 is in a shuttle mode. During this condition, the tape horizontal sync pulses are being generated too quickly for the memory timing to be able to write the data in memory 106 and, therefore, the start of a line will be timed from the signal REF H. The line memory 82 will be controlled in a special manner in order to drop the excess lines coming from the VTR.

The start read counter signal STRC is basically synchronous with the reference horizontal sync signal but delayed by a predetermined time interval. The variable time interval which the signal is delayed depends upon a data word value set by the microprocessor 158 of the memory control 110 and a signal 180° shift from a line type control 338. The delay of the reference horizontal sync signal set by the microprocessor 158 is to position the output data horizontally with respect to the frame. The signal 180° shift from the line type control 338 causes the insertion of a ½ subcarrier cycle delay (180°) in the active horizontal lines of a field, thus causing color phase inversion. This allows color correction of a line when its type is incorrect but merely needs to be inverted 180°.

The signal load write address LDWA is generated synchronously with the tape vertical sync signal if the VTR 10 is in normal playback speed. If the playback speed is too great to write all the data coming into the TBC adequately, then the tape vertical sync pulses are replaced by advanced reference vertical sync pulses. If the signal LDWA is to be delayed, the microprocessor 158 of the memory control 110 can transfer a data word to the timing control 102 to regulate the length of delay. In a similar manner, the load read address signal LDRA is generated synchronously with the reference vertical sync pulse but can be delayed by a controllable interval. One signal that varies the delay of the LDRA signal from the start of the reference vertical signal REFV is the signal 1H shift from the line type control 100. For velocity error correction purposes a one line delay module 124 may be inserted in the input video. Therefore, a shift in the vertical timing of one line may be necessary to account for this presence of this module 124 in the TBC 12. Additionally, the microprocessor 158 of the memory control 110 can transfer a word over the MC data bus to the timing control 301 which can vary the delay between the reference vertical sync pulse and the signal LDRA. The memory control 110 varies this time delay in increments of horizontal lines such that the input video is advanced from the output video by a variable delay.

The tape horizontal timing circuit of the timing control 301 is more fully detailed in FIG. 18 where an electrical schematic is illustrated. The tape horizontal timing circuit provides a number of timing signals based on the tape horizontal sync signal TAPE H and to distribute them throughout the memory control function circuitry 150. The tape horizontal sync pulse enters one port of a multiplexer 340 through an inverter 339. The inverted pulse is passed to the write counter clock control 320 as the start write counter signal STWC. This pulse signal is an indication of the beginning of a horizontal line from tape and is used to begin the transfer of a horizontal line of video information into the frame memory 106.

Further, the output of the inverter 339 is distributed to the line type control 338 as a tape write pulse signal TAPE WRP indicating the start of the horizontal line. The other port of the multiplexer 340 has input to it the delayed reference horizontal sync signal DREF H which has been delayed by a controllable amount of time. This signal becomes the start write counter signal STWC if the shuttle signal is present in the mode control register of the memory control 110. The shuttle signal indicates that the VTR 10 is in shuttle mode and has notified the system control 12 which, thereafter, has notified the memory control 110 to set that particular bit in its mode control register. During a shuttle operation the tape horizontal sync pulses are coming too quickly to be able to use them to load video information line by line into the frame memory and, therefore, the reference horizontal sync in the form of the DREF H signal is used instead.

Whichever pulse is chosen to generate the start write counter signal STWC, that pulse is used to clock a D type bistable 342 to produce an elongated pulse labeled stretched TAPE H at the output of an inverter 343 and its inversion at the input of the inverter. The bistable 342 stretches the pulse by counting with counters 344, 346 to a particular number at the fsc rate before being reset by the *Q output of a D-type bistable 348. Each horizontal sync pulse whether TAPE H or the DREF H causes the bistable 342 to become set. The high logic level of the Q output enables the counters 344, 346 to count from a preset number loaded at the same time as the enabling signal.

The carry from counter 346, after a predetermined delay of fsc clocks produces a reset signal from the *Q output of the bistable 348 to reset the bistable 342 at end of cycle. Thus, the width of the pulse generated from the *Q output of the bistable 342 is from the clocking of the bistable 342 with TAPE H (or DREF H) to the resetting of the bistable. This interval is variable and is determined by the logic level set on the A-D inputs of the counters 344 and 346 at the time of loading. This number can be changed under program control by the memory control 110 by either setting for clearing a bit in the mode control register pertaining to whether the TV standard used requires a 525 line frame or a 625 line frame. Thus, the stretched TAPE H pulses will be wider or narrower depending upon the TV standard which is in use.

The reference horizontal timing circuitry of timing control 301 is illustrated in more detail in the electrical schematic diagram of FIG. 19. The reference horizontal timing circuitry operates to receive the reference horizontal sync signal REF H generated by the reference clock generator module 114 and delays it a controllable amount of time such that it becomes delayed reference horizontal signal DREF H. The signal DREF H is output and distributed from the Q output of a D-type bistable 370. The inversion of the signal is output from the *Q output of the bistable 370 to the memory control microprocessor 158. In general, the reference horizontal timing circuitry includes a first monostable device 351 including a bistable 350, a counter 352, and a bistable 354; a second monostable device 353 including bistable 356, counters 358, 360, and a bistable 364; and a shift register 343 comprising bistables 366, 368 and 370.

The first bistable 351 stretches out the reference horizontal signal pulses to a length set by the microprocessor 158. These pulses are applied to the second monostable 353 where they are delayed by 5 or 6 sample periods (2 fsc) before being set to clock another variable length delay circuit, the output of which is variable by a word transmitted to the monostable from the microprocessor 158. Thereafter, the delayed pulses are shifted through the shift register 343 where they can be delayed by ½ of a subcarrier cycle before being output as the DREF H or the MC REF H signals. The first monostable device 351 has the bistable 350 clocked by the reference horizontal pulses through an inverter 349. This sets the Q output of bistable 350 thereby enabling the counter 352 to count. The counter 352 counts to an overflow condition at the 2 fsc clock rate from a preset number which is loaded at the time of the enablement by the bistable 350. The carry RC from the counter 352 upon overflow sets the bistable 354 which then resets the bistable 350 and disables the counter 352 until the next reference horizontal pulse. The number preset into the counter 352 is received from the D0-D3 data lines of a latch 362. The latch 362 is connected by its D0-D7 inputs to the write portion of the memory control data bus. The microprocessor 158 can clock data into the register or latch 362 by the generation of the select signal SCO and by writing the data to the bus. Thus, the width of the pulse output from the Q output of bistable 35 is microprocessor controlled and is generated sufficiently long to allow the horizontal and subcarrier clocks to be rephased with the signal REF FLYWHEEL.

The pulse from the first monostable 351 further clocks the second monostable 353 by its input to the clock input CLK of the bistable 356. The pulses setting bistable 356 enable counter 358 to count 2 fsc clocks in increments of 5 or 6 depending upon the TV standard. The counter 358 is reset from the carry output RC or the *Q output of the bistable 356 which reloads the counter with a preset number through its A-D inputs. The A input of the counter is the control line bit 525/625 from the mode control register indicating the TV standard. This divide by 5(6) allows the second monostable pulse duration to be controlled by microprocessor 158 in increments of 5(6) 2 fsc periods. Thereafter, the pulses at 2/5(6) fsc rate enter the second counter 360 of the second monostable 353 which positions the horizontal pulse with respect to time. The counter is presettable through its A-D inputs from the data bits D4-D7 of the output latch 362. The microprocessor 158 sets these bits to change the horizontal positioning of the video picture with respect to the video input. A carry RC from the counter 360 will cause bistable 356 to generate a reset signal to the bistable 364 thereby ending the second monostable pulse. The reference horizontal pulses are then shifted through the shift register bistables 366, 368, and 370 at the 2 fsc rate for additional delay of 3 or 4 periods of the 2 fsc clock. A shift of ¼ subcarrier cycle can be applied through control signal 180° SHIFT which is input to NAND gates 345 and 347. Because one element in the shift register, for example the bistable 368 will delay the signal ¼ subcarrier cycle, bypassing the bistable 368 will shift the reference horizontal signal by ¼ subcarrier cycle.

When being shifted through the shift register the signal will either bypass the bistable 368 or pass through it depending upon the logic level of the signal 180° SHIFT. The output of the bistable 368 is input to the NAND gate 347 and thereafter is transmitted through a NOR gate 349 to the D input of the last stage 370 of the shift register 343. Alternatively, the signal is transmitted from the Q output of the bistable 368 through NAND gate 345, and the NOR gate 349 to the D input of bistable 370. If the signal 180° SHIFT is a high logic level, then the gate 347 is enabled and through an inverter 313, and the NAND gate 345 is disabled. Thus, the pulse signal passes through a longer delay path including the bistable 368, adding a 180° shift or ¼ subcarrier cycle delay thereto. Alternatively, a zero logic level for signal 180° SHIFT enables the shorter path through THE NAND gate 345 and disables the longer path through THE gate 347.

Figure 20:
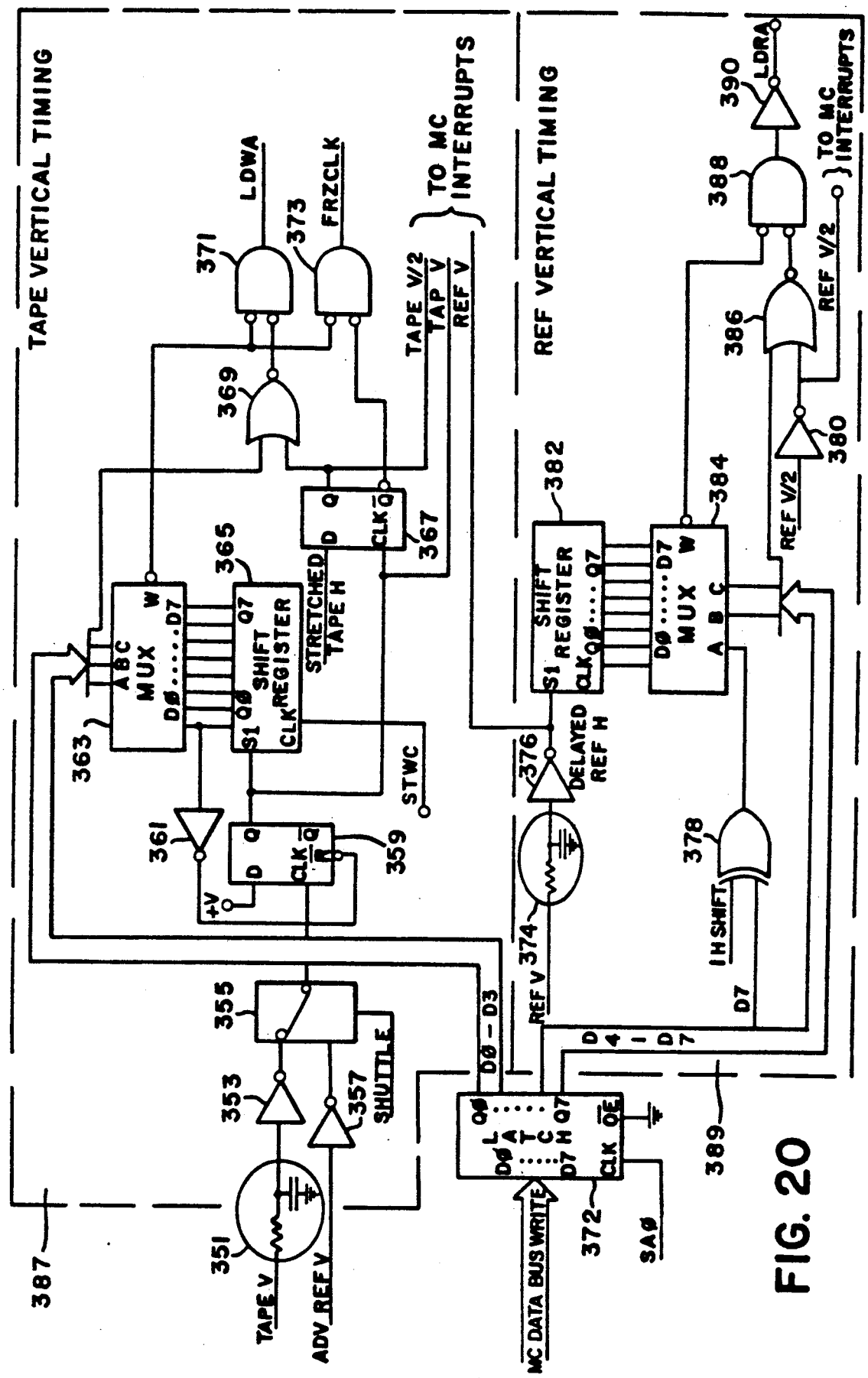
FIG. 20 is a detailed electrical schematic of the tape vertical timing circuitry and reference vertical timing circuitry of the timing control for the memory control function circuitry illustrated in FIG. 17.

FIG. 20 is an electrical schematic of a tape vertical timing circuit 387 and a reference vertical timing circuit 389 of the timing control 301. The tape vertical sync pulse TAPE V enters the tape vertical timing circuit through an inverter 353 and a noise filter circuit 351. The TAPE.V signal is delayed a variable number of horizontal lines depending upon a data word generated by the microprocessor 158 and outputs the vertical timing signal as the load write address signal LDWA. Further, the circuits 359 and 367 output the tape vertical TAPE V and TAPE V/2 signals to the microprocessor 158 for interrupt handling. These signals indicate the start of each input field (TAPE V) and the start of each frame (TAPE V/2). If the VTR 10 is in a shuttle mode, then this operation is communicated to the system control 14 which passes along the information to the memory control 110. In response to a shuttle mode, a bit is set in the memory control mode register which causes a multiplexer 355 to substitute the ADV REF V signal for the TAPE V signal. This operation occurs when the input information is coming too fast for the memory 106 to store the same adequately. Basically the delay circuitry comprises a shift register 365 and a multiplexer 363 which are connected through their Q0–Q7 outputs and D0–D7 inputs, respectively. The tape vertical pulse enters the shift register 365 through the S1 input and is clocked along the stages of the register at the horizontal line rate by the start write counter signal STWC applied to the clock input CLK of the device. The TAPE V pulse is applied to the shift register 365 by clocking a D-type bistable 359 through one port of the multiplexer 355. The TAPE V pulse passes through the multiplexer input port to its output port and sets the bistable 359, thereby enabling the shift register 365 to clock a logic 1 along its Q0–Q7 outputs. The Q0 output is inverted by an inverter 361 to reset the bistable 359 to thereby produce only one pulse which is shifted.

The multiplexer 363 receives this shifting pulse through a selected input port D0–D7 depending upon an address applied to its decoding inputs A, B, and C. The pulse is shifted along the input ports of the multiplexer until it comes to the enabled input port where it is then transferred to the output port *W a selected number of horizontal lines later than its input. The pulse from the output *W of the multiplexer 363 passes through a NAND gate 371 to become the load write address signal LDWA. The NAND gate 371 is enabled to pass that signal by the low logic level output of a NOR gate 369 which receives an enabling signal from either one line of a 4-bit data bus D0–D3 or the Q output of a D-type bistable 367.

Usually, the output of the bistable 367 is used to enable the generation of the load write address signal LDWA by decoding the coincidence of the vertical sync pulse and the stretched TAPE H signal at the D input of the bistable. The coincidence of the tape vertical sync pulse and the tape horizontal sync pulse indicates the beginning of a new frame or field 1. The stretched version of TAPE H is used to cure slight timing inconsistancies between TAPE V and TAPE H. This signal is also output to the interrupt control of the microprocessor 158 as the TAPE V/2 signal to indicate changes between fields at the vertical sync rate. However, when it is desired to load the write address counter 322 at a field rate rather than a frame rate, then bit D3 from the data line D0–D3 may be set by the microprocessor 158 every tape vertical sync pulse to allow such to occur by enabling the NAND gate 371. The D0–D3 data inputs for the multiplexer 363 are provided by latch 372 which is connected at its D0–D7 inputs to the write portion of the memory control data bus. Data placed on the bus from the microprocessor 158 are latched into the device when the select signal SAO is generated by the memory map of the memory control 110. A freeze clock signal FRZ CLK is generated by a NAND gate 373 as the coincidence of the start of a video frame (*Q output of the bistable 367) and the delayed tape vertical signal (*W output of the multiplexer 363).

In a similar manner the reference vertical timing circuit 389 of the timing control 301 accomplishes for the read address loading control 330 what the tape vertical timing circuit 387 accomplishes for the write address loading control 324. The circuit 389 receives the reference vertical sync pulse REFV from the reference clock module 114 and delays it a variable amount of time to generate the load read address signal LDRA. Further, the reference vertical signal REF V and the reference V/2 signal are generated for the microprocessor 158 by this circuit. The circuit basically comprises a shift register 382 and a multiplexer 384. The reference vertical pulses REF V are input to the shift register input S1 via an inverter 376 and a pulse shaper 374. The shift register 382 is clocked at the reference horizontal line rate by the signal DREF H. Therefore, upon the occurrence of a reference vertical signal REF V, the pulse is shifted along the Q0–Q7 outputs of the shift register 382 at the horizontal line rate. The reference vertical signal REF V is also transmitted to the microprocessor 158 from the output of the inverter 376.

As the pulse is shifted along the outputs of shift register 382, one of the input ports D0–D7 of the multiplexer 384 is enabled by decoding a digital word applied to the decoding inputs A, B, and C of the device. Depending upon which port is enabled, the pulse will be transferred to the output W of the multiplexer 384, a selected number of horizontal lines later than it was input to the shift register 382. This REF V pulse travels through a NAND gate 388 and an inverter 390 to become the load read address signal LDRA. The LDRA signal can be generated either at a field rate or a frame rate depending upon the enablement of the gate 388 by a NOR gate 386. One enabling signal to the NAND gate 388 through the NOR gate 386 is the reference V/2 signal input from the reference clock module 114 through an inverter 380. This enablement causes the signal LDRA to be generated at the frame rate such that loading of the read address counter occurs at the beginning of field 1 (start of frame) of the output video. Conversely, a bit D7 can be set and input to the NOR gate 386 to allow the generation of signal LDRA to be at the field rate. This bit is set by the microprocessor 158 via the latch 372. The particular number of horizontal lines that the reference vertical sync pulse is delayed is determined by the choice of a bit combination from data lines D4–D7 output from the latch 372.

The latch 372, not only sets the number of horizontal lines delayed with respect to the tape vertical, but also the number of horizontal lines delayed for the reference vertical. In this manner, if the desired amount of delay between an input frame and an output frame is greater than 8 horizontal lines, it can be applied partially to the tape vertical and partially to the reference vertical thereby separating the two further in time than if only one delay period were used. Additionally, the signal 1H SHIFT is input to an exclusive OR gate 378 to provide one additional horizontal line delay depending upon the decoding of the fields by the line type control 338.

Figure 21:
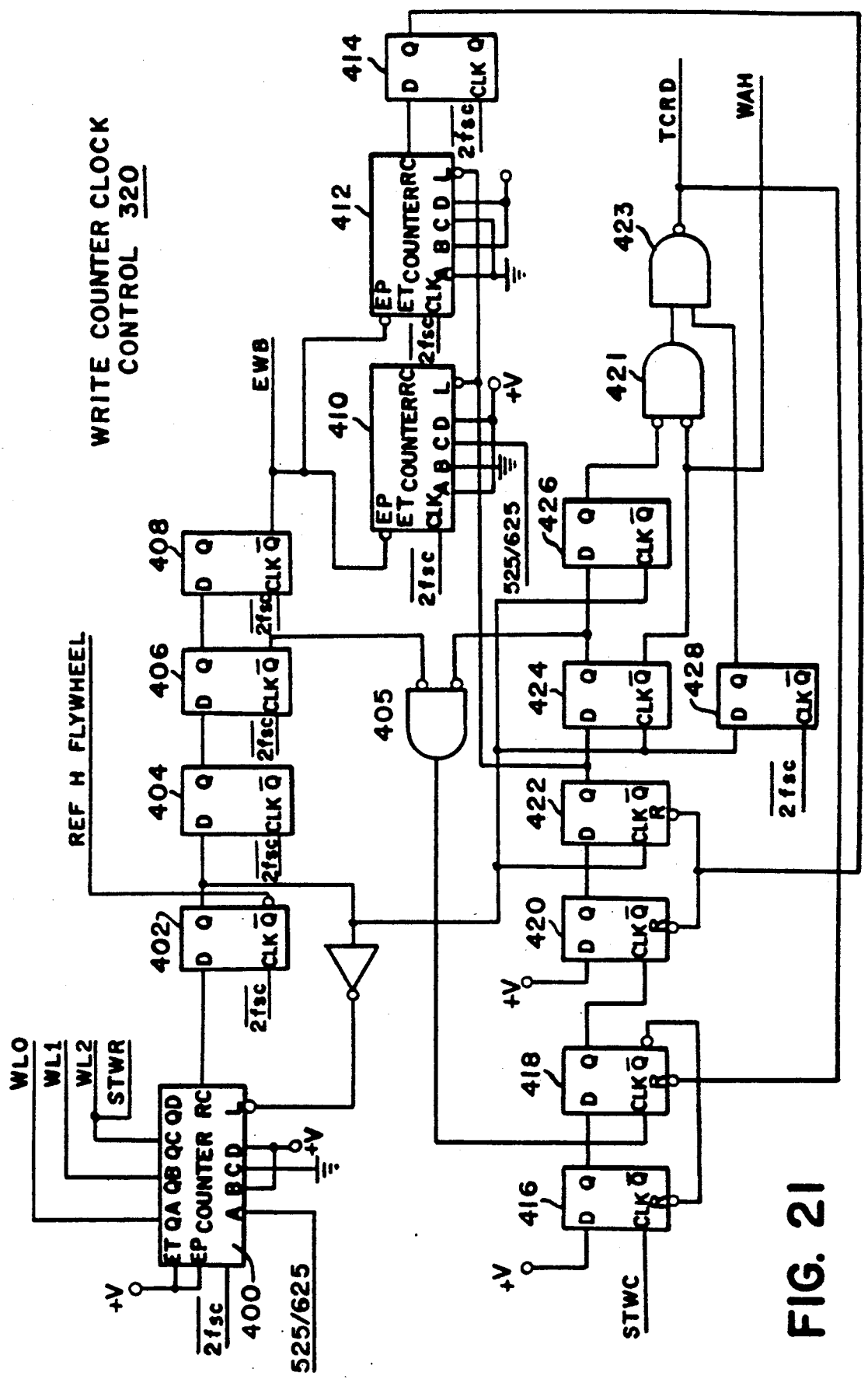
FIG. 21 is a detailed electrical schematic of the write counter clock control of the memory control function circuitry illustrated in FIG. 17.

The write counter clock control 320 is more fully illustrated in FIG. 21. The write counter clock control 320 comprises a counter 400 which is used as the timing control for the input multiplexer 334 and as a words per frame memory block counter, and two counters 410 and 412 which form a frame memory blocks per line counter. The counter 400 divides the *2 fsc sample clock by 5(6) depending upon the logic level on the 525/625 line connected to its A input. The counter 400 changes the words per frame block according to the TV standard as represented by the logic level of the 525/625 line. While going through a division sequence it generates the demultiplexer addresses WL0–WL2 from the QA-QC outputs to load 5(6) data samples into the demultiplexer 334. The demultiplexer address WL2 is also used as the signal to start writing STWR used by the DRAM read/write control 305 to generate write cycle signals for the frame memory 106.

At the end of each cycle, the carry output RC generates a pulse which is transmitted to a D-type bistable 402 which is additionally clocked by the *2 fsc clock. Every 5(6) samples the counter 400 is reloaded by a pulse transferred from the Q output of bistable 402 to its load input L. This is an indication that 5(6) words have been assembled by the multiplexer 334 and the address of the write address counter 322 should be incremented. The carry pulse not only resets the counter 400, but is transferred through three retiming D-type bistables 404, 406, and 408 at the *2 fsc clock rate to become the end of write block pulse EWB. This pulse enables the write address counter 322 to increment one write address.

In addition, the pulse allows counters 410 and 412 to be enabled and clocked with one pulse at the *2 fsc clock rate. The counters 410 and 412, therefore, count addresses or frame memory blocks to determine the number of frame memory blocks in a horizontal line. For a 525 line TV standard, this is 81 frame memory blocks and for a 625 line TV standard, it is 85 frame memory blocks. The counters 410 and 412 count frame memory blocks until the end of a horizontal line and then produce a carry pulse from the RC output of counter 412 which is clocked through D-type bistable 414 to reset bistables 420 and 422. The bistable 422 has its reset logic level from its Q output clocked into the Q output of a bistable 424, producing a high logic level on the *Q output of the bistable 424 which becomes the write address hold signal WAH.

Thus, after the memory has been loaded with an entire horizontal line of frame memory blocks, the write address hold signal WAH is generated to disable or inhibit the write address counter 322 until the next start write counter signal STWC. The reset logical level on the Q output of bistable 422 further reloads the counters 410, 412 by producing a pulse to their L inputs at the time the bistable is reset by the Q output of bistable 414. This loads a preset number depending upon the logic levels presented to the A-D inputs of the counters 410, 412 which can be selected as either 81 or 85 by the 525/625 address line connected to the C input of the counter 410.

To begin the writing of a horizontal line into memory 106, bistables 416 and 418 retime the start write counter signal STWC to an end of a write block producing a clocking pulse to the D-type bistable 420. The start write counter pulse from the bistable 420 is further clocked through the bistables 422, 424, and 426 to the input of NAND gate 421. The clocking signal for the bistables 422, 424, and 426 is the Q output of the bistable 402, which delays the pulse from the start write counter pulse for 3 frame memory blocks or addresses in the bistables. The output of the NAND gate 421 is input to a second NAND gate 423 whose other input is enabled by the Q output of a bistable 428. The output of the NAND gate 423 is the timing corrector read signal TCRD. The signal TCRD enables the read circuitry of the line memory of the timing corrector to begin transferring a horizontal line of data to the memory 106. The signal TCRD further resets the bistable 418 to initialize it for the next horizontal line. A signal REF H FLYWHEEL is generated from the *Q output of bistable 402 to provide a timing sample of the reference writing signals so as to synchronize for different TV standards.

Figure 22:
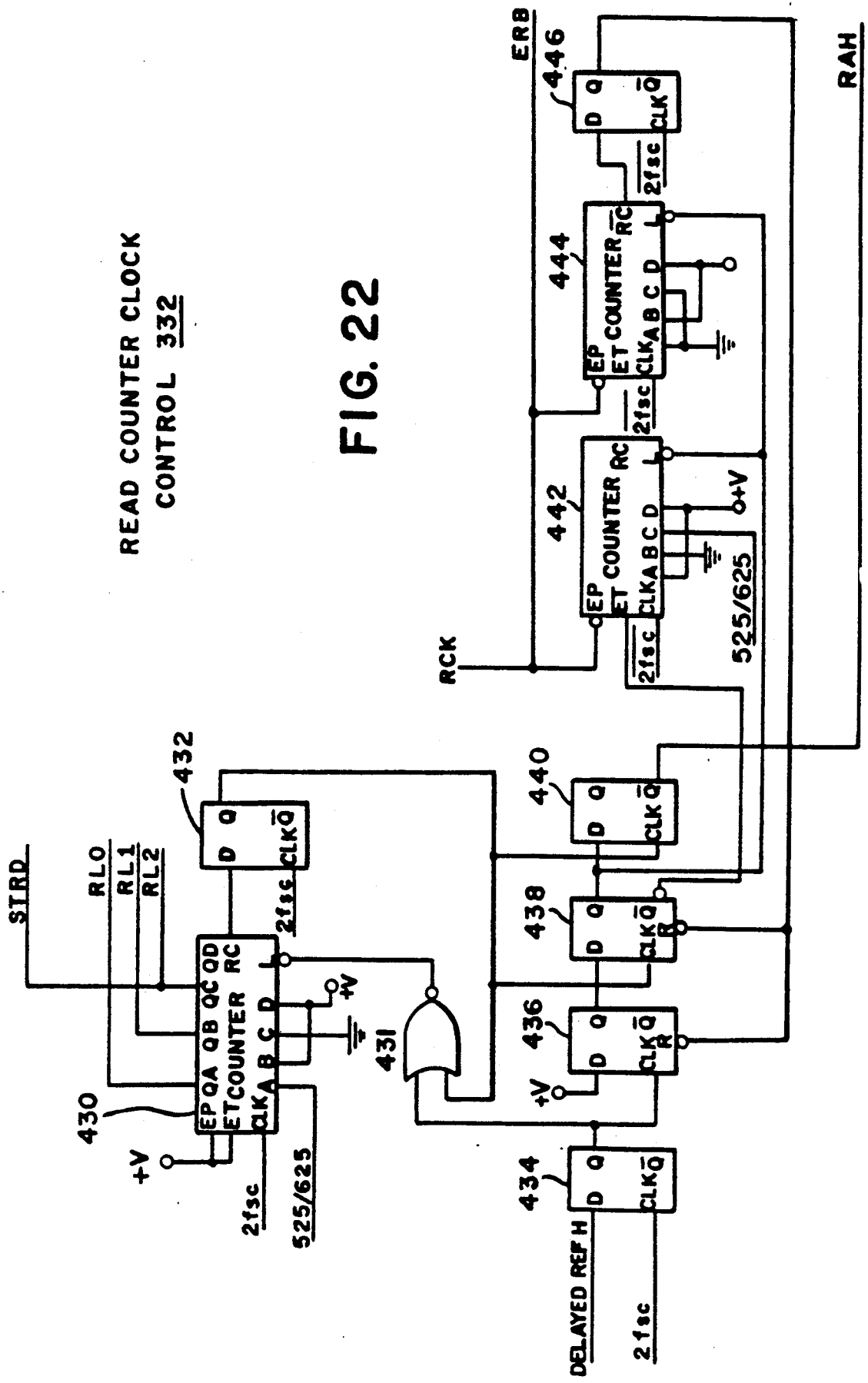
FIG. 22 is a detailed electrical schematic of the read counter clock control of the memory control function circuitry illustrated in FIG. 17.

The read counter clock control 332 will now be more fully described with reference to the detailed electrical schematic illustrated in FIG. 22. The read counter clock control 332 comprises basically a words per frame memory block counter 430 and a frame memory blocks per line counter including counters 442 and 444. The counter 430 divides the 2 fsc clock by 5(6) to count the number of output words per frame memory block to determine when to increment the read address counter 326. Further, the counter 430 outputs the multiplexer addresses RL0-RL2 to the multiplexer 336 to retime the video data samples to the video bus rate. The multiplexer address RL2 is also used as the start read signal STRD which is input to the DRAM read/write control 305 to generate the necessary signals for reading the frame memory 106 and controlling the address multiplexer 316. The counter 430 is a cyclic counter which counts to 5(6) depending upon the logic levels applied to its inputs A-D and particularly upon the logic level of the 525/625 line connected to its A input. The counter 430 is loaded by its output carry RC transmitted through a D-type flip flop 432 and a NOR gate 431 to its load input L. The counter is further retimed and loaded by the pulse DREF H transferred through a D-type bistable 434 and the NOR gate 431.

The start read signal STRD causes the generation of the read clock RCK for the frame memory 106 which is also used to enable the counters 442 and 444. This signal is generated at the end of each block of data which is transferred from the memory 106 by the end read block enable ERB. Further, the RCK pulse permits counters 442 and 444 to increment at the *2 fsc clock rate until they have accumulated an entire horizontal line. The counters count 81(85) frame memory blocks and then are reloaded to count this cycle once more. At the end of each cycle the carry output RC of the counter 444 passes through a D-type bistable 446 and resets bistables 436 and 438 to disable the counters 442, 444 from counting. Further, the pulse DREF H is retimed through D-type bistables 433, 438, 440 to provide at the *Q output of a bistable 440 the read address hold signal RAH. The read address signal RAH inhibits the read address counter from counting further until another DREF H signal is input to bistable 434.

Figure 23:
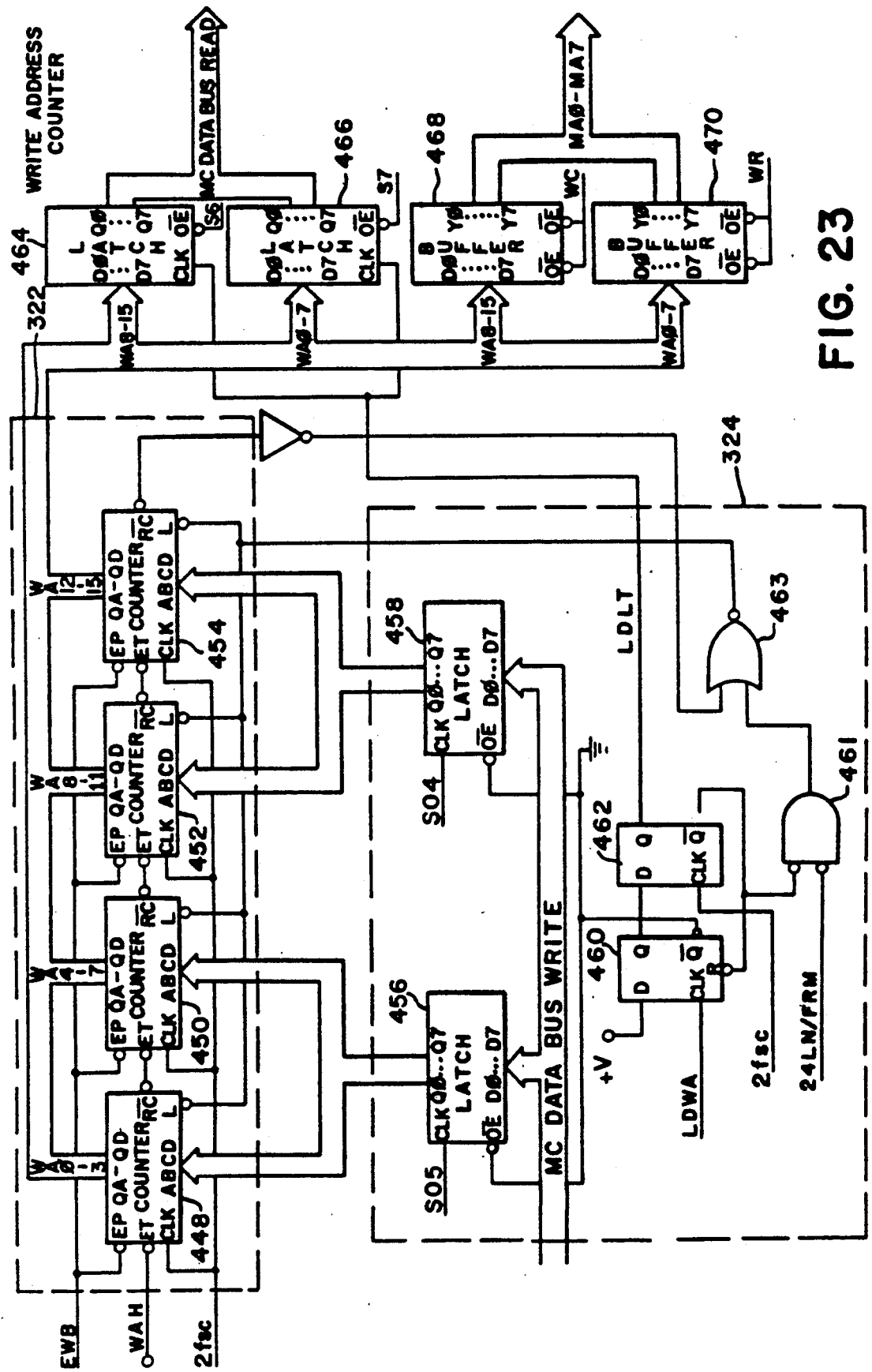
FIG. 23 is a detailed electrical schematic of the write address counter and write address load control of the memory control function circuitry illustrated in FIG. 17.

FIG. 23 will now be more fully described to illustrate the write address counter 322, the write address loading control 324, the write portions of the memory control data multiplexer 328 and the write portion of the address multiplexer 316. The write address counter 322 is formed of four 4-bit counters 448, 450, 452, and 454 connected together such that their overflows enable the next counter and are clocked by a 2 fsc signal input to their CLK inputs. The counter 322 generates a 16-bit write address WA0-WA15 from the QA-QD outputs of the counters 448, 450, 452, and 454 and applies the address to the write port of the memory control data multiplexer 328 comprising latches 464 and 466 and to the write address port of the address multiplexer 316 comprising buffers 468 and 470. The write address counter 322 is enabled by the end write block signal EWB to count one of every 5 or 6 (dependent on the TV standard) 2 fsc clock pulses and is disabled at the end of the horizontal line by the write address hold signal WAH. The address counter 322 can be selectively preset to any particular address by the write address loading control 324.

The write address loading control 324 comprises two latches 456, 458 and associated circuitry which produces a low logic level signal on the L inputs of the counter 448, 450, 452, and 454 to transfer the contents of the latches 456, 458 into the counters at specific times. The write address loading control 324 produces the load signal from the output a of NOR gate 463 which has two inputs. The first input of the NOR gate 463 is a feedback pulse from the carry output RC of counter 454, inverted by inverter 465. Presetting the counter to a particular number and then allowing it to count to overflow causes the address stored in latches 456, 458 to be reloaded into the counters 448, 450, 452, and 454. In this manner, a cyclic write address generation sequence is produced. To write from the start of a field to the end of a field or from the beginning of a frame to the end of a frame, the predetermined address from which the address sequence starts can be loaded into the latches 456 and 458 through the write portion of the memory control data bus by selecting the latches with selection signals S04, S05. Address data are placed on the bus by the microprocessor 158 and are clocked into the latches 456 and 458 during a calculation period of the control program for determining where to begin the sequence of the write address counter 322. The load write counter pulse LDWA formed into a one 2 fsc wide pulse by bistables 460 and 462 enables the outputs of latches 456 and 458 causing them to send the prepared address to the A-D inputs of counters 448, 450, 452, 454. At the same time the pulse from *Q output of the bistable 462 through gates 461 and 463 enables synchronous loading of the counters 448, 450, 452, 454 by the 2 fsc clock, thus starting a new sequence of addresses. If for some reason, the LDWA pulse is missing at the end of the address counting sequence, then carry the output *RC from counter 454 through NOR gate 463 enables reloading of the counters with sequence starting address.

The microprocessor 158, utilizing a number of input parameters, calculates the write address loaded into the latches 456 and 458 under program control. The time of the loading, as mentioned previously, is either cyclical or supplied by a load write address signal LDWA. The LDWA signal is generated by the timing control 301 and is synchronous with the tape vertical sync pulse delayed a controllable amount of time. The signal LDWA clocks D-type bistable 460 to set bistable 462 at the edge of a 2 fsc clock pulse. The pulse from the *Q output of bistable 462 resets the bistable 460 and is transferred through NAND gate 461 to the other input of the NOR gate 463 to provide an alternative loading of the write address counter 322.

Because the LDWA address is delayed a set amount by the microprocessor 158, the loading of the data stored in latches 456 and 458 is timed under the control of the microprocessor 158 by this method. The NAND gate 461 is enabled by a low logic level signal indicating a frame memory is used as an option in this configuration. The *Q output from bistable 462 is disabled if a 24 line memory is used to enable the microprocessor to load a much shorter address sequence in latches 456 and 458 than is required for frame memory.

Additionally, the Q output of the bistable 462 is used to load the address of the write counter 322 into latches 464 and 466 which can be read by the microprocessor 158. The output signal LDLT is applied to the CLK inputs of the latches and transfers the data from the QA-QD outputs into the latches 464, 466. The data can thereafter be read by the microprocessor 158 by selecting latches 464, 466 with selection signals S6 and S7.

Figure 24:
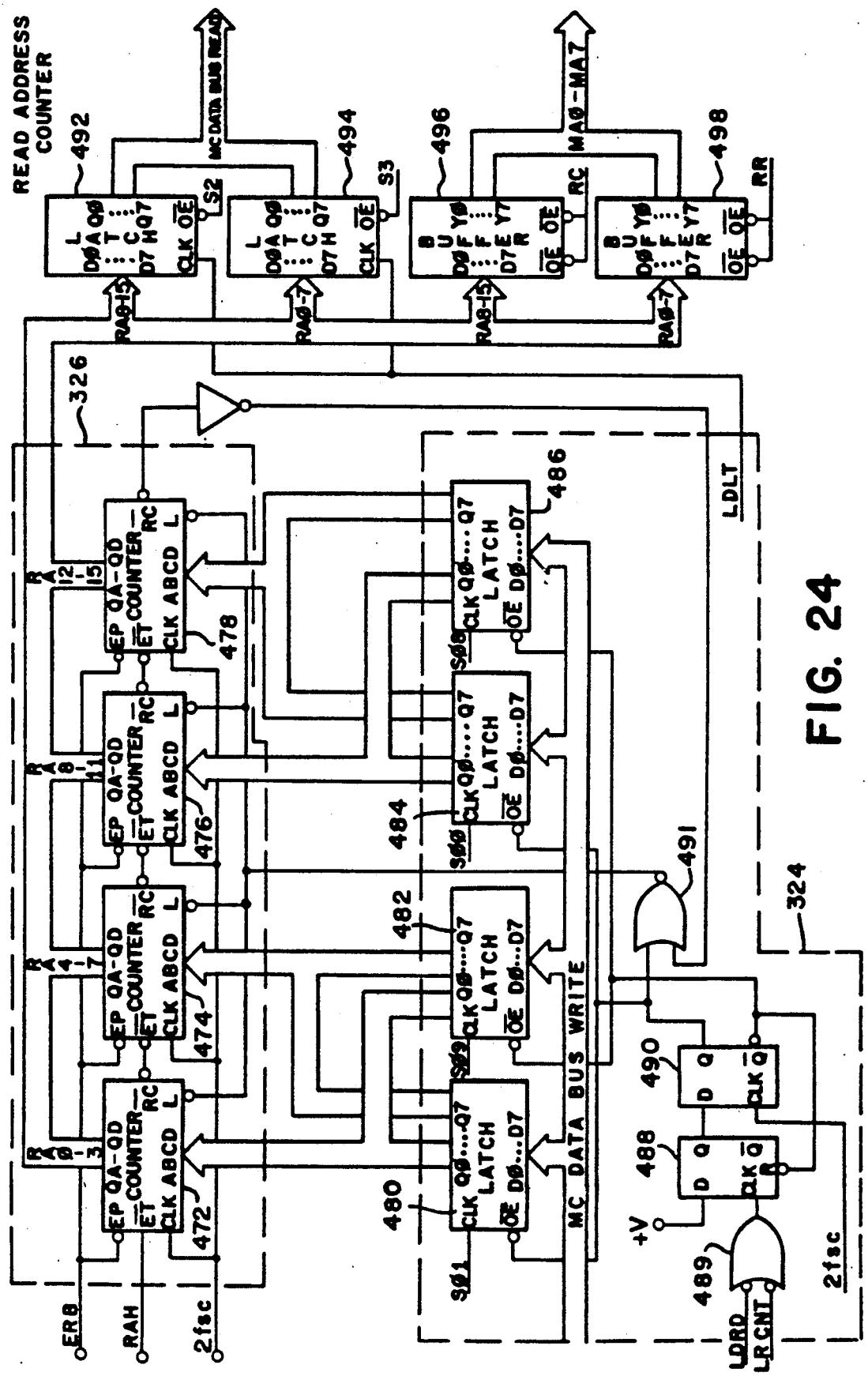
FIG. 24 is a detailed electrical schematic of the read address counter and a read address load control of the memory control function circuitry illustrated in FIG. 17.

The read address counter 326 and the read address loading control 330 are similar in configuration to the corresponding circuitry for writing and are shown in more detail in the electrical schematic diagram in FIG. 24. The read address counter 326 comprises four 4-bit counters 472, 474, 476, and 478 coupled together to form one counter. The counter 326 is enabled by the end of read block signal ERB to count synchronously with one of every 5 or 6 (dependent on the TV standard) 2 fsc clock pulses applied to the inputs CLK of the counters. The counters 472, 474, 476, and 478 provide a read address RA0-RA15 to either the read port of the memory control data multiplexer 328 comprising latches 492, 494 or the read port of address multiplexer 316 comprising buffers 496, 498. The read addresses RA0-RA15 are applied to the frame memory 106 by sequentially enabling the buffer 498 with the read row signal RR and then by enabling the buffer 496 with the read column signal RC. The data from the read counter 326 can be clocked into latches 492, 494 with the load latch signal LDLT generated from bistable 462 (FIG. 23).

The counter 326 is reloaded upon overflow by producing a pulse from the output RC of counter 478 and feeding that pulse back through an inverter 487 and an OR gate 491 to the load inputs L. The number that is preset in the counter 326 is taken from one or two sets of latches, either latches 480 and 484 which form one complete address or latches 482 and 486 which form another address path. Depending upon which set of latches is enabled as determined from the state of a bistable 490, that address will be loaded into the counters.

The state of the bistable 490 is determined by a D-type bistable 488 which is clocked by one of two signals input to an OR gate 489. The first signal is the load read signal LDRD from the timing control 301. This signal is the delayed signal for reference vertical, where the delay is under control of microprocessor 158. The other signal LRCNT or, load read count, is generated directly by the microprocessor 158. When either of these signals is present, the OR gate 489 applies a clock signal to bistable 488 thereby setting bistable 490 synchronously with a 2 fsc clock pulse. The pulse resets the bistable 488 through the *Q output of the bistable 490.

The latches 480 and 484 are loaded with a 16-bit address by their connection to the write portion of the memory control data bus and by microprocessor 158 selecting the latches with signals S00 and S01. Alternatively, the latches 482, 486 may be selected by the microprocessor 158 with signals S08 and S09 to load a data word. Normally, the address which is set in the data latches 480 and 482 is enabled by a low logic level on the Q output of the bistable 490 at the *OE inputs of the latches. This produces a loading of the counter 326 at the cyclic rate of the carry RC. Alternatively, the outputs of the other latches 482 and 486 are enabled by either the load read signal LDRD or the load read counter signal LRCNT. When these signals cause the output of bistable 490 to be set, the *Q output of the bistable enables the latches 482, 486 to provide an alternative starting address for the counter 326.

Figure 25:
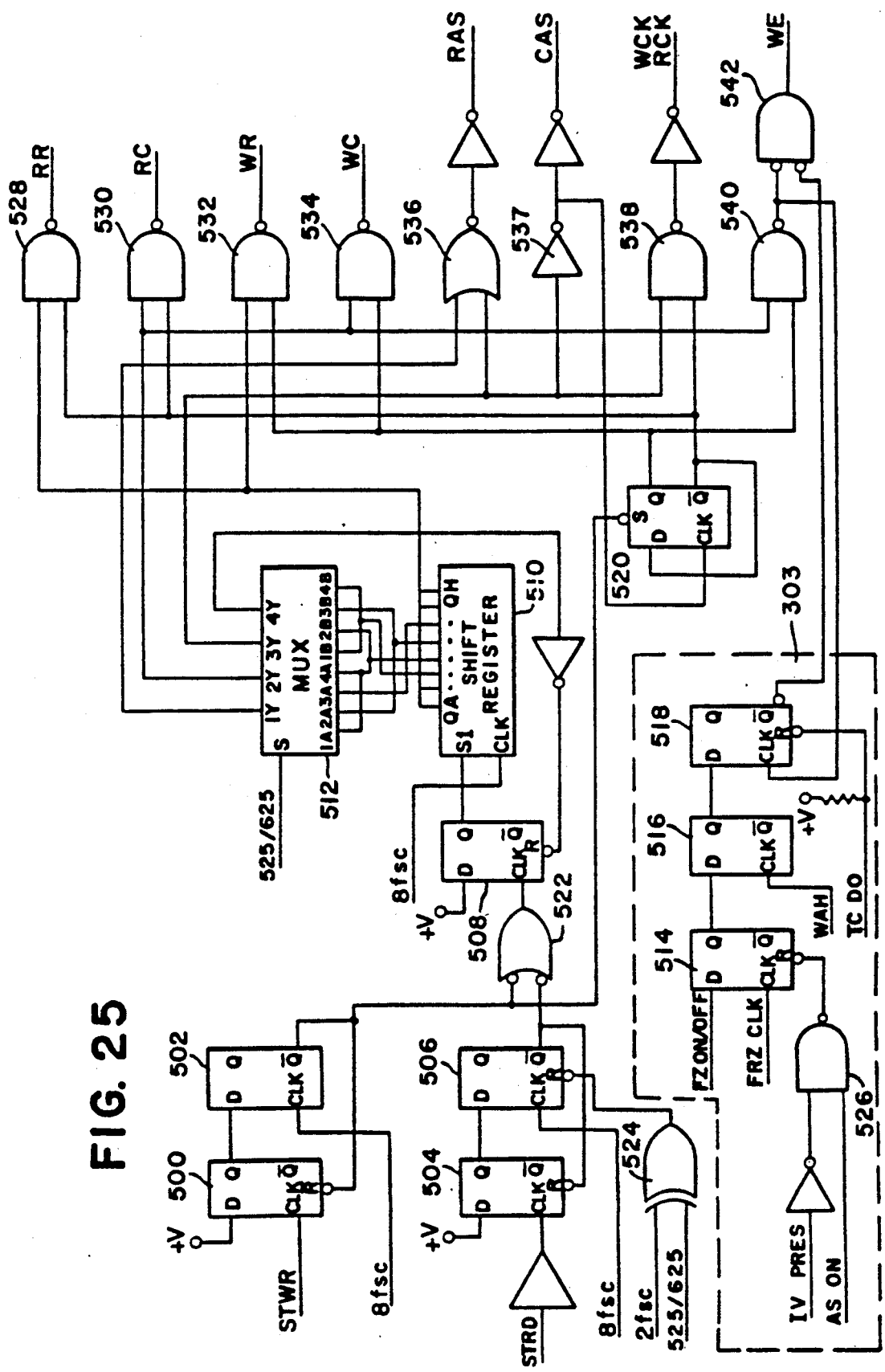
FIG. 25 is a detailed electrical schematic of the DRAM read/write control of the memory control function circuitry illustrated in FIG. 17.

The DRAM read/write control 305 is more fully detailed in FIG. 25 where a detailed electrical schematic is illustrated. Further, detailed circuitry comprising the freeze frame control 303 is also shown. The read/write control 305 comprises basically a shift register 510 and a multiplexer 512. The multiplexer 512 has two sets of inputs 1A-4A and 1B-4B which can be alternatively connected to outputs 1Y-4Y. The choice between the two input selections is made by the logic level of the 525/625 signal line which indicates the TV standard used, and is applied to the select input S of the device. A D-type bistable 508 applies a logical one to the shift input S1 of the device 510 which is clocked along the outputs QA-QH at an 8 fsc rate. These outputs are connected to the inputs of the multiplexer 1A-4A and 1B-4B in different bit combinations to output pulses at different timing periods synchronous with the 8 fsc clock. These pulses are decoded in gates 528, 530, 532, 534, 536, 537, 538, 540, and 542 to produce the clock and enable signals for reading from and writing to the frame memory 106 and for producing memory addresses MA0-MA7 for the address multiplexer 316.

The first four gates 528, 530, 532, and 534 generate the read row signal RR, read column signal RC, write row signal WR, and write column signal WC for the address multiplexer 316. The other decoding gates 536, 537, 538, 540, and 542 decode the signals from the output of multiplexer 512 into the row address strobe signal RAS, column address strobe signal CAS, the read clock RCK and write enable WE. At the end of every sequence, whether a read sequence or a write sequence of signals, the 4Y output of the multiplexer 512 resets the bistable 508 through an inverter 509. The bistable 508 is set to begin another read cycle or write cycle, depending upon the input to an OR gate 522.

One of the inputs to the OR gate 522 which begins a memory cycle is the start write signal STWR applied to bistable 500. The start write signal STWR which is a pulse retimed in a bistable 502 to be synchronous to the 8 fsc clock and sets the bistable 508 to begin generating the write cycle pulses RAS, CAS and WE. A bistable 520 is set by the *Q output of the bistable 502 to output a high logic level indicating a write cycle is in progress. Alternatively, a column address strobe signal CAS fed back from the inverter 537, clocks the bistable 520 to reset it for the read cycle. Also starting an address cycle is the start read pulse STRD applied through an inverter 503 to the clock input of a bistable 504. The bistable 504 causes a bistable 506 to become set while retiming the pulse to the 8 fsc clock.

The freeze frame control 303 disables and enables the write enable signal WE by an input to the NAND gate 542. A low logic level from the *Q output of a bistable 518 enables the gate 542 to allow the write enable signal WE to be generated. Otherwise, the write enable signal WE is disabled freezing the information in frame memory 106 to that data already stored. Every write cycle the bistable 518 is clocked by the output of NAND gate 540 and, depending upon the logic level applied to its D input, either enables or disables the gate 542. The D output of the bistable 518 is connected to the Q output of a bistable 516 which in turn receives the Q output from a bistable 514. The bistable 516 is clocked at the end of a horizontal line by the write address hold signal WAH such that a entire horizontal line is written before the memory is frozen.

Figures 30, 31:
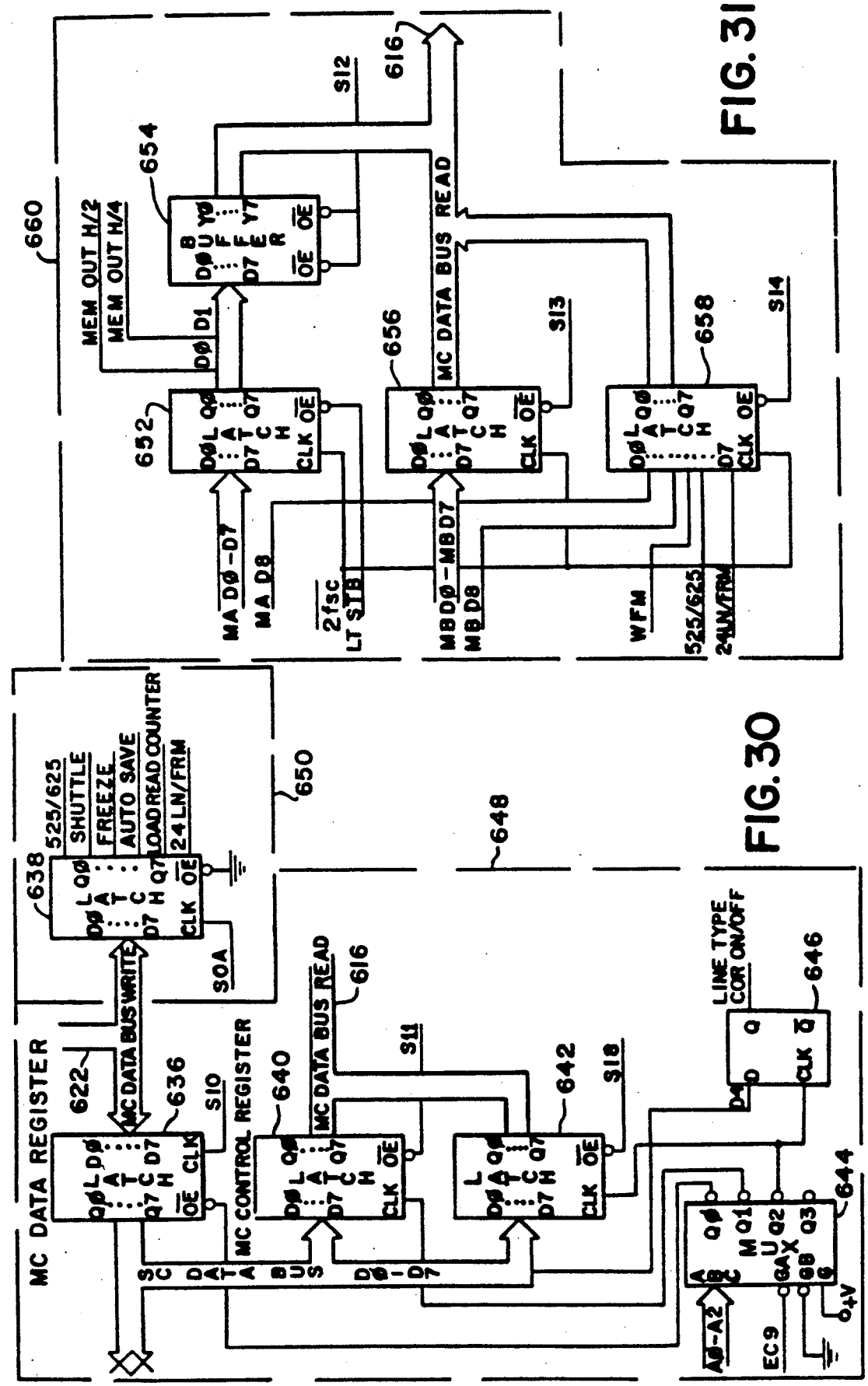
FIG. 30 is a detailed electrical schematic of the system control port and mode control register of the microprocessor control illustrated in FIG. 29.
FIG. 31 is a detailed electrical schematic of the frame memory data port of the microprocessor control illustrated in FIG. 29.
Figure 36:
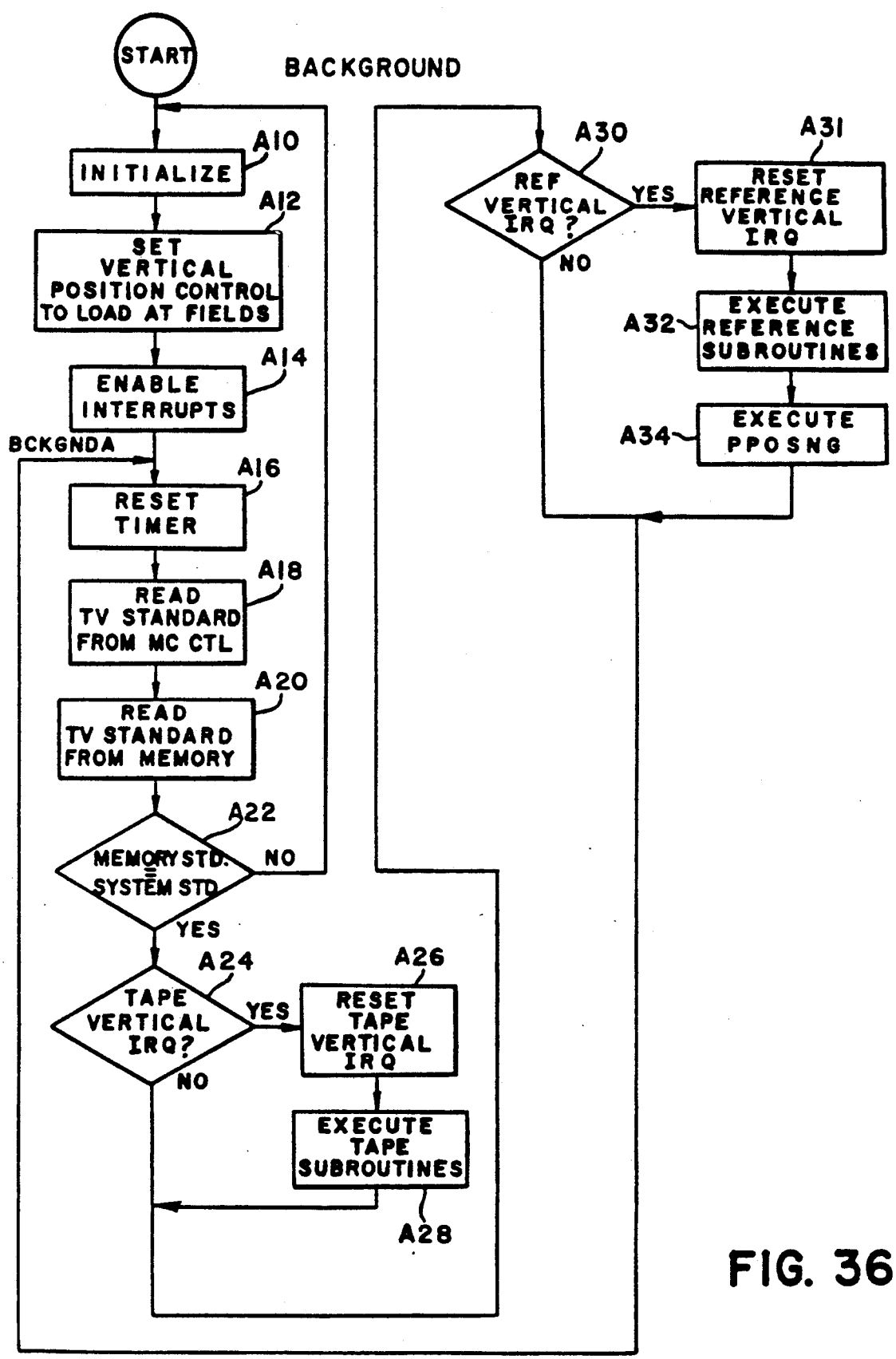
FIG. 36 is a system flow chart of the background routine of the microprocessor control illustrated in FIG. 29.

The output of the bistable 514, which causes the freeze condition, is generated from the D input of the bistable 514 which is the FZ ON/OFF signal set in the mode control register 638 (FIG. 31). Depending upon the logic level of this signal at the time of the FRZ CLK, the write enable signal WE will either be inhibited or enabled. The FZ ON/OFF signal is generated by the operator and through the system control 14, and transmitted to the memory control 110 where it is written into the mode control register 638. The freeze control signal is produced synchronous with the FRZ CLK clock such that the memory 106 is frozen at the beginning of a frame. Alternatively, if the input video present signal IV PRES goes to a low logic level and the autosave signal AS ON is enabled, then a NAND gate 526 will reset bistable 514 causing the write enable signal WE to be inhibited. This condition indicates that the input video signals are no longer present and the autosave signal has been set in the mode control register 638 of the device.

FIG. 26 illustrates how the read and write memory cycles of the frame memory 106 are uncoupled in comparison with the normal synchronous read/write cycle of former memories. It is noted that a write group of signals is generated synchronously with the start write pulse STWR and a read group of signals is generated synchronously with the start read pulse STRD. The generation of a write group and a read group constitutes one memory cycle and provides for writing one frame block of words into the memory while another frame block is read from memory. However, the read group and write group are uncoupled; that is they do not always have the same relative timing relationship to the other. This is because the start write signal STWC and the DREF H do not always occur in the same temporal relationship.

The status of the bistable 520 in FIG. 25 indicates periods of time for interlaced generation of the two groups of memory control signals. Initially, the start write pulse sets the bistable 520 and then allows a period of time for the write group of signals to be generated. After these are generated on the rising edge of the CAS signal, the bistable 520 is reset. The start write pulses occur synchronously at the rate of the reference 2/5 fsc clock signal. At any time between the resetting of the bistable 520 and the next-start write signal STWR which will set the device again, the read group may be generated. Writing into the frame memory 106 in synchronism with the reference 2/5 fsc clock, determines how far the start write pulses will be apart. As shown in FIG. 26B, the read group (distance A) can, therefore, be moved to any position between the end of one write group and the start of another write group (distance B) to reposition the video picture. Conveniently, this can be done for an entire horizontal line by delaying the reference H pulse with the microprocessor controlled delay.

Further, because the read and write groups for each field will start with the DREF H pulse, all horizontal lines in a particular field will be delayed the amount that is set in at the beginning at the particular line for the DREF H signal. Thus, if the delayed reference H delay is changed only once every field, an entire field and/or frame can be delayed a precise amount. This permits a very precise horizontal position control for locating the video frame horizontally, and for providing color correction by a 180° phase shift, and other purposes.

The addressing scheme of the line memory 82 will now be more fully described with reference to FIG. 27. The line type control 338 reads the present line address (line type) which is being written and compares it to the previous line type which was written. This information contains the line memory write address and is an indication of the rate at which information samples are being absorbed by the line memory. The read address of the line memory is calculated from this information during shuttle to prevent the two from overlapping.

The truth table in FIG. 27 indicates the algorithm for generating the read address signals MEM CON H/2, H/4. One cycle will be illustrative of the general operation. The line type control 338, in general, attempts to maintain a two line separation (½ the memory) between the read and write addresses. Therefore, for the condition where the previous write address was line 0, the previous read address will be line 2. For a four line memory the only possible conditions are where the write address changes by 0, 1, 2 or 3 lines from the previous write address. If the write address does not change, then the present write address will be line 0 and the read address will not be changed from line 2. In this manner, data rates slower than the nominal rate can be accommodated by shifting the read address to repeat a line until the write address changes. Thus, if the VTR 10 is in reverse shuttle and the data rate is 0.5× nominal, each read address will usually be repeated twice and then incremented to the next address thereby approximately doubling the actual data rate.

If the write address changes by one horizontal line to line 1, then to maintain the two line separation between the read and write addresses, the read address is changed from line 2 to line 3. This operation indicates that the data samples are incoming at approximately nominal speed and the read address only needs to be incremented one line to maintain registration.

If, however, the incoming data samples are entering the line memory at the rate of forward shuttle, then the write addresses will generally be changing twice for every reference period because the data rate is 1.5× nominal. If the write address changes in this manner, from line 0 to line 2 in the example, then the read address is also incremented twice, from line 2 to line 0 to maintain a two line spacing between the addresses. Because the read address was incremented by two lines, the data in line 3 has been discarded (not read and transferred to the frame memory 106). Therefore, the data is discarded at an average rate such that the 1.5× nominal incoming rate is reduced to the nominal rate before data transfer to the frame memory 106. Because the shuttle operation produces data at the rate of 1.5× nominal the most usual operation of the line type control will be to increment one line, then two lines in an alternating fashion thereby discarding one horizontal line for every three written and for every two read.

It is evident from the maximum data rate of 1.5× nominal for a VTR in forward shuttle that the write address cannot change increment faster than two horizontal lines written at the tape rate for one horizontal line read at the reference rate. Therefore, the condition of the write address incrementing by three lines is marked by an X. In fact the condition where the write address begins writing into location line 3 before the reading from location line 2 is finished may cause an address conflict.

Thus, for faster data rates than 1.5× nominal the line memory needs to be larger and another buffer line could be added so the address algorithm can to maintain the read address pointer 3, 4, etc., lines ahead of the write address pointer. The gain in data rate for additional lines is a multiplicative function. If the data rate increases to 3× nominal then only one extra line need be added to the present four and if the data rate increases to 4× nominal then only 2 extra lines need be added to the present four, etc. The least number of lines of memory for this method is one for writing, one for reading, and an integer number of buffer lines just greater than the ratio of actual data rate/nominal data rate.

Figure 27A:
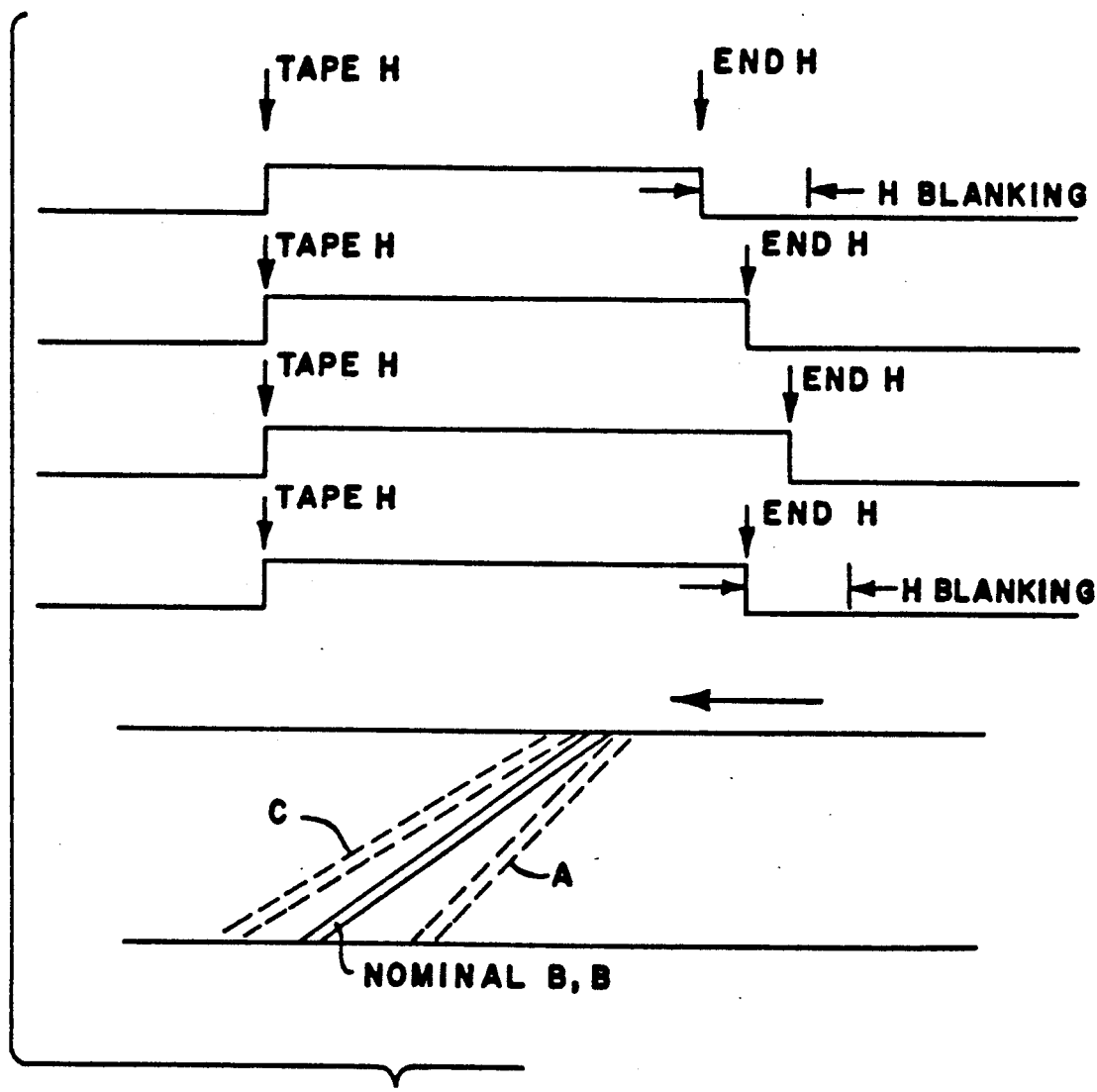
FIGS. 27A is a waveform diagram of the horizontal frequency correction performed in line memory illustrated in FIG. 9.

The timing corrector memory and line type control operate in another mode for normal tape speeds and for the nonstandard tape speeds of special effects of the VTR 10 including still frame, slow motion, and fast motion. In these special effects modes as indicated in FIG. 27A, the length of the horizontal lines are nonstandard because of the head to tape speed used for reading each track or field is not the same as in normal play. Head motion is shown along nominal track length B—B, a shorter track length shown at A, and a long track length shown at C. The longer track length occurs when tape moves faster than nominal speed and a shorter track length occurs when it moves slower. However, the vertical data rate is the same because an entire track is read, and information should not be discarded or repeated, but merely retimed.

Therefore, for playback modes of the VTR 10 where it is unnecessary to discard or repeat data for a field, the reading of horizontal lines into the frame memory occurs at the TAPE H rate. If one line is input to the line memory at the TAPE H rate and one line is read out at the TAPE H rate the read and write addresses of the line memory will never conflict and thus the discarding and repeating function of the line type control will be locked out.

Because the horizontal lines are shorter or longer in time than reference lines in these modes, there is an cumulative timing error for a field in special effects modes which may be ±3-4%. Over a field, if this error were allowed to accumulate the amount could equal as much as ±10 lines of error. This amount would be more error than could be corrected for in the line memory if it were not for the horizontal blanking interval.

The line memory has data samples written into it, beginning with TAPE H and ending with the number of samples constituting one horizontal line. The clock used to write the data is the inhibited reference clock used to rephase samples. The line memory has the data samples read from it starting with TAPE H and ending with the number of samples constituting one horizontal line. However, the read clock is the reference clock and is used to retime each sample as it exits the line memory. Shorter or longer horizontal lines are retimed each line to the correct line length by this method.

The horizontal blanking period is approximately 10u sec. of the 63.4u sec. horizontal period and because the line memory is not written or read during this period, the timing difference in horizontal lines can be absorbed every line and will not accumulate. The shorter horizontal line A is shown being written into the line memory in the waveform diagram A and a reference line is shown being read out of the memory at waveform B. If the reference line ca be read out during the writing and the blanking period of waveform A, then the line can be retimed. The longer horizontal line C is shown being written into the memory at waveform C and a reference line is shown being read from the memory at waveform D. If the longer line can be written into the line memory during reading the reference line and the horizontal blanking of waveform D, then the line can be retimed.

Figure 28:
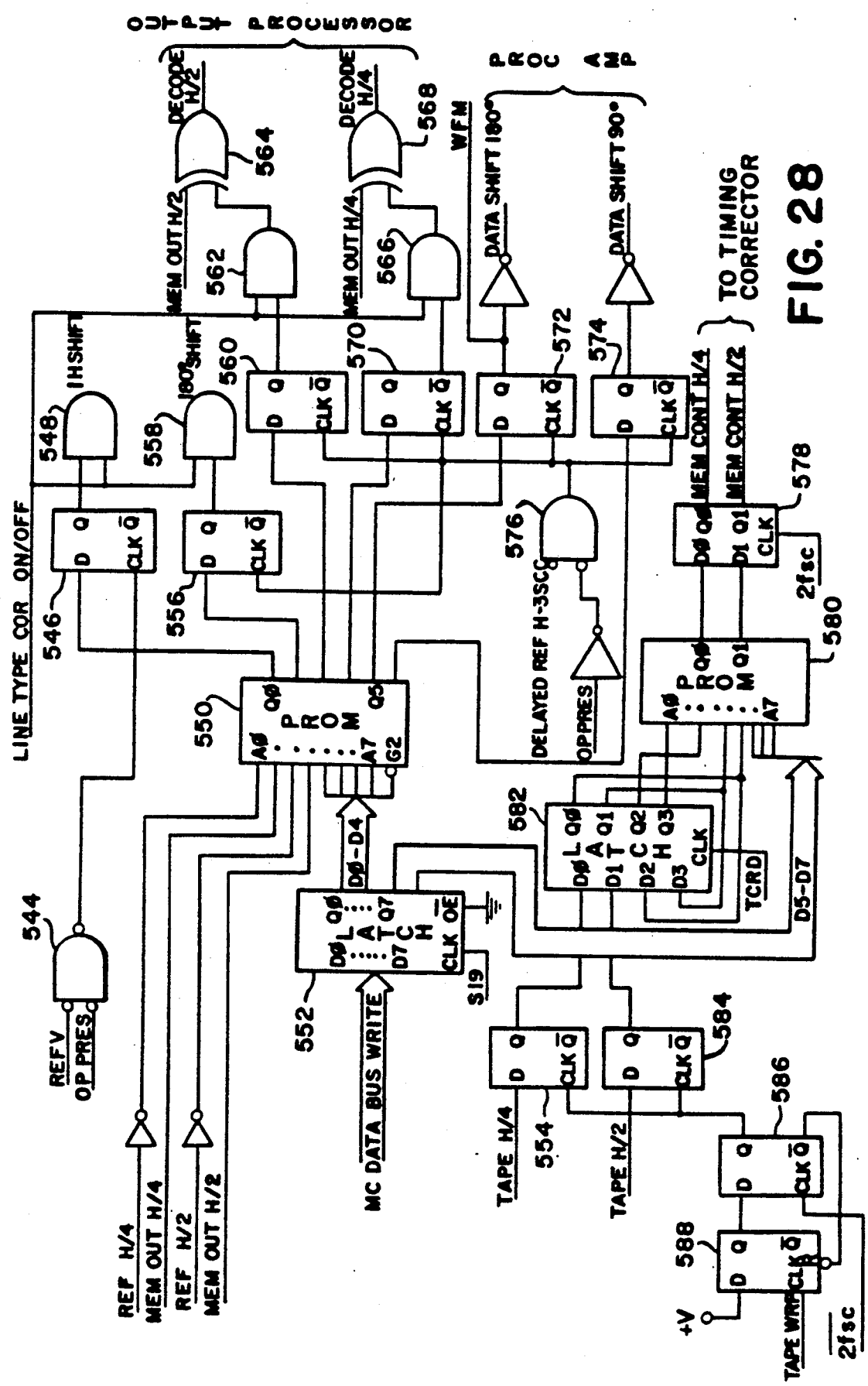
FIG. 28 is a detailed electrical schematic of the line type control of the memory control function circuitry illustrated in FIG. 17.

FIG. 28 is a detailed electrical schematic of the line type control 338 which receives the line type information about an incoming tape field sequence from signals TAPE H/2 and TAPE H/4 and the line type information about the desired output reference field sequence from reference signals REF H/2 and REF H/4 and generates signals to different modules in the TBC to control line type and field sequencing operations.

In general, the line type control 338 comprises two sections, a control signal generation section and a line type data generation section. The control signal generation section is controlled by a PROM 550, and the data generation section is controlled by a PROM 580. A data latch 552 is connected to the write portion of the memory control data bus and provides a means for the microprocessor 158 to write a data word to the device with a select line S19. The data outputs D0–D4 of the latch 552 are used by PROM 550 to select particular sections or address blocks of the memory for decoding inputs A0–A3. Further, the data lines D0–D4 include a bit which either enables or disables the PROM by applying a logic level to its G2 input.

In this way the microprocessor 158 can choose certain decoding sections of the PROM 550 to change the decoding algorithm based on TV standard. The TV standard is set by the operator and decoded by the system control 14 and, thereafter, transferred to the memory control 110. Similarly, the PROM 580 has data lines D5–D7 from the latch 552 connected to its address inputs A5–A7. These data inputs select certain decoding blocks in the PROM 580 for decoding data inputs to its other address lines A0–A3.

The data generation section of the line type control 338 includes two D-type bistables 588 and 586 which receive the tape write pulse WRP to produce a clocking pulse which is synchronous with the 2 fsc clock. This pulse from the Q output of the bistable 586 clocks line type signals, TAPE H/2, TAPE H/4, H/4, of the incoming data into bistable devices 554 and 584. This line type information is then clocked into a latch 582 by the signal WEH at reference horizontal rate. Outputs Q0 and Q1 of the latch 582 are connected to the inputs of two other bistables of the latch 582. Therefore Q0 and Q1 represent the tape H/2 and H/4 signals at the beginning of the present reference horizontal period, while Q2 and Q3 represent the tape H/2 and tape H/4 as they were one reference horizontal period ago. Both pairs of outputs from latch 582 are supplied as four bits of an address for PROM 580. The PROM 580 produces two sets of data pairs MEM CONT H/2, H/4, according to the rules described earlier and presented by FIGS. 27, 27A, which are output to the timing corrector from the Q0, Q1 outputs of the PROM 580 which are reclocked in buffer 578 to be synchronous with the 2 fsc clock pulse.

The timing corrector uses these two signals as the two most significant bits of the read address of the line memory 82 and also inserts these coded signals into the data stream at the beginning of the data of the horizontal line addressed by these bits. In this manner, every horizontal line is preceded by the information as to its type, as it is clocked through the frame memory 106. These signals are extracted from the data stream after passage through the frame memory 106 to become the MEM OUT H/2, H/4 signals which represent available line type to the A1 and A4 address inputs of the line type comparator PROM 550. In combination with the desired line type signals REF H/2, H/4 which are input to the A0 and A2 inputs of the PROM 550, these signals are compared and provide enabling signals to the control portion of the line type control 338. The reference signals REF H/2, H/4 indicate the desired output sequence of fields after being decoded by the PROM 550 for TV standard and the MEM OUT H/2, H/4 signals indicate the actual line type output from the frame memory 106 after being decoded by the PROM 550 for the TV standard. Therefore, signals Q0–Q5 of the PROM 550 indicate certain control actions which must be taken if the actual line type is to be changed to the desired line type such that appropriate field sequence or color correction can occur.

The outputs Q0–Q5 of the PROM 550 are distributed to the D inputs of the bistables 546, 556, 560, 570, 572, and 574, respectively. These control signals are clocked at the particular times to become control signals to different parts of the TBC 12. For example, the Q0 output is clocked into bistable 546 by the output of a NAND gate 544 to become the 1H shift signal output from a NAND gate 548. The clock signal from the NAND gate 544 is produced at the reference vertical REF V, if the output processor module 112 is not present or disabled as indicated by the signal OP PRES. This clocks the line type comparator PROM 550 output Q0 into bistable 546 at a vertical rate if the output processor is not present or disabled and will add 1 horizontal line delay to the data path of the video data required for color correction mode by memory control in PAL and PAL-M, when a 90° subcarrier phase is needed, which may be accomplished by that delay. If the output processor 112 is present and enabled, the vertical timing control for color correction should not be used. This output is the signal generated by the NAND gate 548, 1H shift to the vertical timing control. The NAND gate 548 is enabled by the microprocessor set line type correction on/off signal.

The bistable 556 is clocked by the output of a NAND gate 576 to produce the signal 180° SHIFT at the output of the NAND gate 558. The D input of the bistable 556 receives the Q1 output of the PROM 550 which is an indication that color correction requires 180 degrees shift of color subcarrier phase. The 180° SHIFT signal is generated if the line type correction on/off signal is a high logic level enabling the gate 558. The clocking signal to bistable 556 is timed to the reference horizontal sync signal delayed by three subcarrier cycles. This signal is transmitted through the gate 576 which is enabled by the output processor module 112 being present. Likewise, bistables 560, 570, 572, and 574 are clocked by the output of the NAND gate 576.

The outputs of the bistables 560 and 570 produce output processor color correction control signals DECODE H/2, H/4 if NAND gates 562, 566, respectively, are enabled by the line type correction on/off signal. If no line type correction is to be applied, then the DECODE H/2, H/4 signals are taken directly from the MEM OUT H/2, H/4 signals by exclusive OR gates 564 and 568, respectively. If the line type needs to be corrected, the MEM OUT H/2, H/4 are inverted by the gates 564 and 568. The output processor takes these decoding signals and produces color correction from the input data of the frame memory 106 before providing the data to the processor amplifier module 118. The bistables 572 and 574 produce data shift signals to the processing amplifier data shift, 180°, data shift 90° through respective inverters 573 and 575 if the output processor 118 is present. The Q4 and Q5 outputs, respectively, decode into the type of delay that the output processor 118 will produce in the data going into the video bus path for the line type and color sequencing data from the PROM 550.

Figure 29:
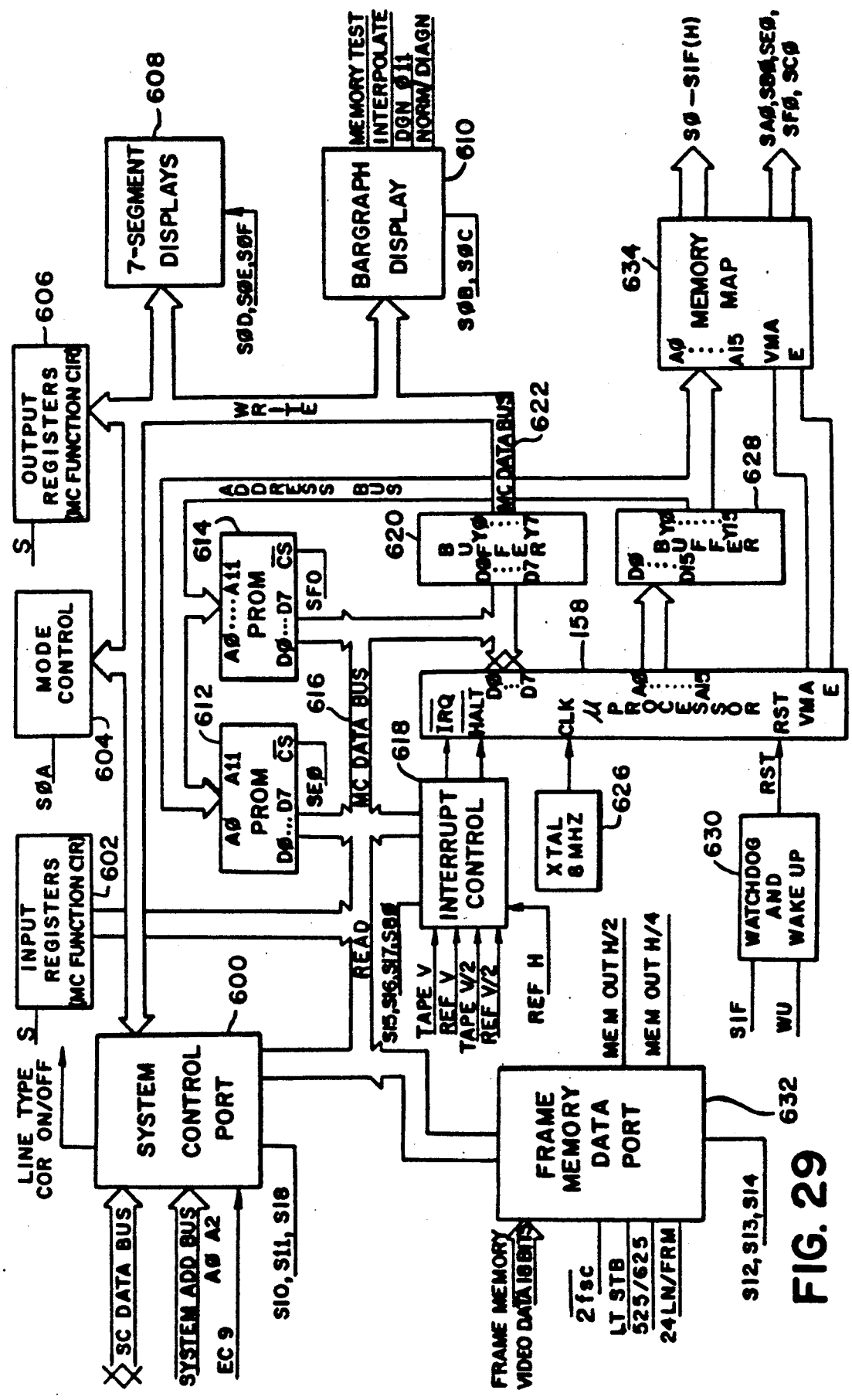
FIG. 29 is a system block diagram of the microprocessor control of the memory control illustrated in FIG. 7.

The microprocessor based control of memory control 110 is illustrated in more detail in FIG. 29. The control includes a microprocessor 158 which regulates the communication and operations of the memory 106 for time base correcting and video positioning, executes a memory control program stored in programmable read only memories (PROM) 612 and 614. The PROMs 612, 614 are addressed through an address buffer 628 which receives address signals from the microprocessor 158 by its address outputs A0-A15. The buffer 628 retransmits those address signals from its outputs Y0-Y15 to the address inputs A0-A11 of PROMs 612 and 614 to select the location of an instruction of the program to be executed. The instructions in the PROMs 612 and 614 are readable by the microprocessor 158 over a read portion of MC data bus 616 which takes the data from the D0-D7 outputs of the PROMs and transfers them to the data inputs D0-D7 of the microprocessor. The microprocessor 158 is clocked at a 8 MHz. rate from the output of a crystal generator 626. Further, the microprocessor 158 can be reset at input RST by a watchdog and wakeup circuit 630.

All external peripherals of the microprocessor 158 are selected by decoding the address signals A0-A15 with a memory map 634. The memory map 634 receives, in addition to the address signals A0-A15, an enabling signal from the valid memory address output VMA and an enable clock signal E from the microprocessor 158. From the enable clock signal E, the enable signal VMA, and the address signals A0-A15, the memory map 634 generates a plurality of select signals S00-S1F (Hex) and SAO, SBO, SCO, SEO, and SFO. These select signals are used to enable particular devices to which the microprocessor 158 is transferring data or from which it is receiving data from over the MC data bus. For example, the PROM 416 is enabled by the select signal SEO applied to its chip select input *CS and the PROM 418 is enabled by the select signal SFO applied to its chip select input *CS. Other peripherals including 7-segment displays 608, a bargraph display 610, output registers 606, input registers 602, a mode control register 604, a system control port 600, and a frame memory data port 632 are enabled by various of the select lines.

The memory map 424 is illustrated in detailed schematic form in FIG. 33 and comprises a plurality of decoders 682, 684, 686, 688, and 690. The master decoder 682 provides select signals for different blocks of memory and separate functions. This decoder divides memory into approximately 8k blocks and is enabled by the valid memory address signal VMA applied to its enable input *GB. Further, the decoder 682 is enabled by a high logic level of address line A15 and is clocked by the external clock signal E from the microprocessor 158 applied to its *GA enable input. The particular block of memory (peripherals) which the decoder 682 selects is developed from address lines A12-A14 applied to its decoding inputs A, B, C. From the bit combination of address lines A12-A14, the decoder 682 provides a select line Q0 for enabling decoders 684, 686, 688, and 690 or a plurality of block select signals SAO, SBO, SCO, SEO, and SFO.

If the Q0 output is selected by decoder 682, then the single select decoders 684, 686, 688, and 690 are enabled by a low logic level applied in parallel to their *GA enable inputs. Each decoder produces a one of eight selection, depending upon the values of address lines A0-A2. Address lines A3 and A4 are used to select between the four decoders. Therefore, the decoders will decode the addresses lines A0-A4 into one of the thirty two select lines S00-S1F (Hex). The first decoder 684 is enabled by *A3, *A4 selecting the first eight of the thirty two possible combinations. Addresses A0-A2 then select one of that block of eight possible selections. The decoder 686 is enabled by the signals A3, *A4 which select the second group of eight of the thirty two and further have address lines A0-A2 selecting one of that group of eight. Decoder 688 is enabled by the signals A3, A4 which select a third group of the group of eight of the thirty two possible choices. Thereafter, one of the possible eight choices is selected by the decoding the bit selection from address lines A0-A2. Finally, the decoder 690 decodes the addresses *A3, A4 which selects the fourth group of eight of thirty two for further selection of one of eight by address lines A0-A2.

Returning now to FIG. 29, the microprocessor 158 uses the selection signals and data bus to write data to a plurality of the peripheral function circuits including the bargraph display 610, the 7-segment displays 608, the output registers 606 in the memory control function circuitry 150, the mode control register 604, and the system control port 600. Further, the microprocessor 158 uses the selection signals and data bus to read data from a plurality of the peripheral devices including the PROMs 612, 614, the interrupt control 618, the input registers 602 located in the memory control function circuitry 150, the system control port 600, and the frame memory data port 632. The memory control data bus is bifurcated by a data bus buffer 620 into a write portion 622 and a read portion 616. This bifurcation is provided in order to decrease the load of the microprocessor data lines when the microprocessor is sending data to multiple peripherals.

The bargraph display 426 is used for displaying data in analog form based upon a digital value. A schematic implementing the bargraph display 610 is more fully illustrated in FIG. 32A. The display comprises two clocked latches 674 and 676 and a plurality of light emitting diodes 667 arranged in a bargraph or straight line. Data which are to be displayed by the diodes are clocked into the latches 674, 676 from the write port on of the memory control data bus 622 with select signals SOB, SOC. The outputs Q0-Q7 of the latch 674 are tied to the cathodes of the diodes 667 in different bit combinations. The outputs Q0-Q2 of the latch 676 are tied to groups of the anodes of the diodes 667. Selecting a particular bit combination such that the cathode of a selected diode sees a logic 0 and enabling the anode of the particular group where the selected diode enabled with a logical 1 will cause the diode to light. Since bit combinations in the latch 674 are not repeated in any of the groups, a one diode of twenty, shown as group 667, can be enabled. In this manner, any diode from the bottom of the bar to the top of the bar can be illuminated giving an analog representation of a digital number. Further, the bargraph display latch 676 can latch certain bits from the write portion of the memory control data bus 622 to become control signals for other modules of the time base corrector. A memory test signal, an interpolate signal, a diagnostic signal DGN 0/1, and a NORM/DIAG signal can be transmitted in this manner.

The 7-segment displays 608 are used to display digital data as decimal numbers or letters. The 7-segment displays 608 which are additionally shown in more detail in FIG. 32A, comprise three latches 662, 664, and 666 along with corresponding display chips 668, 670, and 672. Data can be clocked into the latches 662, 664, and 666 by signals on select lines SOD, SOE, and SOF, respectively, when the microprocessor 158 places data words on the write portion of the memory control data bus 622. Depending upon the value of the data clocked into a latch, the 7-segment display chips 668, 670, and 672 will display either a decimal numeral or a letter, as decoded by their a-f inputs corresponding to the individual segments of the display.

The mode control register 604, which is more fully detailed in FIG. 30, comprises a clocked latch 638 which receives control data from the write portion of the memory control data bus 622 when the select signal SOA is generated. The data word clocked into the latch 638 becomes six control signals which are used by the memory control function circuitry 150 to produce particular operations. Specifically, the Q0 output, depending upon its logical level, indicates to the memory control function circuitry 150 that the TV standard is either a 525 line standard or a 625 line standard. The Q1 output of the latch 638 indicates to the memory control function circuitry 150 that the video tape recorder is in a shuttle mode of operation and, therefore, the memory control 110 of the time base corrector 12 should be also. The outputs Q2 and Q3 are used to produce the operations of autosave and freeze if they are set at high logic levels. The Q4 output is used to load the read address counter with the start read addresses when set. The last signal, generated from the Q5 output, is used to inform the memory control function circuitry 150 whether a 24 line memory or a frame memory is being used in the TBC configuration. Generally, the bits are set in the latch 638 in response to information processing by the microprocessor 158 of data obtained from the system control 14, other portions of the memory control function circuitry 150, or other modules of the TBC.

Communications of the memory control 110 with the system control 14 are via a bidirectional system control port 648 which is additionally detailed in FIG. 30. The bidirectional control port 648 comprises a memory control data register configured as clocked latch 636 and a memory control module control register configured as a dual set of clocked latches 640 and 642. Inputs D0-D7 of the latch 636 receive data from the microprocessor 158 over the write portion of the memory control data bus 622, and the outputs Q0-Q7 of the latch present that data to the system control 14 via the system data bus. The data are clocked into the latch 636 by providing a strobe to its input CLK with selection signal S10 and are output on the system data bus by enabling the latch with a low level logic signal to its *OE input. In this manner, the memory control 110 can strobe status data about the operations of the frame memory 106 into the memory control data register 636 where it can be read by the system control 14 by the reading enabled outputs Q0-Q7.

Conversely, control data may be written into latches 640 and 642 by the system control 14 to command the memory control 110 to take certain actions or supply it with needed data about the configuration of the time base corrector and/or the status of other modules in the TBC. The latches 640 and 642 have their data inputs D0-D7 connected in parallel with the system data bus and can input data from that bus upon a clocking the signal to their CLK inputs. The clocking signals for latches 640, 642 are generated by outputs Q1 and Q2 of a multiplexer 644, respectively. After the control data have been written into the memory control register by the system control 14, the memory control 110 can read the data by enabling the outputs Q0-Q7 of a particular latch with the selection signals S11 and S18. The control information from the system control 14 is transmitted over the read portion of the memory control data bus 616 to the microprocessor 158. In this manner, the system control can write data into the latches 640 and 642 and the memory control 110 reads that data to execute the commands and act on the status information contained therein.

The decoder 644 is used to decode the system address lines A0-A2 and the system selection signal EC9. The decoder 644 has its *GB enable input grounded and its G enable input connected to a source of positive voltage TV. Therefore, a low logic level by the selection signal EC9 will enable the decoder 644 to decode the address lines A0-A2 to either output data from latch 636 with the Q0 output, or input data to latches 640 and 642 with outputs Q1 and Q2, respectively. Further, the data line D4 of the system data bus is connected to the D input of a bistable 646 and the selection signal generated from the Q2 output of the decoder 644 is used to clock the bistable 642. Thus, depending upon the value of the bit applied to the D4 data line of the system data bus, the Q output of the bistable 646 will be set to that value. The bistable 646, therefore, generates an immediate control signal for the memory control function circuitry 150 of the same value as the data latched into the D4 input of latch 642. This data bit controls the line type correction on/off function, and is used directly by the memory control function circuitry 150 to perform the operation.

The frame memory data port 632 is used to input video data as they are output from the frame memory 106 and allows the microprocessor 158 to process those data. The frame memory data port 632 which is more fully detailed in FIG. 31 comprises basically three clocked data latches 652, 656, and 658. The 18-bit words output from the frame memory 106 onto the video data bus form two 9-bit data samples MAD0-MAD8 and MBD0-MBD8. The first 8-bits MAD0-MAD7 of the first sample are clocked into the D0-D7 inputs of the latch 652 and the last bit of the first sample is clocked into the D0 input of the latch 658. The first 8-bits MBD0-MBD7 of the second sample are clocked into the D0-D7 inputs of the latch 656 and the last bit of the second sample is clocked into input D1 of the latch 658. These data samples are clocked into the latches by an inverted 2 fsc clock applied to their CLK inputs. The outputs Q0-Q7 of the latches are connected to the read portion of the memory control data bus 616 to allow the microprocessor 158 to read in the data being output from the frame memory 106. The outputs of the latches 656 and 658 are connected directly to the data bus 616, and the outputs of latch 654 are connected to the bus through a buffer 654. The microprocessor 158 by generating an address which is decoded into selection signals S12, S13, and S14, will cause the sequential placing of the video data stored in latches 652, 656, and 658, respectively, on the data bus 616.

Further, the output enable *OE of the latch 652 is strobed at a particular time determined by a line type strobe signal LTST. The line type strobe signal is generated during the horizontal blanking period when the line type data sample is present in the video stream. This allows the output of the latch 652 to generate the signals MEM OUT H/2 and MEM OUT H/4 to the output processor modules indicating the type of H line which was just output from the frame memory 106. The inputs D6 and D7 of the latch 658 are connected to jumpers which are grounded depending upon whether the configuration of memory 106 present used is 525 or 625 lines and whether a frame memory or a 24 line memory is present. The microprocessor 158 reads the latch 658 to determine the status of these two bits and then informs the system control 14, the mode control register, and other function modules of the configuration. Further, the microprocessor 158 acts on this information for initialization constants and/or to change processing paths of the control program.

FIG. 34 illustrates the detailed electrical schematic of the interrupt control 618. The interrupt control 618 comprises two D-type bistables 700 and 702 which receive at their clock inputs the tape vertical sync-pulse TAPE V and the reference vertical sync pulse REF V, respectively. These signals have been delayed by the timing control 301. The Q outputs of the bistables 700 and 702 are connected to the inputs of a NOR gate 706 which has its output tied to the interrupt request pin *IRQ of the microprocessor 158. Thus, when either of the signals is present the respective bistable is set and an interrupt request generated to the microprocessor 158. At that time, the microprocessor 158 transfers program control to a interrupt service routine and can, by selecting a buffer 708 with a select signal S15, read which interrupt has occurred. Further, the TAPE V/2 and REF V/2 signals are input to the microprocessor 158 from the buffer 708. The microprocessor 158 by reading these four signals can determine which vertical interrupt has occurred and the present field being written into the frame memory 106 in the case of a tape vertical interrupt, or the present field which should be read out of the memory in the case of a reference vertical interrupt. The bistables 700 and 702 may be cleared by the microprocessor 158 addressing the reset inputs R of the devices with select signals S16 and S17, respectively.

Further, a D-type bistable 704 provides from its Q output a low logic level to the microprocessor HLT input causing the microprocessor 158 to halt processing. The microprocessor can produce the halt signal by clocking the bistable 704 with the select signal SBO. The microprocessor 158 is then retimed to the reference signals by the bistable 704 being reset with the reference horizontal signal REF H. When the bistable 704 is reset the halt signal is removed from the microprocessor 158 and the control program execution is allowed to continue.

FIG. 35 illustrates a detailed electrical schematic of the watchdog and wake up circuit 630. The output of the circuit at the positive terminal of a capacitor 726 is used to pull the reset input RST of the microprocessor 158 to ground. This will cause a reset operation of the microprocessor 158, whereby the program path will jump to a particular location in memory, and the memory control 110 reinitialized.

The microprocessor reset input RST is generally pulled up by a resistor 722 connected to a source of positive voltage +V. However, three conditions can cause the resetting of the microprocessor 158. The first includes a watchdog timer comprising two monostable devices 716 and 720. Generally, the retriggerable monostable 716 is triggered permanently into a unstable state by a select signal S1F to an input gate 714 from the microprocessor 158 as long as the microprocessor executes the main loop of its program frequently enough. That prevents a triggering monostable 720 and, in turn, prevents a reset. Otherwise the monostable 716 triggers monostable 720 through an input gate 718 into an unstable state. When the monostable 720 is in an unstable state, the *Q output connected through a diode 721 to the reset input RST is at a low logic level thereby triggering a reset operation via diode 732. In normal operation, the monostable 716 is periodically clocked by the microprocessor 158 to keep it permanently in its unstable state and not to trigger the monostable 720 and prevent a reset. The instruction of the control program triggering of monostable 716 is located in a background loop and is executed periodically to prevent the second monostable 720 from resetting the microprocessor. However, if this instruction is not executed often enough to maintain the monostable 716 in a unstable condition, then the control program is not executing properly and the microprocessor 158 should be reset.

In addition, a wake up signal WU is applied to the cathode of a diode 723 which is connected to the reset input RST of the microprocessor 158. Generally, the cathode of the diode 723 is pulled up by a resistor 724 connected to a source of positive voltage +V. However, when the wake up signal WU makes a transition to a low logic level, the cathode of diode 723 will be grounded, thereby resetting the microprocessor 158. This operation occurs at the beginning of the power up cycle of the TBC when the wake up signal is generated by the system control to insure that the microprocessor 158 begins program operation from its initialization routine. Further, a manual reset can be provided by a switch 730 which grounds the reset input RST of microprocessor 158 through a resistor 728.

The control program for the memory control microprocessor 158 will now be more fully described with reference to the flow charts in illustrated in FIGS. 36–42A and B. The basic control program of the microprocessor 158 is divided into two sections, a background routine and an interrupt service routine. Generally, the microprocessor 158 executes the background routine unless an interrupt occurs to transfer control to the interrupt service routine. When an interrupt occurs, the interrupt service routine performs the necessary real time operations to service the interrupt and then returns control of the program to the location in the background program from which the interrupt service routine took control.

The background routine begins in block A10 where, upon power up, it initializes many of the system constants and sets initial values in the hardware registers of the memory control function circuitry 150 to begin initial positioning of the video frame stored in the frame memory 106. Next, at block A12 the program sets two bits in the vertical position control word which are transmitted to the latch 372 to insure that the read and write address counters 326, 322, are loaded at a field rate instead of a frame rate. Before entering the basic background loop, the program enables the interrupts to allow the program to begin functioning normally in block A14.

The first operation in the background loop of the background routine is to reset the watchdog timer 630 in block A16 by generating select signal S1F to insure that the background loop is executing at predetermined time intervals. In block A18 the control registers 640, 642 of the memory control 110 are read to determine the TV standard that the system control 14 has input from the switches of the control panel and transferred to the memory control 110. The TV standard (NTSC, PAL, PAL M, SECAM) is then compared to the TV standard that the memory control 110 has stored in its memory. Because during the initialization step in block A10 the standard was stored in memory from information sent from the system control 14, they should be equal. However, if the standard is changed after initialization, the system control 14 will read this change from the switches of the control panel and transfer the new standard to the memory control 110. If the standard has changed, as determined by a negative branch from block A22, then the program will transfer execution back to the initialization block A10 of the background routine to reset all the constants based on the new TV standard.

However, if the standard transmitted from the system control 14 is equal to the TV standard that is being processed by the memory control 110, then an affirmative branch from block A22 continues the program at block A24. There a memory location containing information about the vertical interrupt conditions is interrogated. Block A24 determines whether this part of the program has been executed since the last tape vertical interrupt request. If it has not, indicated by an affirmative branch, then in block A26 the program resets the tape vertical interrupt flag in an interrupt flag location and then executes a series of tape subroutines in block A28. These subroutines are not critically time dependent upon the vertical interrupt but should be done once every field after tape V interrupt. If this part of the routine has been previously executed, then the tape vertical interrupt request will have been reset by block A26 and the test in block A24 will result in a negative branch to block A30.

In block A30 a similar test is posed for the reference vertical interrupt flag. If this part of the program has not been executed since the last reference vertical interrupt, then a bit will be set in the memory location storing the interrupt flag and control transferred to block A31. The reference vertical interrupt request is reset in the interrupt flag location in block A31 before the program continues at block A32 to execute a number of reference subroutines which are not critically time dependent upon the reference vertical interrupt but should be executed once every field after reference V interrupt. Next the program executes the subroutine labelled PPOSNG in block A34 to check the horizontal and vertical positioning of the video frame with respect to the incoming data. If the REF V interrupt request bit is not set, then the program begins the background loop once again at block A16.

The background loop is continuously processed first to insure the TV standard has remained the same, and then either to execute the tape subroutines in block A28 based on the timing of the tape vertical interrupt request or execute the reference subroutines in block A32 based upon the timing of the reference vertical interrupt request. The program can, therefore, be divided functionally into four separate portions. The first portion which relates to the tape vertical interrupt request is handled by the interrupt service routine to perform those operations which must be done immediately after the tape vertical timing indication appears. A second portion of the interrupt service routine relates to the reference vertical interrupt request and includes those operations for the memory control 110 which must be done immediately after the reference vertical timing indication appears. The two other portions are accomplished in the background routine as just described to execute operations related to the tape vertical interrupt or the reference vertical interrupt but which are not critically timed parts of the control.

FIG. 37 is a detailed flow chart of the initialization block A10 for the background loop of the program. In block A36 the initialization turns the displays 678, 680 off to clear any previous messages which may have been stored therein. Next, in blocks A38 and A40, the PROMs, 612, 614 and internal RAM are tested to determine if all locations are presently operable. After the PROM and RAM tests have been passed, there is an initialization of the internal RAM of the microprocessor 158 in block A44 and an initialization of memory addresses which are not dependent upon the TV standard in block A42. Thereafter, in block A46, the type of memory present in the system configuration is read from the jumpers through latch 658 and that information is stored in memory. These configuration data are also loaded into the memory control data register 636 from where they will be transferred to the system control 14 to indicate to the configuration.

The TV standard is read from the control register 640, 642 of the memory control 14 as supplied by the system control in block A50. The memory addresses dependent upon this TV standard are then initialized in block A52 with different data depending upon which standard has been chosen. Thereafter, in blocks A54 and A56 the starting read address and starting write address of the next fields for the frame memory 106 are loaded into latches 456, 458, 480, 482, 484, and 486. In block A58 the TV standard is read again in the same manner and then written to the line type control register of line type control 338 to initialize that device. In block A62 the vertical position control register, latch 372, is initialized with a starting value. The initialization routine continues at block A64 where a test is performed to determine if the output processor module 112 is present. The information is obtained from the system control 14 through the control registers 640, 642 of memory control module. Thereafter, depending upon whether the output processor module 12 is present, the initial horizontal position control register 362 is set to its starting value in block A66 or that value is increased by one horizontal line in block A70. Because the output processor delays the video signal for one horizontal line, the horizontal position control must be set back one horizontal line to compensate for this timing error. The background loop is then executed as previously described in FIG. 36.

The tape subroutines (A28) include a jump to a location labeled MFRZOFF in block A72 as shown in FIG. 38. This jump to a particular location permits a number of subroutines to be executed which are contained in the subroutine FROMSY which is executed in block A78 during execution of the reference vertical subroutines (A32) in FIG. 39. Therefore, the tape subroutines (A28) are a subset of the reference subroutines (A32) and cause those subroutines which overlap to be executed twice every field. This updating is used for particularly important subroutines which although they do not need to be critically timed to an interrupt, should be executed more often than as the other subroutines of the reference group.

The reference subroutines (A32) of the background program will now be more fully explained with reference to FIG. 39. In block A74 the program determines whether the reference field to be read is odd or even and, depending upon the outcome of the test, transfers control to one of two separate paths. The information about the reference field is obtained from the reference vertical interrupt and the reference signal REF V/2 input through the buffer 708. One path through blocks A76 and A78 when the reference field is even, executes the subroutine labelled TOSY, which performs communication functions by sending information to the system control 14 from the memory control 110. The next routine, labelled FROMSY, executes commands from the system control 14 which are to be performed by the memory control 110. The other path through blocks A80–A84 when the reference field is odd, is used to calculate the distance between the reading and writing operations of the frame memory 106 and to display that distance. The subroutine labelled WRRDDIS is called in block A80 to calculate the distance in increments of horizontal lines between the read address and the write address of the memory at the beginning of a tape frame. These addresses are stored by the tape vertical interrupt service routine. Once this number (depending upon the TV standard and the configuration of the system) has been calculated, it is displayed to an operator by calling a subroutine labelled BGPH in block A82 and a subroutine labelled DISPL in block A84.

The subroutine BGPH receives the calculated distance in horizontal lines between the read and write function and displays it on the series of LEDS 667 termed a bargraph. The center of the bargraph (LEDs 10, 11) is nominally set at 28 horizontal lines which is the normal advance that the TBC 12 usually uses to write the information in frame memory 106 before reading it. This variable is determined by the TBC 12 suppling an advanced reference vertical signal to the video tape recorder 10 which is followed during reproducing. On either side of this nominal 28 H advance are respective series of LEDs 1–9, 12–20 indicating in increments of horizontal lines whether the advance is greater or less than the standard 28 line reference.

First, the subroutine BGPH determines whether the advance is less than a particular range surrounding the 28-line standard and if so, displays that advance in the bargraph display 667. Otherwise, the BGPH subroutine will blank the bargraph if the advance is too far out of range either leading or lagging the standard. The subroutine DISPL receives the same information calculated by the subroutine WRRDDIS and displays the advance distance in horizontal lines on the three 7-segment displays 668, 670, 672 of the memory control 110.

Figure 40A:
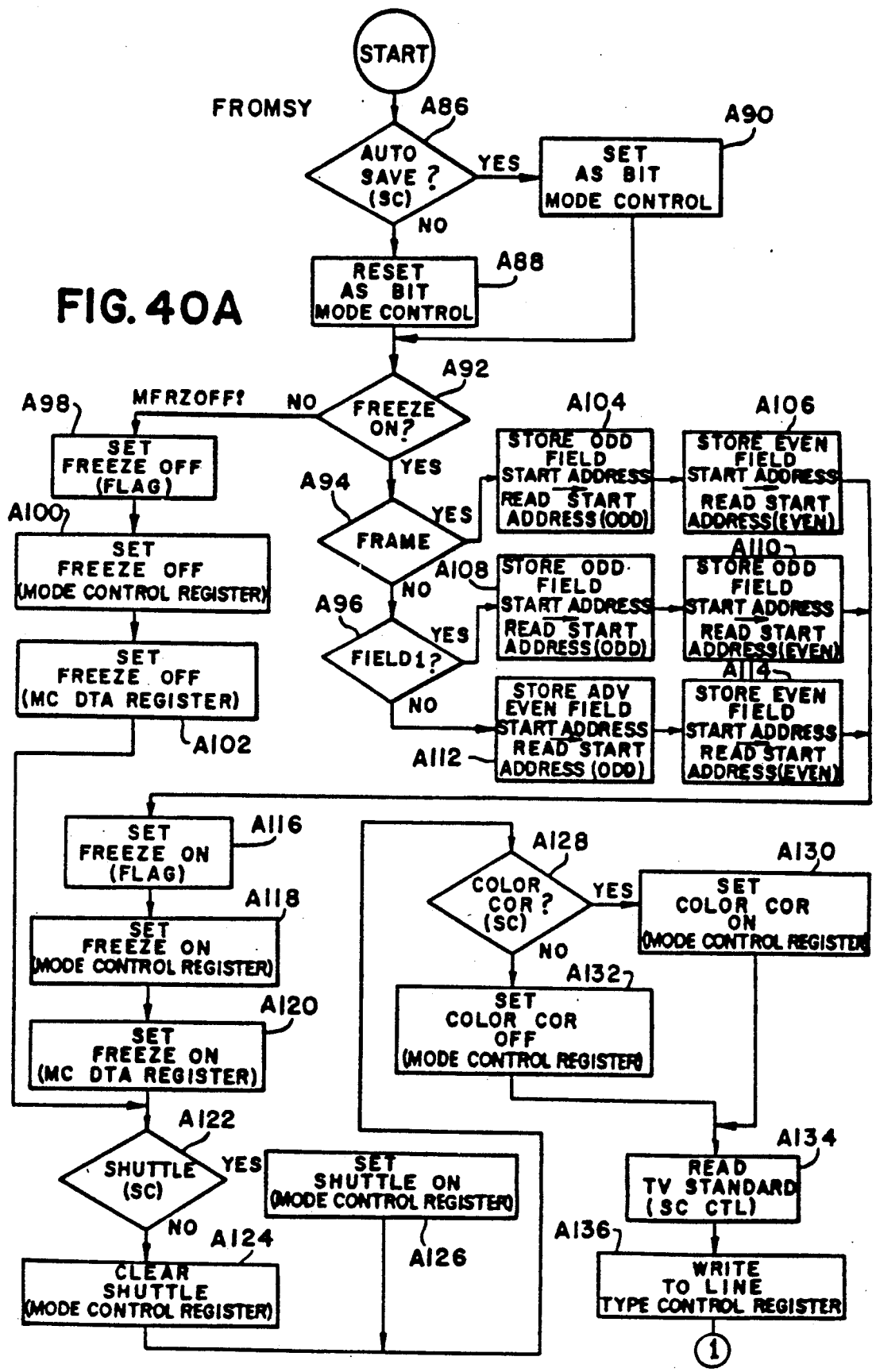
FIGS. 40A and 40B are a detailed flow chart of the routine FROMSY called by the reference subroutines illustrated in FIG. 39.
Figure 40B:
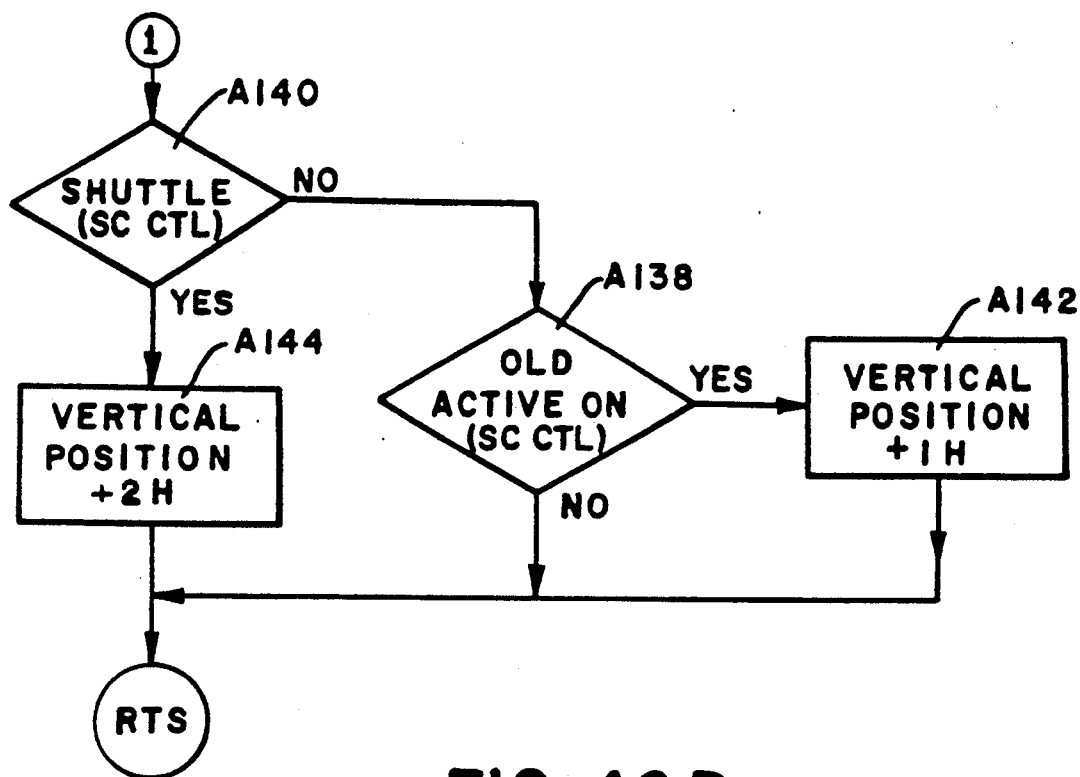

The subroutine FROMSY which executes commands from the system control 14 taken from the control registers 640, 642 is more fully illustrated in the detailed flow chart of FIGS. 40A, 40B. The subroutine begins in block A86 by testing whether the autosave bit in the control registers 640, 642 of the memory control 110 is set. This bit is set according to whether or not the operator has commanded the autosave function to be on by setting a switch on the control panel. If the autosave function is on when input video is lost, the frame memory 106 will automatically save the last frame input as a picture. This operation is accomplished by setting bit 3 indicating the status of the autosave command in the mode control register 638 of the memory control 110. If the autosave command has been issued by the system control 14, then bit 3 is set in block A90 in the mode control register 638 or bit 3 is reset in block A88 if the function has not been chosen.

Thereafter, in blocks A92–A114 the memory control 110 accomplishes those particular operations necessary to command the memory 106 to handle freeze mode commands. The freeze mode commands are checked for in block A92 by interrogating control registers 640, 642 of the memory control 110. Bits are set in these registers from the system control 14 if a freeze command has been given by the operator from switches on the control panel. If a freeze command has been selected, then in block A94 another bit in the control registers is tested to determine whether the operation is for a frame or in block A96 another bit is tested to determine whether the operation should freeze field 1 or field 2.

If the operation is a freeze frame operation, as detected by an affirmative branch from block A94, then in blocks A104 and A106 the starting addresses for odd and even fields are stored in respective odd and even fields start address locations. If the freeze operation is only for field 1, as indicated by an affirmative branch from block A96, then in blocks A108 and A110 the starting address for the odd field is stored in the odd and even start address locations. If the freeze operation is only for field 2, as indicated by a negative branch from block A96, then in blocks A112 and A114 the starting address for the even field is stored in the odd and even start address locations. However, the even field start address is advanced one line for the odd start address location. These operations provide that the frame memory 106 will be read from alternating odd and even fields if a freeze frame operation is desired, from only the odd field if a freeze field 1 operation is desired, and from only the even field if a freeze field 2 operation is desired.

Thereafter, the bit indicating the freeze operation is set in the flag register, the mode control register 638, and the memory control data register 636 in blocks A116, A118, and A120, respectively. The mode control register freeze bit will control certain memory control function circuitry 150 for causing a freeze operation of the frame memory 106. The bit in the flag register (internal memory location) is used for software purposes to test the status of the frame memory 106. The freeze bit in the memory control data register 636 is used to indicate to the system control 14 that the command has been executed and the frame memory 106 is in a freeze mode. Conversely, if a freeze mode is not commanded by the system control as indicated by a negative branch from block A92, then the bit indicating the freeze operation in the flag register, the mode control register 638, and the memory control data register 636 is reset in blocks A98, A100, and A102, respectively.

Program steps including blocks A122–A126 are used to control the shuttle operation of the memory control 110. The shuttle operation is detected by the system control 14 determining the tape speed and VTR mode from the tape clock frequency. If the tape speed is above a certain point, then the shuttle operation is confirmed, and the system control 14 sends this status information to the memory control 110 as a command to shift to shuttle operation. This command is received at this part of the program by reading the control registers 640, 642 of the memory control 110 to determine whether the shuttle bit is set. If the shuttle bit is set, then in block A126 the shuttle bit is set in the mode control register 638 of the memory control 110. Otherwise the shuttle bit is cleared in the mode control register 638 of the memory control 110 in block A124

Following this operation the next three blocks A128–A130 set the color correction bit in the mode control register 638 of the memory control 110 based upon a system control command (not in mode control) The system control 14 generates the color correction command through control registers 640, 642 to the memory control 110 based on tape speed which it determines from the frequency of the tape clock. The color correction bits in the control registers 640, 642 is tested in block A128 and depending upon its state, the color correction bit is either set or reset in the mode control register 638 in blocks A128, A130, respectively, to control the operation.

Next the control registers 640, 642, of memory control 110, are read in block A134 to determine the TV standard which was transferred from the system control 14. In block A136, this TV standard is written to the line type control register 552 to set the PROMs 550, 580 to the correct address block for decoding particular incoming line type information. In the next four blocks A138-A144 the control register 638 of the memory control 110 is checked to determine if the system control 14 has set the one line delay active bit ON in block A138. If the one line delay active bit is not set ON, then in block A142 the vertical position is increased by one horizontal line by writing a data word into register 372. Otherwise in block A140 a test is performed to determine positioning control. An affirmative branch from block A140 indicates that the vertical position should be increased by two horizontal lines which is accomplished in block A144 by writing a data word in the register 372. A negative branch from block A144 indicates that the vertical positioning should only be increased by one horizontal line in block A142. Thereafter the subroutine returns to the background loop to continue the regular program sequence.

Figure 41:
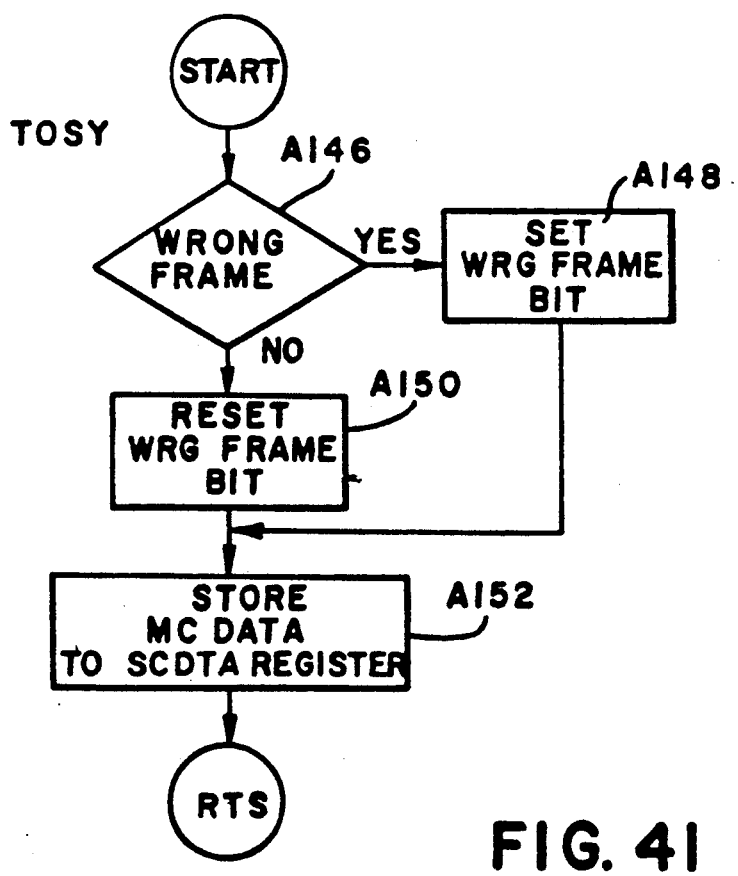
FIG. 41 is a detailed flow chart of the routine TOSY called by the reference routines illustrated in FIG. 39.

The detailed flow chart for the subroutine TOSY is more fully illustrated in FIG. 41. The TOSY subroutine which is used to communicate data to the system control 14 begins in block A130 by determining whether the incoming tape color frame is identical with reference color frame. As mentioned previously, this is accomplished by comparing the signals TAPE V, TAPE V/2 TAPE H, TAPE H/2, TAPE H/4 to the Reference V, V/2, H, H/2, H/4. If the color frames do not match, then the wrong frame bit is set in block A148 otherwise the wrong frame bit is reset in block A150. Thereafter, the wrong frame bit and other information to be transferred to the system control 14 are sent to that device. This operation is accomplished in block A152 by storing information bits in the memory control data register 636 where they will be read by the system control. The subroutine then returns to background execution.

Figure 42A:
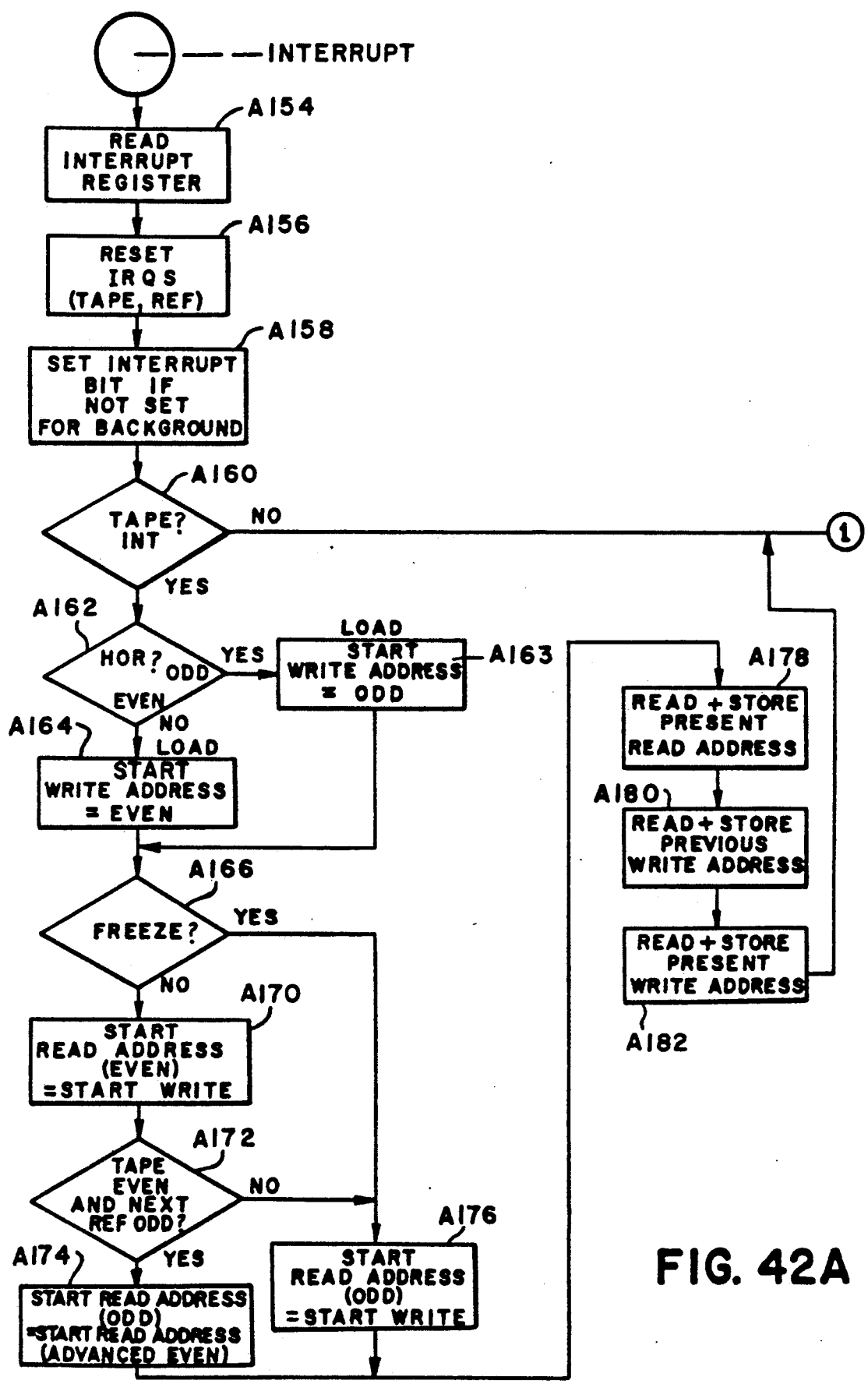
FIGS. 42A and 42B are a detailed flow chart of an interrupt service routine for the microprocessor control illustrated in FIG. 29.
Figure 42B:
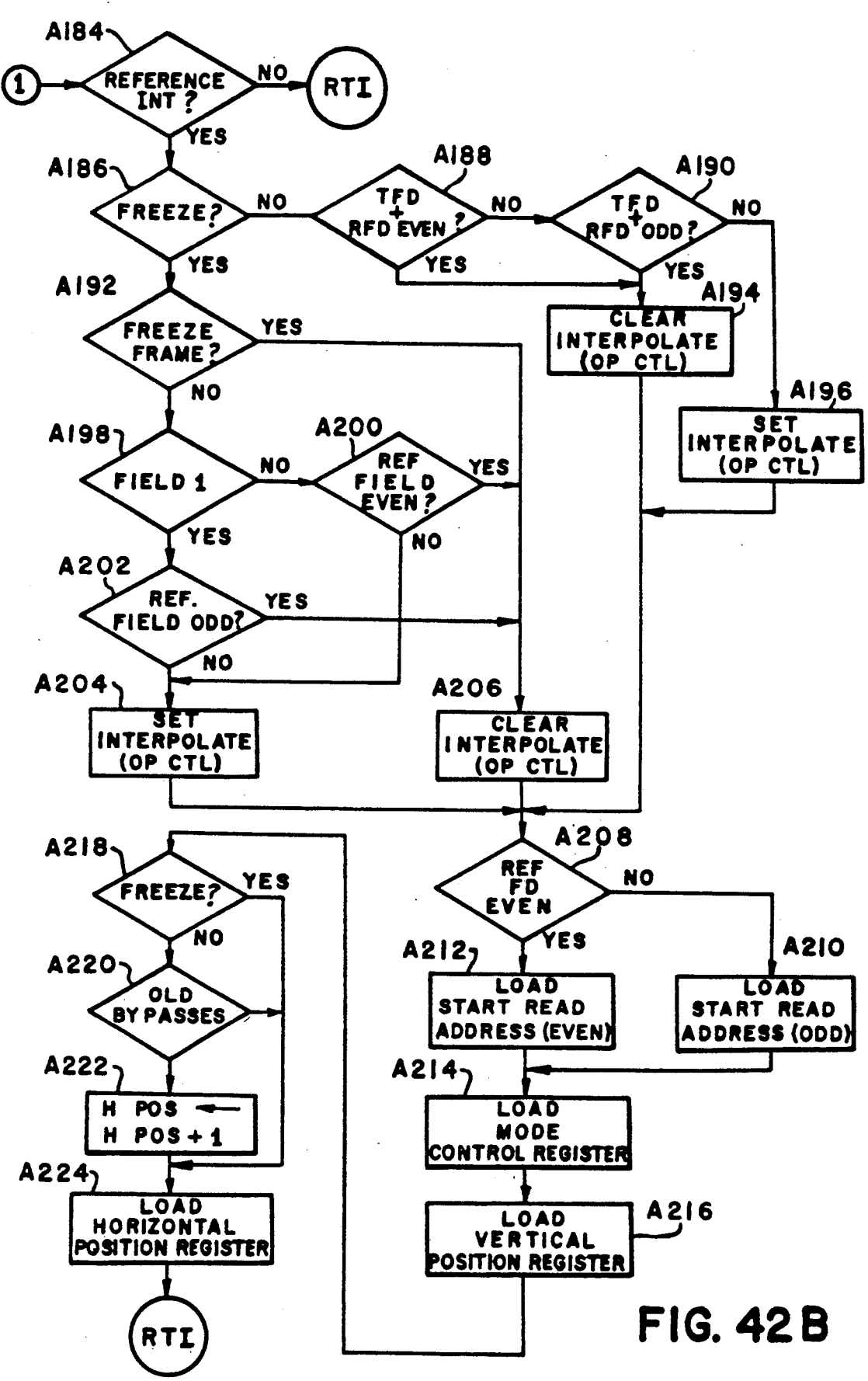

A detailed flow chart of the interrupt service routines will now be more fully described with respect to FIGS. 42A and 42B. The interrupt routine begins in block A154 by reading the interrupt buffer 708 to determine which of the two basic interrupts of the system, the tape vertical interrupt or the reference vertical interrupt, caused a transfer of program control to the present routine. Whichever interrupt occurred, the bistables 700, 702 for the interrupts are reset in block A156. Further, in block A158 a bit in the interrupt memory register is set indicating which interrupt just occurred. These bits are the control switches which the background routine reads to determine whether to execute the tape subroutines or the reference subroutines during background processing.

Thereafter, the interrupt service routine continues to block A160 where it is determined whether it was a tape interrupt (TAPE V) which occurred. If the interrupt was a tape interrupt, the routine continues at a path beginning with block A162. Otherwise, the routine switches to a path starting with block A184. In block A184 a test is performed to determine whether the interrupt causing the service routine to be executed was a reference interrupt (REF V). If the answer to both of the tests in blocks A160 and A184 are negative, (this condition normally should not happen, but is tested for noise immunity), then the program immediately returns to the location in background from which control was transferred. Alternatively, if it was the reference interrupt which caused the interrupt service routine to be called, then an affirmative branch from block A184 will begin a path at block A186 to service that interrupt.

The tape vertical interrupt service routine will now be more fully described starting at block A162 where a test is performed to determine whether or not the tape field being read is odd or even. This operation is accomplished by reading the interrupt buffer 708 to determine whether the interrupt has been requested during an odd or even tape field. This is done by testing the logical level of tape V/2 signal supplied to the interrupt buffer 708. In response to the test in block A162, block A163 stores the start write address as odd and block A164 stores the start write address as even. This operation is accomplished by loading latches 456, 458 with one constant if the incoming tape field is even and loading the latches with another constant if the incoming tape field is even.

In this manner the writing into the frame memory 106 will always occur at the same position. The even fields for the incoming data will always be written into a position labelled even in the frame memory 106 and the incoming odd fields of data will always be written into a position labelled odd in the frame memory. This is important because the incoming tape data may be slower or faster than the standard tape speed and therefore, may repeat fields in slow motion or produce higher than normal field rates in fast forward or reverse motion during shuttle.

Next in blocks A166-A176 temporary starting read addresses are stored in memory according to the starting write addresses and, therefore, according to the tape fields. Normally, the starting read address should be the same as the starting write address such that even fields will be read from written even fields and odd fields will be read from written odd fields. The first test in block A166 is to determine whether or not a freeze operation is present. The program obtains this information from a bit set in the control registers 640, 642. If the freeze condition is not present, the program sets the starting read address for even fields to the starting write address in block A170. Next, in block A172 the program compares information from the tape V/2 to the reference to determine whether the tape field is even and the next reference field to be readout is odd (so actually they are both even). A negative answer to this test indicates that either the tape field and reference field are both odd, or the tape field is odd and the reference field is even or the tape field is even and the reference field is odd. For these conditions the program continues to block A176 where the starting read address for odd fields is set equal to the starting write address. Block A176 is also executed bypassing blocks A170 and A172 if the freeze condition is present. For the case of where the tape field is even and the next reference field is odd, an affirmative branch from block A172 causes transfer of control to block A174. In this block the starting read address for odd fields is set equal to the starting read address for even fields advanced by one line. These operations are accomplished by storing the constant used for the tape field in memory locations which will later be used to load the read address counter 326.

The next operation in blocks A178-A182 is to read and store the present addresses contained in the write address counter 332 and the read address counter 326 so that a calculation can be made later to determine the distance (time) between the field being written and the field being read. Thus, in block A178 the microprocessor 158 reads registers 492, 494 holding the address of the read address counter 326 and stores it in a memory location for the present read address. This operation is performed once every tape interrupt and thus previous read addresses and previous write addresses have already been stored. In block A180 the previous write address is transferred to another buffer before overwriting that memory location with the present write address in block A182. The present write address is obtained by reading registers 464, 466 with select signals 56 and 57. When the data transfer and the reading have been accomplished, the memory now contains the present read address of the read address counter 326, the present write address of the write address counter 322, and the previous write address of the write address counter 322 for the last tape interrupt.

This completes the tape interrupt service routine and the program transfers control to block A184 where, if there is no reference interrupt, it will return to the location from which control was originally transferred. Thus, the tape interrupt service routine performs three separate functions, that of calculating and loading the starting write address, and secondly, that of setting up the starting read address based on the freeze operation and the particular incoming tape field (odd, even). Finally, the tape interrupt service routine stores the present read and write addresses for further computation.

The next group of instructions that will be explained, beginning with the path at block A186 determines the operations for servicing a reference vertical interrupt. The group of instructions represented at blocks A186-A206 are used to set or clear the interpolate bit of the register 676 which is used directly as a control line by the output processor module 112. This operation is accomplished at this part of the TBC 12 because the memory control receives and tracks the tape and reference vertical interrupts and the tape and reference field positions. Therefore, the output processor module 112 through an output processor control register will be able to control the interpolate operation either on or off as a result of this processing relatively shortly after the reference vertical interrupt occurs. This allows the function to be set or reset in the vertical blanking interval such that by the time active video starts being output from the frame memory 106, the output processor 112 will have the interpolate function ready. In block A186 the program determines whether or not a freeze function is to be performed by interrogating the control registers 640, 642. If the answer to this test is negative, then in block A188 and block A190 the program determines whether the tape field being written is matched with the tape field being read. If such is the case then no interpolation has to take place and the interpolate bit is cleared in block A194. However, if the tape field and the reference field are not both even or both odd, then the negative branch through A190 causes the interpolate bit to be set in block A196. This then will cause an interpolation of the field written into the actual field being read and used for the output video.

If a freeze operation has been requested then blocks A192, A198 indicate the type of freeze operation requested by the operator. This information is obtained through the system control which loads the data into the control registers 640, 642. Block A192 determines whether the freeze operation is for an entire frame or for a particular field and block A198 chooses between the two fields. If the operation is to freeze a frame, then an affirmative branch from block A192 causes the interpolate bit to be cleared in block A206. However, if a freeze field operation is to be performed, block A198 causes a negative branch if field 2 is to be frozen while block A198 causes an affirmative branch to block A202 if field 1 is to be frozen. Thereafter, in blocks A200 and A202 the reference field is tested to determine if it is the same as the field to be frozen. If it is as indicated by a affirmative branch from blocks A200 or block A202, then the interpolate bit is cleared in block A206. However, if the field to be frozen is inverted from the field which is to be output, indicated by negative branches from either block A200 or block A202, then the interpolate operation is needed and the bit is set in block A204.

The program then continues to blocks A208-A210 where the start read address for either the even or odd field is loaded into registers 480, 482, 484, and 486. Depending upon whether the reference field to be output is odd or even, as determined in block A208, the corresponding start read address is loaded into the registers of the read address counter 326. As was more fully discussed hereinbefore, with respect to the tape interrupt routine, the start read addresses were preset into particular address locations.

Next, in block A214 the mode control register 638 is loaded with data developed during the last reference field and the vertical position register 372 is loaded in block A216 from the last calculations. These operations are performed at this point during vertical blanking such that the video will have no discontinuities when output.

Blocks A218-A224 cause the horizontal position register 362 to be loaded with data at this point. First, in block A218, however, the program determines whether a freeze operation is in effect. If present, then the horizontal position register is loaded normally in block A224. However, in block A222 if a freeze operation is not in effect, the program tests to determine whether the one line delay module is bypassed. If no freeze operation is in effect and the one line delay is not bypassed, then in block A222 the horizontal position is increased by one horizontal line before loading the horizontal position register 362 in block A224. Otherwise, if the one line delay is bypassed, then the horizontal position register 362 is loaded regularly from the affirmative branch from block A220.

This completes the operation of the reference interrupt service routine and, thereafter, the program continues at the location in background loop from which control was transferred.

While a preferred embodiment of the invention has been illustrated, it will be obvious to those skilled in the art that various modifications and changes may be made thereto without departure from the spirit and scope of the invention as defined in the appended claims.

What is claimed is:

1. A method for correcting time base errors in a video signal to synchronize the video signal with a reference signal having horizontal synchronizing pulses, comprising the steps of:

storing the video signal in a memory in increments of one horizontal line of video information and at a rate synchronized to horizontal pulses in said video signal;

reading the increments of the stored video signal from said memory at a rate equal to the frequency of the horizontal synchronizing pulses in said reference signal; and varying the time at which one of said storing and reading steps is initiated relative to the occurrence of a horizontal synchronizing pulse in its corresponding video or reference signal in increments of one-half of a horizontal line.

2. A method for correcting time base errors in a video signal to synchronize the video signal with a reference signal having vertical and horizontal synchronizing pulses, comprising the steps of:

detecting a vertical synchronizing pulse in said video signal;

calculating an address at which to begin storing said video signal in a memory;

storing said video signal in the memory in increments of one horizontal line each, beginning at said calculated address and at a rate corresponding to the frequency of horizontal synchronizing pulses in said video signal and synchronized with said vertical synchronizing pulse;

detecting a vertical synchronizing pulse in said reference signal;

calculating an address at which to begin reading a stored video signal from said memory;

reading a stored video signal from said addressing the memory at a rate corresponding to the frequency of horizontal synchronizing pulses in said reference signal and synchronizing with the vertical synchronizing pulse in said reference signal; and delaying the initiation of one of said storing and reading steps by increments of one-half of a horizontal line relative to the vertical synchronizing pulse from the corresponding video or reference signal.

3. The method of claim 2 further including the steps of determining whether each of said detected vertical synchronizing pulse related to an odd or even video field, and wherein said initiation is delayed by a multiple of one-half of a horizontal line, said multiple being related to said determination of whether the detected pulses relate to odd or even fields.

* * * * *